United States Patent [19]

Murata et al.

[11] Patent Number: 5,561,746
[45] Date of Patent: Oct. 1, 1996

[54] IMAGE SYNTHESIZING SYSTEM WITH SURFACE DATA PERSPECTIVE TRANSFORMATION

[75] Inventors: Hiroyuki Murata, Shinagawa-ku; Takashi Yokota, Yokohama, both of Japan

[73] Assignee: Namco Ltd., Tokyo, Japan

[21] Appl. No.: 111,912

[22] Filed: Aug. 26, 1993

[30] Foreign Application Priority Data

Aug. 26, 1992 [JP] Japan .................................. 4-252139

[51] Int. Cl.$^6$ ................................................. G06T 17/00
[52] U.S. Cl. ......................... 395/119; 395/125; 395/126
[58] Field of Search .................................. 395/119, 120, 395/125, 126, 127, 128, 129–132, 133, 141, 152–154

[56] References Cited

U.S. PATENT DOCUMENTS

| | | |
|---|---|---|
| 3,887,763 | 6/1975 | Hinoshita et al. . |
| 3,889,107 | 6/1975 | Sutherland . |
| 4,594,673 | 6/1986 | Holly . |
| 4,615,013 | 9/1986 | Yan et al. . |
| 4,682,217 | 7/1987 | David et al. . |
| 4,697,178 | 9/1987 | Heckel . |
| 4,819,192 | 4/1989 | Kuragano et al. . |
| 4,847,789 | 7/1989 | Kelly et al. . |
| 4,935,879 | 6/1990 | Ueda . |
| 4,945,495 | 7/1990 | Ueda . |
| 5,075,876 | 12/1991 | Seki et al. . |
| 5,086,496 | 2/1992 | Mulmuley . |
| 5,097,427 | 3/1992 | Lathrop et al. . |
| 5,125,074 | 6/1992 | Labeaute et al. . |
| 5,175,806 | 12/1992 | Muskovitz et al. . |
| 5,179,638 | 1/1993 | Dawson et al. ......................... 395/125 |
| 5,214,753 | 5/1993 | Lee et al. . |
| 5,222,205 | 6/1993 | Larson et al. . |
| 5,230,039 | 7/1993 | Grossman et al. . |
| 5,280,568 | 1/1994 | Obata . |
| 5,283,860 | 2/1994 | Einkauf et al. . |
| 5,325,470 | 6/1994 | Sumino et al. . |
| 5,327,509 | 7/1994 | Rich . |
| 5,369,736 | 11/1994 | Kato et al. . |
| 5,422,988 | 6/1995 | Koide . |

FOREIGN PATENT DOCUMENTS

| | | |
|---|---|---|
| 49-29718 | 3/1974 | Japan . |
| 60-246481 | 12/1985 | Japan . |
| 60-250479 | 12/1985 | Japan . |
| 62-186373 | 8/1987 | Japan . |

(List continued on next page.)

OTHER PUBLICATIONS

Foley et al. (1990).
Heckbert (1986).
Foley et al. "Viewing in 3D" and Scan–Line Algorithms, Computer Graphics: Principles and Practice, Second Edition, 1990.
Takeshi Shibamoto, et al., "Texture Mapping (1)" *The Collected Papers of Thirty-First Information Processing Institute Lecture*, Information Processing Institute, Sep. 9, 1985, pp. 1703–1704 (w/English summary).

Primary Examiner—Almis R. Jankus
Attorney, Agent, or Firm—Oliff & Berridge

[57] ABSTRACT

An image synthesizing system improves perspective transformation of images by giving a far and near sense to the spatial change in the surface data of an object. A texture data storage unit stores texture data at positions represented by texture coordinates. An image supply unit outputs texture coordinates, brightness data, attribute data and the other data which correspond to the vertex coordinates arid vertices of polygons. A processor unit determines rendering data for each dot by subjecting the texture coordinates and brightness data to the perspective transformation, linear interpolation and inversely perspective transformation. The resulting rendering data is then mapped to representing coordinates determined by a main processor in a field buffer unit. Thereafter, the rendering data is transformed into RGB data by a palette/mixer circuit using color data which are read out from a texture data storage unit by the texture coordinates, attribute data and brightness data. Thus, an image data can be formed.

60 Claims, 46 Drawing Sheets

FOREIGN PATENT DOCUMENTS

| | | |
|---|---|---|
| 63-80375 | 4/1988 | Japan . |
| 1-131976 | 5/1989 | Japan . |
| 2-308376 | 12/1990 | Japan . |
| 3-45428 | 7/1991 | Japan . |
| 3-45427 | 7/1991 | Japan . |
| 60-256880 | 12/1995 | Japan . |
| 2181929 | 4/1987 | United Kingdom . |
| 2194656 | 3/1988 | United Kingdom . |
| 2259432 | 3/1993 | United Kingdom . |

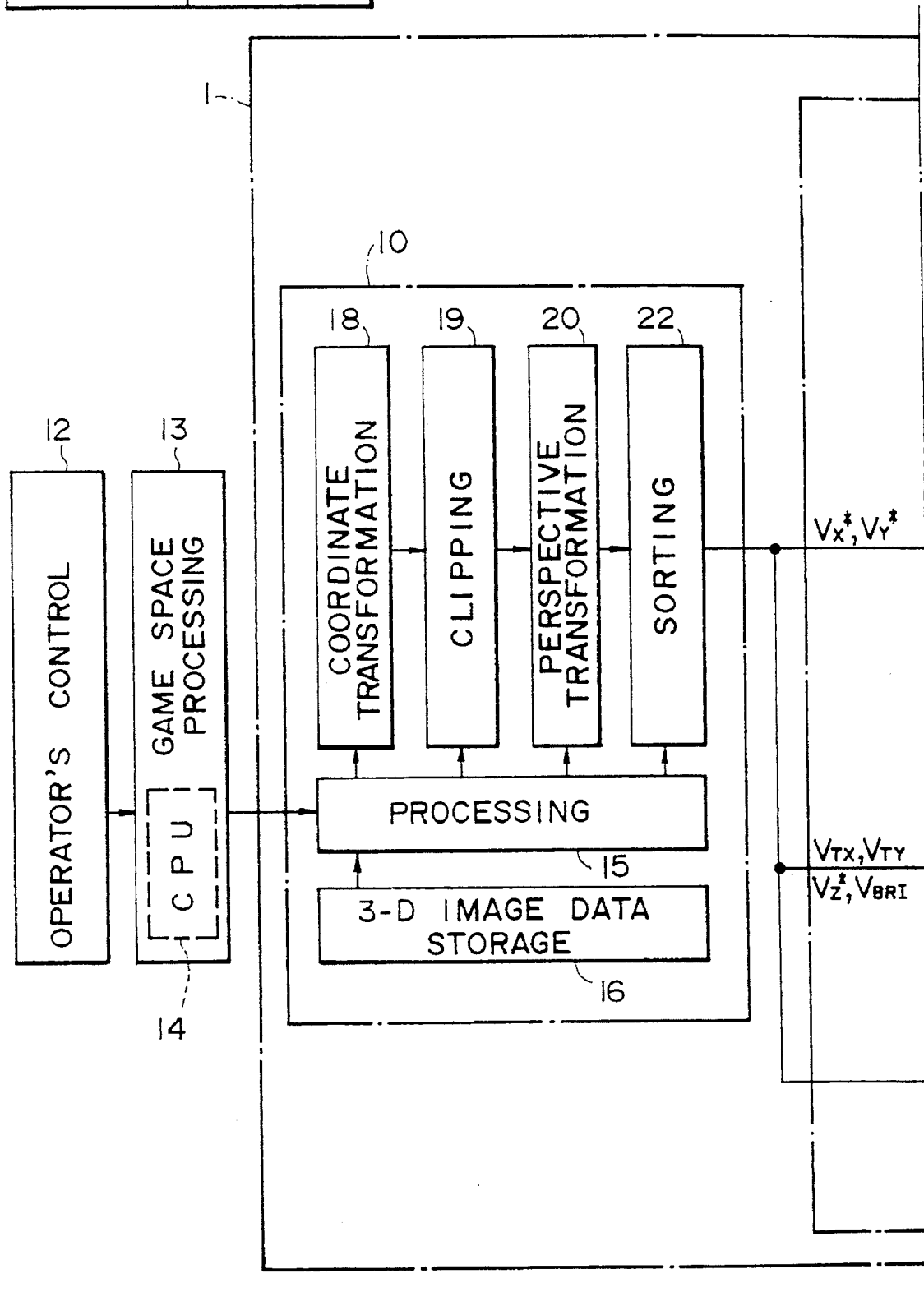

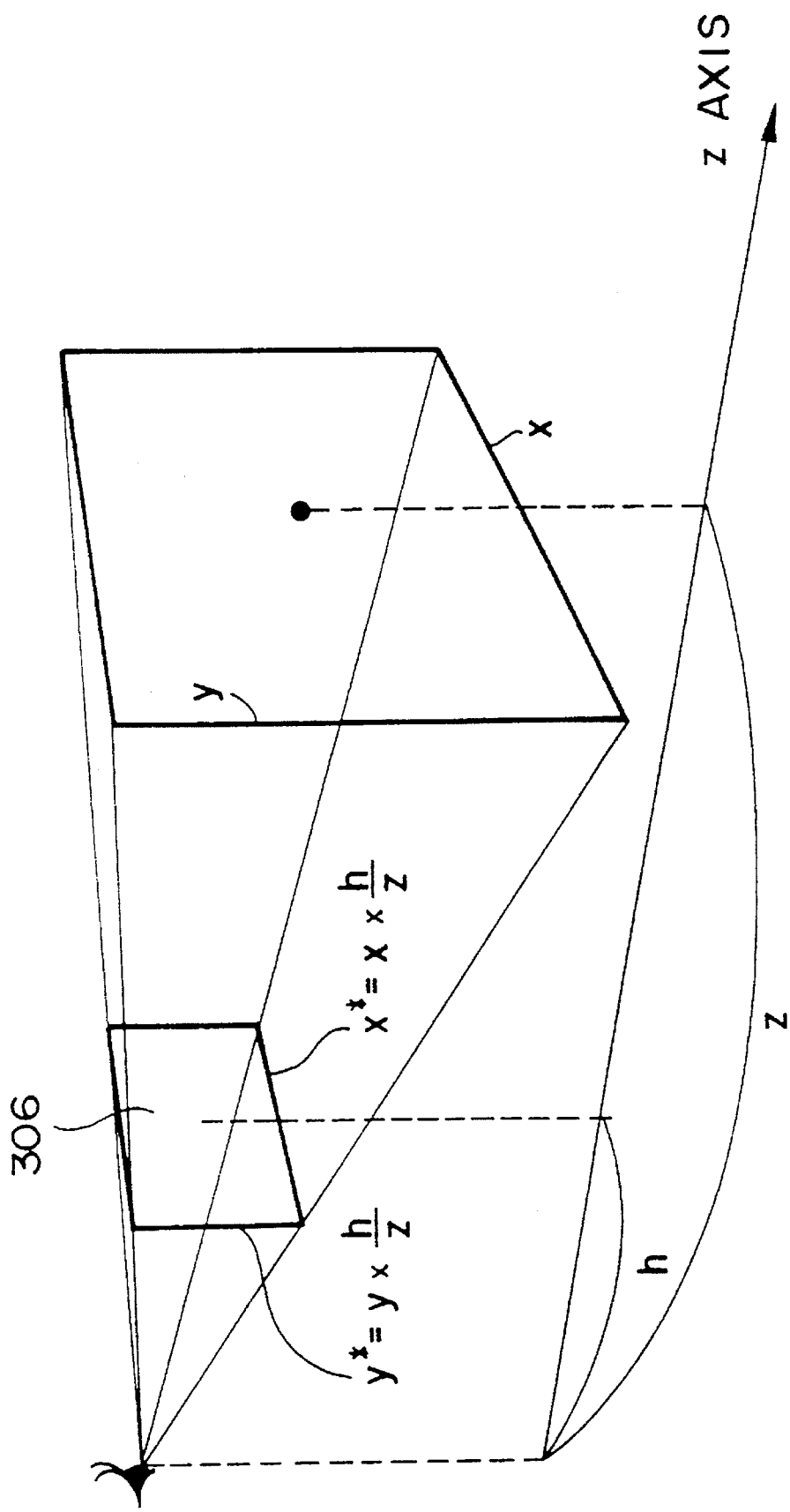

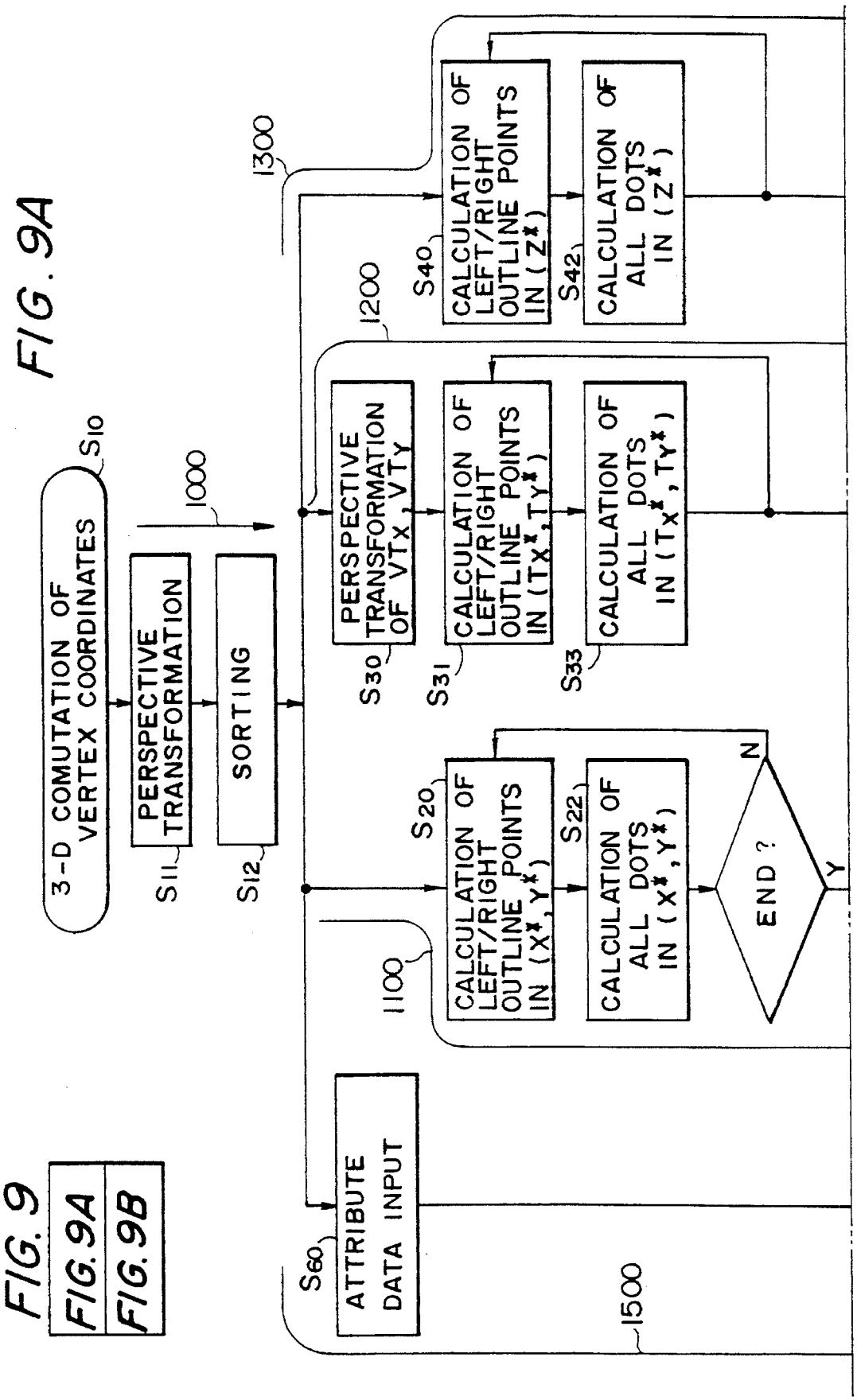

FIG. 15

| DATA NAME | BIT STRUCTURE | | | | | | | | | | | | | | | | DATA COUNT |
|---|---|---|---|---|---|---|---|---|---|---|---|---|---|---|---|---|---|
| | 15 | 14 | 13 | 12 | 11 | 10 | 9 | 8 | 7 | 6 | 5 | 4 | 3 | 2 | 1 | 0 | |
| Z-COORDINATE REPRESENTATIVE VALUE (24 BITS) | | | | | Z LOW-ORDER (12 BITS) | | | | | | | | | | | | 1 |
| | | | | | Z HIGHT-ORDER (12 BITS) | | | | | | | | | | | | 2 |
| PAL | | | | | | | | PAL (8 BITS) | | | | | | | | | 3 |
| CZ (15 BITS) | | CZ (15 BITS) | | | | | | | | | | | | | | | 4 |
| VTx (12 BITS) | | | | | VTx (12 BITS) | | | | | | | | | | | | 5, 11, 17, 23 |
| VTy (16 BITS) | BLK No. (4 BITS) | | | | VTy (12 BITS) | | | | | | | | | | | | 6, 12, 18, 24 |
| Vx* (SIGNED 16 BITS) | Vx* (SIGNED 16 BITS) | | | | | | | | | | | | | | | | 7, 13, 19, 25 |
| Vy* (SIGNED 16 BITS) | Vy* (SIGNED 16 BITS) | | | | | | | | | | | | | | | | 8, 14, 20, 26 |
| VBRI (8 BITS) & Vz* EXPONENT PART | VBRI (8 BITS) | | | | | | | | Vz* EXPONENT PART (6 BITS) | | | | | | | | 9, 15, 21, 27 |
| Vz* FRACTION PART (15 BITS) | | Vz* FRACTION PART (15 BITS) | | | | | | | | | | | | | | | 10, 16, 22, 28 |
| | | | | | | | | | | | | | | | | | TOTAL 28 WORDS |

$$M = \frac{A^x Q^x}{A^x O^x} = \frac{Ym^x - Ya^x}{\Delta Y^x}$$
$$Xm^x = Xa^x + M \times \Delta X^x$$
$$Zm^x = Zd^x + M \times \Delta Z^x$$

$$Txm^x = Txa^x + M \times \Delta Tx^x$$
$$Tym^x = Tya^x + M \times \Delta Ty^x$$

$$\begin{cases} N = \dfrac{L^x P n^x}{L^x R^x} = \dfrac{Xn^x - X\ell^x}{\Delta X^x} \\ \Delta Z^x = Zr^x - Z\ell^x \\ Zn^x = Z\ell^x + N \times \Delta Z^x \end{cases}$$

$$\begin{cases} \Delta TY^x = TYr^x - TY\ell^x \\ Txn^x = Tx\ell^x + N \times \Delta Tx^x \\ TYn^x = TY\ell^x + N \times \Delta TY^x \end{cases}$$

| FIG.21A | FIG.21B |

| FIG.29A | FIG.29B |

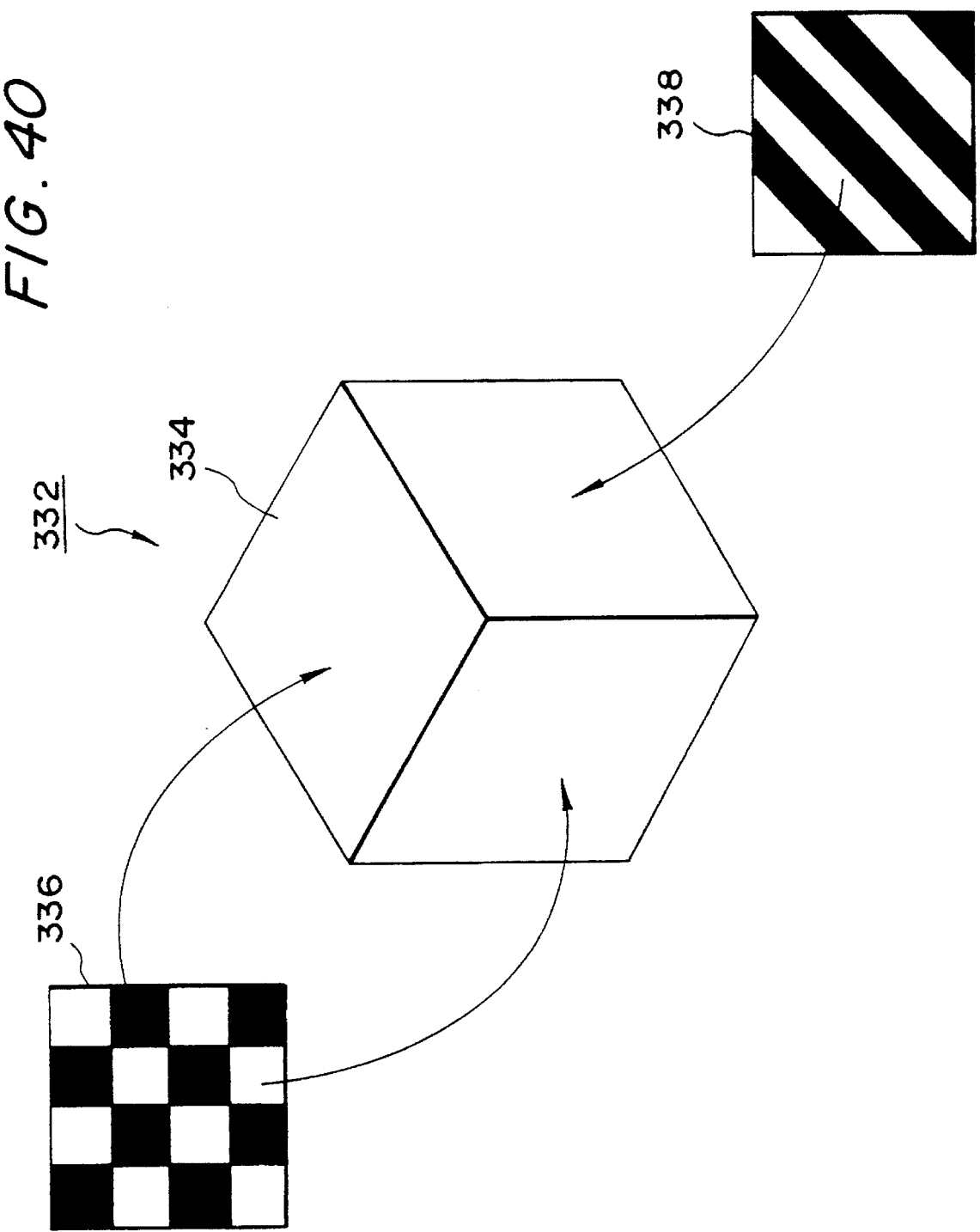

IMAGE SYNTHESIZING SYSTEM WITH SURFACE DATA PERSPECTIVE TRANSFORMATION

BACKGROUND OF THE INVENTION

1. Field of the Invention

The present invention relates to an image synthesizing system which can perform the synthesization of high-quality image in real time.

2. Description of the Related Art

There are known various image synthesizing systems used as in three-dimensional (3-D) games, airplane or other vehicle simulators and so on. Typically, such image synthesizing systems have information of image relating to a 3-D object 300 as shown in FIG. 36, which has previously been stored therein. Information of image is perspectively transformed into a pseudo 3-D image 308 on a screen 306. As a player 302 makes an operation with a control panel 304 such as rotation, translation or the like, the system responds to the control signal to perform the processing with respect to rotation, translation or the like of the image of the 3-D object 300 in real time. Thereafter, the processed 3-D image is perspectively transformed into the pseudo 3-D image on the screen 306. As a result, the player 302 itself can rotate or translate the three-dimensional objects in real time to experience a virtual 3-D space.

FIG. 37 shows one of such image synthesizing systems. The image synthesizing system will be described as being applied to a 3-D game.

As shown in FIG. 37, the image synthesizing system comprises an operator's control unit 510, a game space processing unit 500, an image synthesizing unit 512 and a CRT 518.

The game space processing unit 500 sets a game space in response to control signals from the operator's control unit 510 and in accordance with a game program which has been stored in a central processing unit 506. Namely, the processing is performed with respect to what position and direction the 3-D object 300 should be arranged in.

The image synthesizing unit 512 comprises an image supply unit 514 and an Image forming unit 516. The image synthesizing unit 512 performs the synthesization of a pseudo 3-D image in accordance with information of a game space set by the game space processing unit 500.

In this image synthesizing system, 3-D objects in the game space are defined as polyhedrons which are divided into 3-D polygons. As shown in FIG. 36, for example, the 3-D object 300 is represented as a polyhedron which is divided into 3-D polygons 1–6 (polygons 4–6 not shown herein). The coordinates and associated data of each vertex in each of the 3-D polygons (which will be referred to "image data of vertices") have been stored in a 3-D image data storage 552.

The image supply unit 514 performs various mathematical treatments such as rotation, translation and others, and various coordinate conversions such as perspective transformation and others, for the image data of vertices, in accordance with the setting of the game space processing unit 500. After the image data of vertices has been processed, it is permuted in a given order before outputted to the image forming unit 516.

The image forming unit 516 comprises a polygon generator 570 and a palette circuit 580. The polygon generator 570 comprises an outline (polygon edges) point processing unit 824 and a line processor 326. The image forming unit 516 is adapted to perform a process of painting all the dots (pixels) in the polygon with a predetermined color data or the like in the following procedure:

First of all, the outline point processing unit 324 calculates left-hand and right-hand outline points which are intersection points between polygon edges AB, BC, CD, DA and other polygon edges and scan lines, as shown in FIG. 38. Subsequently, the line processor 326 paints, with specified color data, sections between the left-hand and right-hand outline points, for example, sections between L and Q; Q and R as shown in FIG. 38. In FIG. 38, the section between L and Q is painted by red color data while the section between Q and R is painted by blue color data. Thereafter, the color data used on painting are transformed into RGB data in the palette circuit 580, and then the RGB data in turn is outputted to and displayed in CRT 518.

In such an image synthesizing system of the prior art, all the dots on a single polygon can be painted only by the same color, as described. As can be seen in FIG. 38, for example, the dots on the polygon 1 are only painted by red color; the dots on the polygon 2 are only painted by yellow color; and the dots on the polygon 3 are only painted by blue color. Thus, the formed image is monotonous without reality.

If an object having its complicated surface is to be displayed to avoid such a monotonousness, the number of divided polygons must greatly be increased. For example, if a 3-D object 332 having a texture of color data as shown in FIG. 39 is to be formed by the image synthesizing system of the prior art, it is required to divide a polyhedron into polygons 1–80 (polygons 41–80 not shown herein) for processing. Namely, various processing operations including the rotation, translation and perspective transformation, the treatment of polygon outline, the painting and the like must be performed for all the polygons. It is thus required to treat polygons ten-odd times those of the 3-D object 300 having no texture as shown in FIG. 36. However, the system for synthesizing an image in real time must terminate the drawing of an image to be displayed by treating all the dots for every field (1/60 seconds). In order to draw such a 3-D object 332 having a texture of color data, one requires a hardware having a very increased speed or an increased scale to perform a parallel operation. As the number of polygons to be processed is increased, the memory and data processor of the system is necessarily increased in scale. In image synthesizing systems such as video game machines which are limited in cost and space, it is therefore subsequently impossible to draw a pseudo 3-D image having a delicate texture with high quality.

In the field of computer graphics and the like, there is known a texture mapping technique shown in FIG. 40. The texture mapping separates the image data of a 3-D object 332 into the image data of a polyhedron 334 and the texture data of textures 336 and 338, which are in turn stored in the system. On displaying an image, the texture data of the textures 336. 338 are applied to the polyhedron 334 to perform the image synthesization.

The texture mapping technique is realized in the field of very large-scale and expensive image processing systems such as exclusive image-processing computers known as graphics work stations, flight simulators and so on. Very few image synthesizing systems which are relatively inexpensive like video game machines only utilize the texture mapping technique since it is difficult to increase the speed and scale of their hardwares. In addition, such video game machines can only display limited number and size of 3-D objects and the mapping they provide is inaccurate since the operation is performed by a simple approximation. As a result, the reality of image is very degraded. Furthermore, the real-time display is insufficient since the frequency of updating the scene is low, that is, for several frames per second.

The texture mapping technique must apply two-dimensional textures to the 3-D object as shown in FIG. 40. The far and near sense and linearity in the mapped textures will be damaged.

Japanese Patent Laid-Open No. Sho 63-80375 discloses a technique for improving the problem of linearity. Such a technique is directed to maintain a linearity by performing the mapping along each side of a polygon, rather than a scan line. However, the linearity may not be maintained by the orientation of the line. Further, time is wastefully required to treat the same dot repeatedly. In addition, the far and near sense will not improved at all.

In order to avoid the monotonousness in the synthesized image, a technique is considered which varies the brightness data in the surface of an object, rather than the color information. One such technique is Gouraud shading method which may be used when the brightness data in the surface of an object varies simply and continuously. There is also known Phong shading method which Is used when the normal vector varies, for example, from Japanese Patent Publication Nos. Hei 3-45427 or 3-45428.

Gouraud and Phong shading techniques determine the brightness data and normal vector in each dot merely from a linear interpolation. Thus, an image having no far and near sense in the variations of brightness will be synthesized. As the 3-D synthesized image is subjected to rotation or other treatment, the reality in the image may be damaged.

SUMMARY OF THE INVENTION

It is therefore an object of the present invention to provide an image synthesizing system which can output an image having its improved reality in real time by providing a far and near sense to the spatial changes in the surface information of an object.

To this end, the present invention provides an image synthesizing system for perspectively transforming 3-D images consisting of 3-D polygons onto a plane of projection to synthesize pseudo 3-D images, said system comprising:

representing coordinate determining means for perspectively transforming the representing coordinates of each vertex of said 3-D polygons onto perspective-transformed representing coordinates of each vertex on said plane of projection, and for determining perspective-transformed representing coordinates of each of dots defining a polygon, which is formed by the perspective-transformed representing coordinates of the vertices, from a linear interpolation:

surface data determining means for perspectively transforming surface data corresponding to each vertex of said 3-D polygons into perspective-transformed surface data of each vertex which is linear relative to the perspective-transformed representing coordinates of each vertex, for determining perspective-transformed surface data of each of the dots defining a polygon formed by the perspective-transformed surface data of the respective vertices from the linear interpolation and for subjecting the perspective-trans formed surface data to an inverse perspective transformation to compute the surface data; and image data forming means for forming image data at a position represented by said perspective-transformed representing coordinates using said surface data determined by said surface data determining means.

According to the present invention, the perspective transformation is carried out not only to the coordinate system relating to the representing coordinates of the polygons, but also to the surface data of the polygons. Therefore, the linear relationship between the coordinate system relating to the representing coordinates and the surface data will be maintained. As a result, a pseudo three dimensional high-quality image can be synthesized in real time without degradation of the far and near sense and linearity in the surface data of the object. Particularly, the surface data determining means of the present invention can simultaneously compute a plurality of surface data. Accordingly, the present invention can provide a relatively small-sized image synthesizing circuitry capable of treating a plurality of surface data.

The representing coordinate determining means may be adapted to compute the perspective-transformed representing coordinates of left and right outline points which are intersecting points between the outline of the polygon formed by the perspective-transformed representing coordinates of the vertices and scan lines by linearly interpolating the perspective-transformed representing coordinates of the vertices and also compute the perspective-transformed representing coordinate of each of dots on the scan lines between the left and right outline points by linearly interpolating the perspective-transformed representing coordinates of the left and right outline points and wherein the surface data determining means computes the perspective-transformed surface data of left and right outline points which are intersecting points between the outline of the polygon formed by the perspective-transformed representing coordinates of the vertices and scan lines by linearly interpolating the perspective-transformed surface data of the vertices and also to compute the perspective-transformed surface data of each of dots on the scan lines between the left and right outline points by linearly interpolating the perspective-transformed surface data of the left and right outline points.

In such an arrangement, the image synthesization of high-quality image can be performed in real time by the use of a more simple circuitry.

At least one type of data of said surface data processed by said surface data determining means is rendering data and wherein said image data forming means forms the image data at a position represented by said perspective-transformed representing coordinates using the rendering data determined by said surface data determining means.

Thus, the surface of the displayed object can be treated with the rendering data given to the respective vertices of the polygons without degradation of the far and near sense and linearity.

At least one of the surface data processed by said surface data determining means is texture coordinates and said system further comprising a rendering data storage unit for storing a given rendering data at an address specified by said texture coordinates determined by said surface data determining means, said image data forming means forms the image data at a position represented by said perspective-transformed representing coordinates using the rendering data read out from said rendering data storage unit.

In such an arrangement, the rendering data can be read out from the rendering data storage unit by the use of the texture coordinate or each vertex of the polygons to apply a texture mapping to the surface of the displayed object without degradation of the far and near sense and linearity. By the use of such a texture mapping technique, particularly, the high-quality image synthesization can be realized without increase of the load to the hardware.

At least one of the surface data processed by said surface data computing means is texture coordinates, said system further comprising a function computing unit for applying a given function computation to the texture coordinates determined by said surface data determining means to determine rendering data, said image data forming means forms the image data at a position represented by said perspective-transformed representing coordinates using the rendering data determined by said function computing unit.

In such an arrangement, the rendering data can be formed by the function computing unit from the texture coordinates provided to each vertex of the polygons to apply a texture mapping to the surface of the displayed object without damage of the far and near sense and linearity. Further, the texture mapping can be carried out by a relatively small-scale circuitry. For example, a random number generator may be used to produce a superior image effect which would not be obtained by the prior art.

At least one type of data in said rendering data is color data and wherein said image data forming means uses said color data to form the image data at a position represented by said perspective-transformed representing coordinates.

Thus, the rendering operation using the color data can be carried out without degradation of the far and near sense and linearity. Similarly, the texture mapping operation using the color data can be performed without damage of the far and near sense and linearity.

At least one type of data in said rendering data is brightness data and wherein said image data forming means uses said brightness data to form the image data at a position represented by said perspective-transformed representing coordinates.

In such an arrangement, the rendering and texture mapping can be carried out not only by the use of the color data, but also the brightness data. A far arid near sense may be provided in the variations of brightness and even if the 3-D object is subjected to rotation or other treatment, a high-quality image can be synthesized by the use of the Gouraud shading technique and the like, without degradation of the image reality.

At lease one type of data in said rendering data is surface shade data and wherein said image data forming means uses said surface shade data re form the image data at a position represented by said perspective-transformed representing coordinates.

In such an arrangement, the rendering and texture mapping can be performed using not only the color data but also the object surface shape data. If the normal vector, the displacement of the normal vector and the height of reliefs formed on the surface of the object are used as surface shape data, the image synthesization can be made by bump mapping or the like. In such a case, the far and near sense can be provided to the changes in the surface shade of the object. Even if the 3-D object is subjected to rotation or other treatment, a high-quality image can be synthesized without damage of the reality.

At least one type of data in said rendering data is transparency data and wherein said image data forming means uses said transparency data to form the image data at a position represented by said perspective-transformed representing coordinates.

Thus, the rendering and other treatments can be carried out using not only the color data but also the transparency data. For example, an object may mistily be expressed so that it has transparent and semi-transparent parts varying from one to another, without damage of the far and near sense and linearity.

At least one type of data in said rendering data is diffuse reflectance data and wherein said image data forming means uses said diffuse reflectance data to form the image data at a position represented by said perspective-transformed representing coordinates.

Thus, the rendering and other treatments may be made using not only the color data but also the diffuse reflectance data. In such a case, an object may be expressed with different gloss parts without degradation of the far and near sense and linearity.

It is further desirable that the image data forming means includes attribute data storage means for storing attribute data which is image data common within each of the divided polygons, said image data forming means forms the image data at a position represented by said perspective-transformed representing coordinates using said attribute data and said surface data.

By thus using the attribute data which is the common image data shared by all of the dots (pixels) in a polygon, the image synthesization can be realized with higher quality by a more simple circuitry. For example, when it is wanted to perform the bump mapping by the displacement of the normal vector, the original position of the normal vector can be specified by the attribute data.

It is further desirable that the representing coordinate determining means processes the polygons sequentially starting from the closest polygon to the view point in the displayed scene through a given computing process and comprising end flag storage means for storing each end flag which represents the end of said computing process at an address corresponding to a dot for which the computing process has been completed by said representing coordinate computing means, and processing dot instruction means for reading said end flag from said end flag storage means, for instructing a dot to be processed based on the read end flag to said representing coordinate determining means, and for writing the end flag of the dot decided to be processed back to said end flag storage means as a processed dot, which has increased processing speed by instructing said representing coordinate determining means only to perform the computing process on the dots decided to be processed.

In such an arrangement, 3-D images can be formed by processing the polygons sequentially starting from the closest polygon to the view point in the scene. Even if the operational time is not sufficiently provided, the data of the closest polygon to the view point in the scene can effectively be prevented from being lost. After the closest polygon to the view point in the scene has been processed and when it is wanted to process the next closer polygon to the view point, the computation can be omitted relating to part of the next closer polygon to the view point hidden by the closest polygon to the view point since the end flag relating to that hidden polygon part has already been written in the end flag storage means. This increases the operational speed in the image synthesizing system.

BRIEF DESCRIPTION OF THE DRAWINGS

FIG. 6 is a diagrammatic view illustrating the concept of perspective transformation.

FIG. 7A is a diagrammatic view illustrating the problem of brightness continuity while

FIG. 12A is a game space set by the game space processing unit while

FIG. 15 is a table illustrating an example of polygon data outputted from the perspective transformation unit.

FIG. 30A is a diagrammatic view illustrating a bump texture plane while

FIG. 40 is a diagrammatic view illustrating the concept of texture mapping.

DETAILED DESCRIPTION OF THE PREFERRED EMBODIMENTS

[Table of Contents]
A. Techniques
  1. Technique 1
  2. Technique 2
  3. Technique 3
  4. Technique 4
  5. Basic Arrangement and Concept
B. First Embodiment
  1. Summary of First Embodiment
    (1) Summary of Structure
    (2) Summary of Operation and Computation
  2. Details
    (1) Game Space Computing Unit
    (2) Image Supply Unit
    (3) Sorting Unit
    (4) Processor
    (5) End Flag Storage and Processing Dot Instruction Units
    (6) Field Buffer Unit
    (7) Attribute RAM Unit
    (8) Texture Data Storage Unit
    (9) Palette & Mixer Circuit
C. Second Embodiment
  1. Summary
  2. Details
D. Third Embodiment
  1. Summary 2. Details A. Techniques An image synthesizing system is generally constructed in accordance with the following techniques:

1. Technique 1

The image synthesizing system forms an image using a texture mapping technique in which polygons defining a 3-D image are mapped with texture data that is rendering data stored in a texture data storage means. For simplification, it is only assumed that the texture data is color data.

The texture mapping technique can provide more delicate pattern, color and the like in the image without increase of the number of polygons to be processed. In other words, an image improved in quality can be provided, without very increase of the load on the hardware, simply by elaborating the texture data stored in the texture data storage means.

With the texture mapping of the prior art, however, there it raised problems relating to the far and near sense and linearity in the pattern of the mapped texture.

Figure 3A:
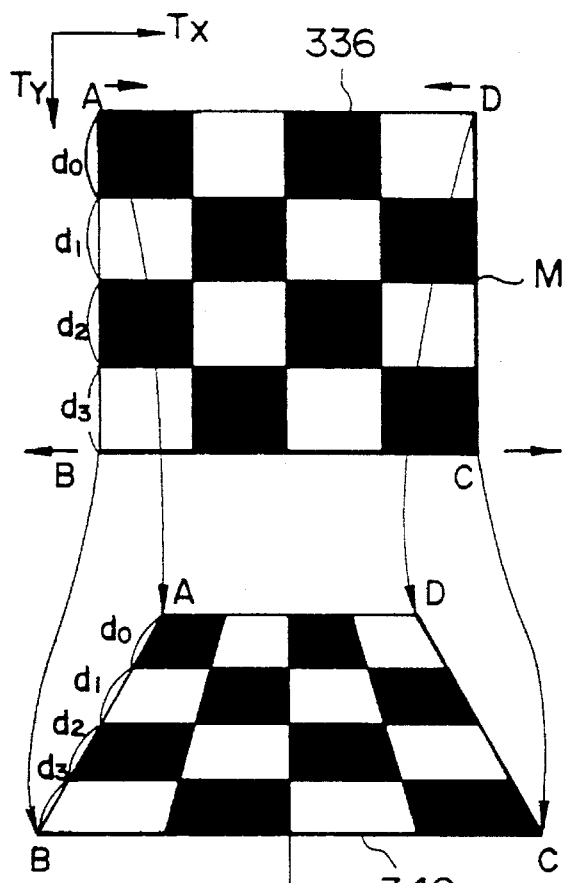
FIGS. 3A to 3C are diagrammatic views illustrating the problem of far and near sense in the texture mapping of the prior art.
Figure 3B:
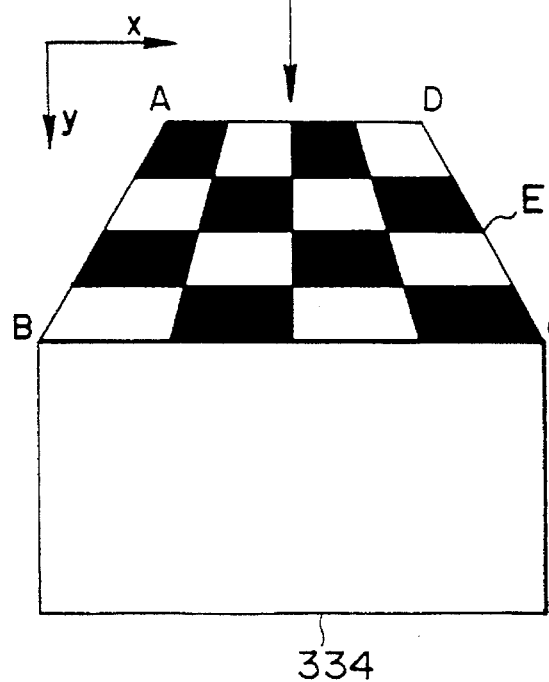
Figure 3C:
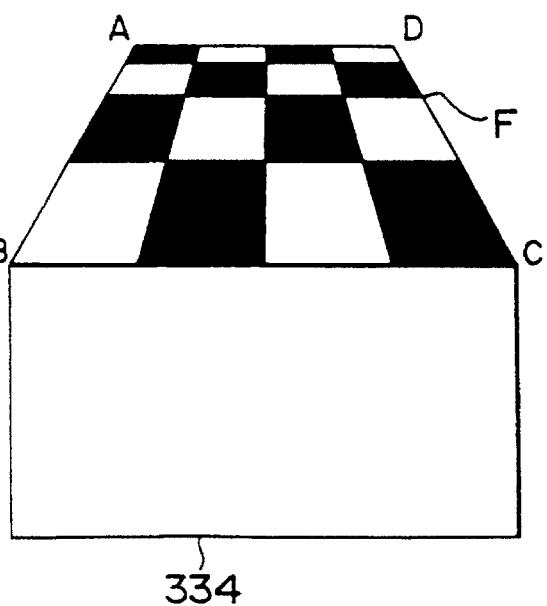

FIGS. 3A–3C show a problem of the far and near sense in the texture mapping.

If a texture 336 is applied to a polygon 340 merely by the linear interpolation as shown in FIG. 3A, the texture on a polyhedron 334 in a screen will look as shown in FIG. 3B. Actually, the texture on the polyhedron should look as shown in FIG. 3C. Namely, the far and near sense will be lost in the texture on the polyhedron 334 in FIG. 3B. This is also understood from the fact that spacings d0–d3 in the texture pattern of FIG. 3A are linearly interpolated as they are.

Figure 4A:
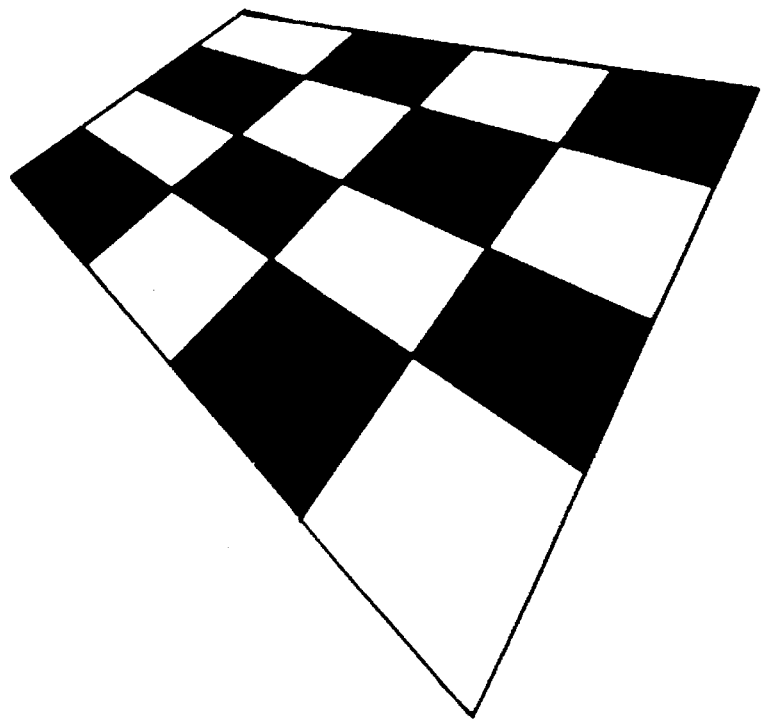
FIGS. 4A and 4B are diagrammatic views illustrating the problem of linearity in the texture mapping of the prior art.
Figure 4B:
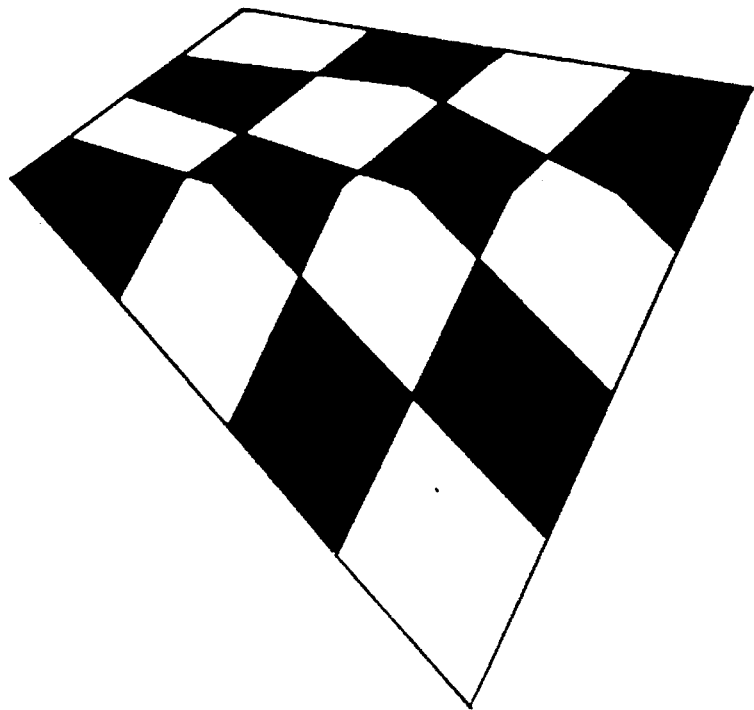

In the prior art, another problem is raised in that the linearity of the pattern defining the texture is lost by the linear interpolation. Namely, three-dimensional lines are not linearly displayed in the screen. This is shown in FIGS. 4A and 4B. An image to be actually displayed in FIG. 4A is displayed as shown in FIG. 4B. The application of the texture only by the linear interpolation greatly damages the linearity of the pattern defining the texture to degrade the quality of image.

This is because the texture on the screen is linearly interpolated in spite of that it is non-linear.

Figure 5:
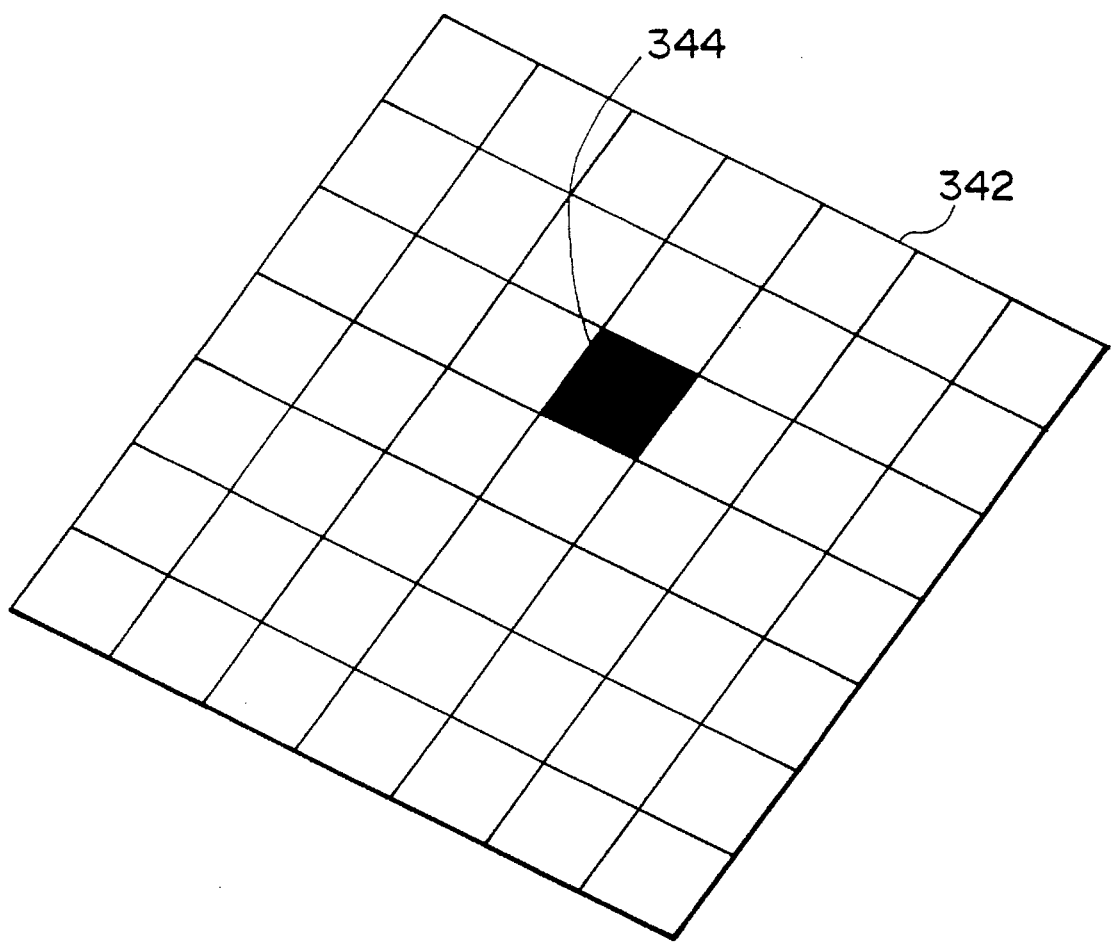
FIG. 5 is a diagrammatic view illustrating a texture mapping technique which utilizes a fragmentation algorithm.

To overcome these problems, a texture mapping technique using a texture fragmentation algorithm has been proposed. Such a texture mapping technique fragmentizes patch 342 to be textured into sub-patches 344 as shown in FIG. 5. Such a technique does not require any knowledge of depth (Z value) in the sub-patches 344. Therefore, the above problems of the far and near sense and linearity can be overcome by further fragmentizing the sub-patches 344.

In such a technique, however, the computation increases as the sub-patches are more fragmentized. When this algorithm is realized in an actual hardware, the hardware is more complicated and greatly increased in scale and load.

It is also considered that the interpolation is carried out by a quadratic function, rather than by the linear function. In such a case, the load on the hardware is more than that of the linear interpolation, but less than that of a mathematically precise technique which will be described later. The problems of the far and near sense and linearity are also improved, but will not perfectly be solved. Further, the texture fragmentization algorithm can be used to more improve the far and near sense and linearity. In such a case, however, the aforementioned inverse affection of the texture fragmentation algorithm becomes more remarkable.

The linear or quadratic functional interpolations are made by approximate calculation. On the contrary, a mathematically precise technique is further considered which may determine a relational expression between the coordinates X, Y and Z of vertices of a polygon to be subjected to perspective transformation and the texture coordinates in a polygon to be interpolated, the resulting relational expression being then used to interpolate the texture coordinates to be determined. However, such a relational expression is a complicated fractional function. If such a complicated fractional function is to be realized in a hardware, the load on the hardware will greatly be increases.

A technique for maintaining its mathematical precision and also for reducing the calculation is known from SHIBA-MOTO Takeshi and KOBAYASHI Makoto, "Texture Mapping (1)" in *The Collected Papers of Thirty-First Information Processing Institute Lecture*, Information Processing Institute, Sep. 9, 1985. Such a technique inversely perspectively transforms the perspective-transformed representing coordinates of each vertex in a polygon into values prior to the perspective transformation. The texture coordinates corresponding to each vertex are used to determine a "transformation matrix" for transforming the representing coordinates prior to the perspective transformation into texture coordinates. Representing coordinates of all the dots in the polygon are then subjected to the inversely perspective transformation and the transformation matrix is used to determine texture coordinates. Such a technique can greatly reduce the calculation. However, the hardware will more be loaded by the calculations for determining the transformation matrix and texture coordinates.

In accordance with the prior art, it is thus very difficult to provide an image synthesizing system which can prevent the far and near sense and linearity of the image from being damaged while reducing the load on the hardware.

The inventors recognized that the disadvantages of the prior art results from the face that only the X- and Y-axis coordinates are subjected to the perspective transformation, but the Z-axis and texture coordinates TX and TY are not subjected to the perspective transformation. It is believed that such a difference provides a non-linear relationship between the five coordinates, leading to the above disadvantages of the prior art.

The present invention is directed to provide a novel texture mapping technique in which the perspective transformation is performed not only to the X- and Y-axis coordinates but also to the coordinate system of Z, TX and TY to provide a linear relationship between the five coordinates. Thereafter, the texture mapping is carried out by performing the linear interpolation on the coordinate systems. To realize such a technique on a hardware, image data of vertices given to each vertex of a polygon are perspectively transformed and then linearly interpolated to determine image data relating to a displayed scene at each dot (pixel).

Therefore, the technique of the present invention only requires the perspective transformation of each vertex in a polygon, which is a calculation providing a heavy lead on the hardware, to reduce the number or calculations. The image data of each dot in a displayed scene requiring the maximum number of calculations or the maximum data to be computed can be calculated by the linear interpolation. No transformation from representing coordinates to texture coordinates is required. Therefore, the transformation matrix is also not required. As a result, the lead on the hardware can be reduced by the present invention more greatly than in the texture mapping of the prior art. At the same time, an image data improved in quality can be formed without damage of the far and near sense and linearity.

FIG. 6 shows the concept of the perspective transformation. The perspective transformation is to project a three-dimensional image onto a two-dimensional screen 306, with the X- and Y-coordinates being transformed by transformation formulas:

$$X^* = M \times (h/Z)$$

and $$Y^* = Y \times (h/Z).$$

where h is a distance between a view point which is an origin in a coordinate system and the plane of the screen and X and Y as well as $X^*$ and $Y^*$ are linear.

When the concept of the perspective transformation is further generalized, the following general formula will be introduced. It is now assumed that a new coordinate W is linear with the coordinate X or Y. It is also considered that the transformation of the coordinate W to a coordinate $W^*$ to make the coordinates $W^*$, $X^*$ or $W^*$, $Y^*$ linear is a perspective transformation of W. Thus, the general formula is:

$$W^* = pW/Z + q/Z + r$$

where p, q and r are arbitrary constants.

When the texture coordinates, Z-axis coordinate and brightness data are applied to this coordinate W, all the coordinates can be linearized. For the texture data TX, TY and the other surface data, for example, brightness data BRI, the following definition may be established when p is equal to h and q and r are equal to zero:

$$Tx^* = Tx \times (h/z);$$

$$Ty^* = Ty \times (h/z);$$

and $$BRI^* = BRI \times (h/z).$$

By these definitions, perspective transformation factors (h/z) for (X,Y) and that for (Tx,Ty) and BRI get identical. If the similar procedure is carried out to the perspective transformation of Z, the coordinate $Z^*$ will undesirably be equal to the constant h. Therefore by setting p=r=o, q=h, it can be defined that:

$$Z^* = h/Z$$

This coordinate is exactly a multiplier factor for perspective transformation in the other coordinate system. This is convenient on design. Namely, it is only required that the coordinate Z is first subjected to the perspective transformation to form a new coordinate, which is in turn used as a multiplier factor perform the perspective transformation in the other coordinate systems.

2. Technique 2

The reduction of image quality when a 3-D image is transformed into a pseudo 3-D image is raised by a matter of brightness in addition to the aforementioned matters of far and near sense and linearity.

An image synthesizing system of the above type normally outputs a pseudo 3-D image in which the brightness data of each of its dots is calculated and synthesized with other calculated color codes when it is finally displayed on CRT or the like. A problem is particularly in the continuity of brightness data. In many cases, there may be desired that an object having its surface defined by pseudo curves, that is, by a plurality of polygons is expressed in a screen to have a rounded surface. In the image synthesizing system of the prior art in which each of the polygons defining the object has its own brightness data, the "rounded surface" of the object can be displayed in the screen only when the polygons have a continuous brightness data which can remove the boundary between adjacent polygons from the displayed scene.

If the surface of an object has a bright part irradiated by an illumination and another dark part spaced farther apart from the illumination, it may be desired that the change of brightness between the bright and dark surface parts is gently expressed. In such a case, the gentle change of brightness can be obtained only when the brightness data at the boundary is continuous.

Figure 7A:
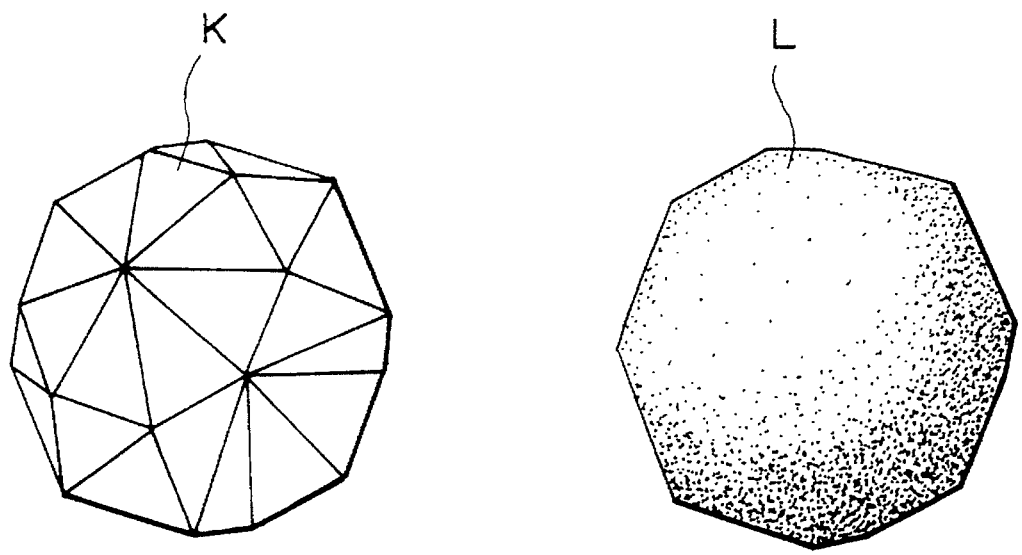

A technique known as Gouraud shading may be used to provide a continuity in brightness data. In such a technique, the brightness data is given to each vertex in a polygon. The brightness data is linearly interpolated to calculate brightness data at each dot in a displayed scene. Gouraud shading can synthesize the image of a 3-D object K expressed by a polyhedron of polygons as a 3-D object having rounded boundaries between adjacent polygons, as shown in FIG. 7A.

However, the inventors found that a problem similar to that in the perspective transformation of said texture mapping is raised in the linear interpolation to the brightness data. This will be described with reference to FIGS. 3A–3C.

It is now assumed in FIG. 3A that brightness data is given to each of vertices A, B, C and D in a polygon. If the linear interpolation is merely carried out no determine a brightness at a point M, brightness values at the points C and D will be averaged to determine an average brightness which is decided as a brightness at the middle point M on the side CD. When a 3-D image is to be perspectively transformed into a pseudo 3-D image, a dot to have the actually determined brightness on the scene should be at a point F (FIG. 3C) nearer the point D than the middle point E (FIG. 3B). In other words, the formed image will have its brightness data different from the actual brightness data to be displayed when the brightness data is merely processed by the liner interpolation. Thus, the brightness at the middle point E on the side CD shown in FIG. 3B remains at a level equal to the average brightness value between those of the points C and D even if the polyhedron 334 is subjected to rotation or other treatment to change its depth data (Z value). This does not provide an actual sense relating to the rotation of the polyhedron.

This problem is due to the same cause as in the technique 1. The merely linear interpolation causes X- and Y-coordinates to be subjected to the perspective transformation, but not causes the brightness data to be subjected to the perspective transformation. Therefore, the linear relationship between these coordinate systems will not be maintained. The present invention first performs the perspective transformation of brightness data at each vertex in a polygon, the transformed brightness data being then subjected to the linear interpolation to determine brightness data at each dot (pixel).

The technique 2 can faithfully reproduce the brightness to be observed in the actual 3-D object with improvements of the far and near sense and linearity in the texture mapping technique described in connection with the technique 1. This enables the image to be reproduced with improved quality and reality.

The technique 2 is further advantageous in that the load on the hardware can be reduced in addition to the increase of image quality. First, the technique 2 can process rendering data including the brightness data and so on by the use of a hardware having the completely same structure as in the hardware for computing the coordinates TX and TY. If such a hardware is formed into an LSI unit, the rendering data including the data of TX and TY coordinates and brightness data and other data can be calculated by the same type of LSI units. Therefore, LSI units can be developed and mass-produced more inexpensively. Second, the control circuit and signal of the hardware can be common to various calculating circuits without need for additional control circuit and signal. This reduces the load on the hardware. Finally, the technique 2 can calculate the brightness data and the TX and TY coordinates in parallel. Such parallel operations enables the brightness data to be processed without affection to the drawing speed of all the image data. This also reduces the load on the hardware.

3. Technique 3

Figure 7B:
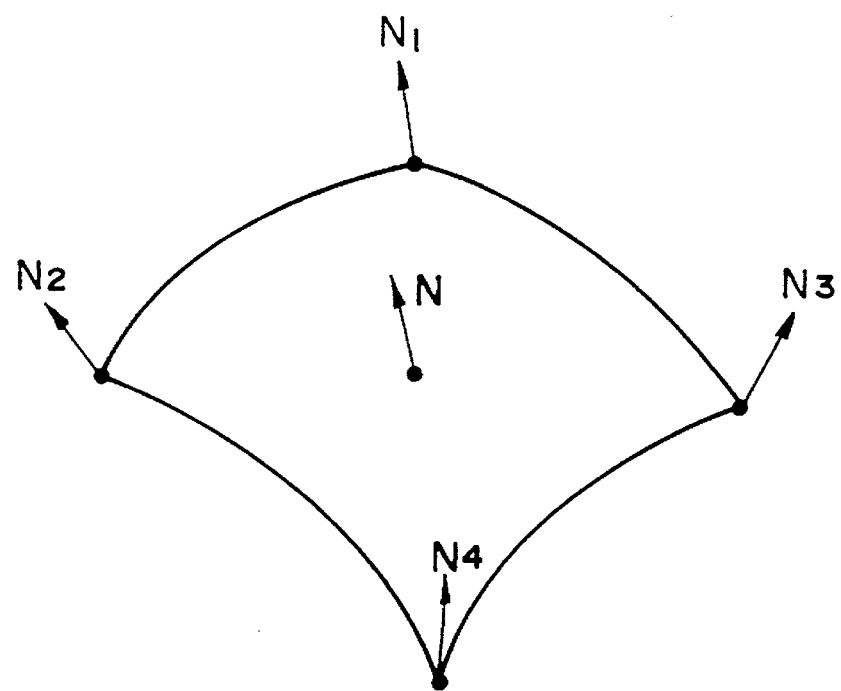
FIG. 7B is a diagrammatic view illustrating the formation of a pseudo curve by normal vectors.

In order to express "rounded surface" in a 3-D object, there may be used a technique which is known as Phong shading that provides a power of expression superior to that of Gouraud shading. Phong shading technique determines brightness data on the surface of an object as in Gouraud shading technique, but not directly determines it. Phong shading indirectly determines surface shape data or normal vector data. Normal vectors N1–N4 are given to the respective vertices of a polygon, as shown in FIG. 7B. These normal vectors N1–N4 are linearly interpolated in the same manner as in Gouraud shading to determine a normal vector N on a displayed scene at each dot, the determined normal vectors N being then used to form a pseudo curve.

Once the normal vector N at each dot is determined, various expressions can be realized depending on selection of lighting models. In other words, each lighting model has been determined by a given operational formula. The normal vector N in the polygon at each dot is substituted into the operational formula which in turn calculate the brightness at the corresponding dot. As a result, various expressions can be made depending on the setting of the operational formula for every lighting models. The lighting models are various settings of lighting such as the number of light sources, specular reflection, diffuse reflection, surrounding light and so on. For example if a lighting model is given to have a property of a specular reflection where an incident light is reflected strongly with an angle of reflection equal to an angle of incidence, a bright area called "highlighted area" is produced on the surface of the object to provide a gloss which would not be obtained by Gouraud shading.

However, the Phong shading raises the same problem as in Gouraud shading. That is, since the normal vectors are determined simply by the linear interpolation, they are different from those obtained by perspective-transformed normal vectors distributed on the actual 3-D object to be used in the scene. If such an object is rotated, the rule of interpolation will vary to provide a sense that the configuration of the pseudo curve varies. Such an unnaturalness becomes more remarkable than Gouraud shading since Phong shading is inherently richer in the power of expression.

As in the technique 2, the technique 3 also determine normal vector data at each dot by first subjecting the normal vector in a polygon at each vertex to the perspective transformation and then using the perspective-transformed normal vector at each vertex. The determined normal vector at each dot is further used to determine brightness at each dot using a given lighting model. Even if the object is rotated, thus, the brightness therein can more faithfully be expressed with improvement of the reality.

4. Technique 4

The technique 1 utilizes the color data as texture data to be applied to the polygon. In addition to such texture data, one may take all types of rendering data in the present invention. For example, surface shade data may be applied to the polygon. Such a mapping technique is known as bump mapping. The bump mapping can apply a crater-like mapping to a 3-D object M, as shown by L in FIG. 8.

The technique 4 has the surface shape data as texture data. One example of the surface shape data is the displacement of normal vector. The technique 4 determines a normal vector at each dot by adding the displacement of the normal vector determined for every dot to the normal vector determined for every polygon. In such a case, the displacement of the normal vector for every dot is calculated in the same manner as in the technique 3. Thus, an image can be synthesized with increase of the reality even if the object is rotated.

5. Basic Arrangement and Concept

Figure 2A:
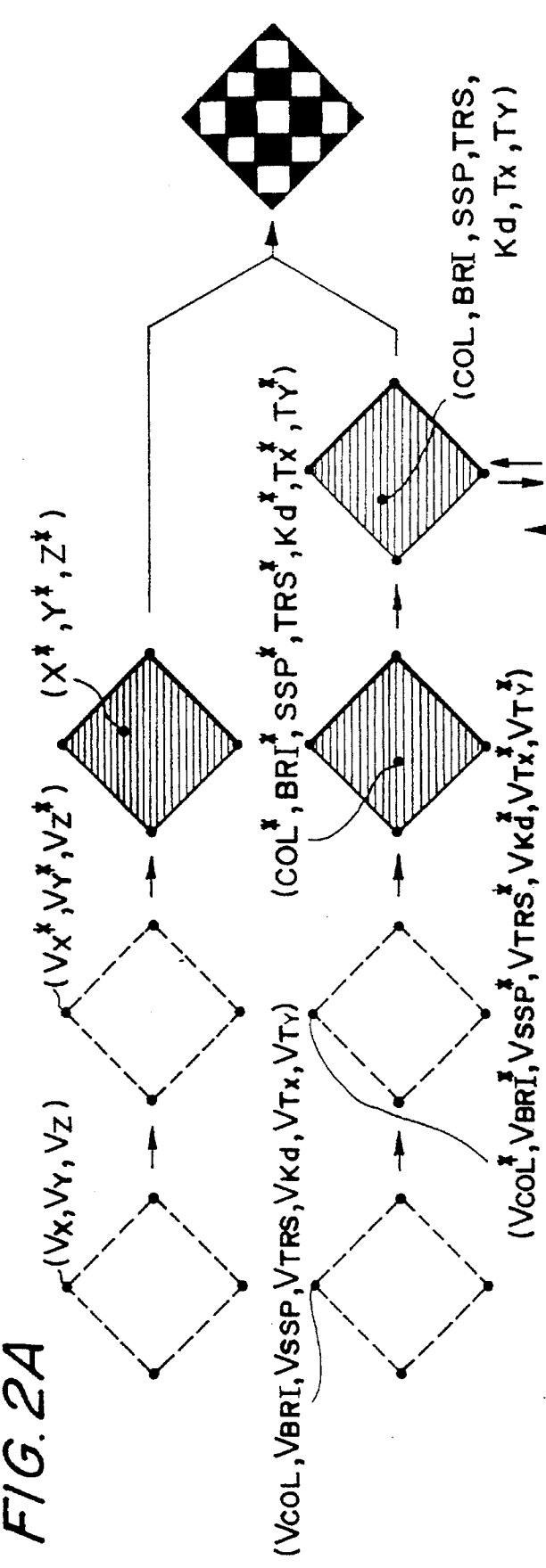
FIGS. 2A and 2B are diagrammatic views illustrating the basic structure and concept of the image synthesizing system of the present invention.
Figure 2B:
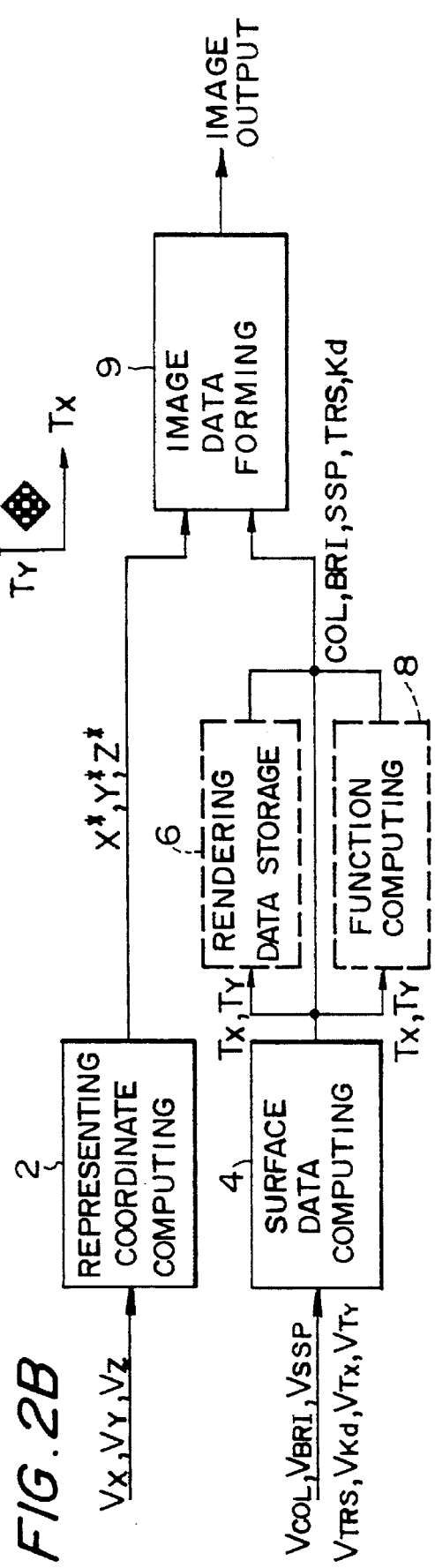

In order to realize the above techniques 1 to 4, the present invention provides an image synthesizing system having such a basic arrangement as shown in FIG. 2B. The basic arrangement of the image synthesizing system will now be described with its basic concept with reference to FIGS. 2A and 2B.

The four techniques have been described as to color, brightness and surface shape data which may be used as rendering data for forming an image on the surface of an object. However, the image synthesizing system of the present invention may use all rendering data besides the aforementioned rendering data. More particularly, the rendering data, which may be used in the image synthesizing system of the present invention, includes color data COL, brightness data BRI, surface shape data SSP, transparency data TRS, diffuse reflectance data Kd and so on.

For example, with the rendering data being transparency data TRS, a misty object having transparent and semi-transparent parts gradually variable between each other can be expressed by the image synthesizing system. If the rendering data is diffuse reflectance data Kd, an object having parts different in loss can be expressed by the image synthesizing system.

As shown in FIG. 2B, the image synthesizing system of the present invention comprises a representing coordinate computing unit 2 which receives representing coordinates VX, VY and VZ representing each vertex in a polygon. The representing coordinates VX, VY and VZ are perspectively transformed into perspective-transformed representing coordinates VX*, VY* and VZ* by the representing coordinate computing unit 2, as shown in FIG. 2A. The letter "V" represents that a coordinate following this letter "V" is a numerical value given to the corresponding vertex in the polygon while the symbol "*" represents that the coordinate is a numerical value obtained from the perspective transformation.

The representing coordinate computing unit 2 linearly interpolates the perspective-transformed representing coordinates VX*, VY* and VZ* for each vertex no determine perspective-transformed representing coordinates X*, Y* and Z* for each of dots defining the polygon, which coordinates are in turn outputted to an image data forming unit 9. The above description treats the coordinate Z representing the depth of the polygon as one representing coordinate at the representing coordinate computing unit 2. However, the coordinate Z can be also treated as a rendering data which will be computed by a surface data computing unit 4 which will be described.

It will first be described that the surface data computing unit 4 directly uses the rendering data as surface data to be computed therein.

In such a case, the surface data computing unit 4 receives color data VCOL, brightness data VBRI, surface shape data VSSP, transparency data VTRS and diffuse reflectance data VKd for each vertex. The surface data computing unit 4 calculates these rendering data into perspective-transformed rendering data VCOL*, VBRI*, VSSP*, VTRS* and VKd* for each vertex which are in turn linearly interpolated to determine perspective-transformed rendering data COL*, BRI*, N*, TRS* and Kd* for each dot in the polygon. Thereafter, these perspective-transformed rendering data are inversely perspective-transformed into rendering data COL, BRI, N, TRS and Kd which are in turn outputted to the image data forming unit 9.

Finally, the image data forming unit 9 forms image data from the perspective-transformed representing coordinates and rendering data, the image data being then used to output a pseudo 3-D image.

Texture coordinates TX and TY which are used by the surface data computing unit 4 as surface data will be described. In such a case, the image synthesizing system comprises a rendering data storage unit 6 and a function computing unit 8, as shown in FIG. 2B.

The rendering data storage unit 6 has stored preselected rendering data at addresses specified by the texture coordinates TX and TY. Such rendering data may include color data, brightness data, surface shape data, transparency data, diffuse reflectance data and so on. These image data can be read out from the rendering data storage unit 6 by specifying the texture coordinates TX and TY.

The function computing unit 8 is composed of logic-arithmetic and other circuits for computing a predetermined function of texture coordinates TX and TY. Thus, the desired rendering data corresponding to the texture coordinates TX and TY can be outputted from the function computing unit 8.

When it is to synthesize an image using the rendering data storage unit 6 and function computing unit 8, the surface data computing unit 4 receives texture coordinates VTX and VTY for each vertex, as shown in FIG. 2B. The surface data computing unit 4 performs various computations including the perspective transformation, linear interpolation, inverse perspective transformation as described for those texture coordinates VTX and VTY for each vertex. The resulting texture coordinates TX and TY for each dot in the polygon are then supplied to the rendering data storage unit 6 and function computing unit 8. These units 6 and 8 will obtain the desired rendering data from these texture coordinates TX and TY, which data are then supplied to the image data forming unit 9.

By executing such computations, the image synthesizing system can synthesize an image improved in quality without degradation of the far and near sense and linearity. Further, a single hardware can be used to perform the simultaneous computation of various rendering data including color data, brightness data, surface shape data and so on. Therefore, only a single type of LSI units are required with common control circuit and other components. This enables the hardware to be manufactured greatly inexpensively.

B. First Embodiment

1. Summary of First Embodiment

Figure 1B:
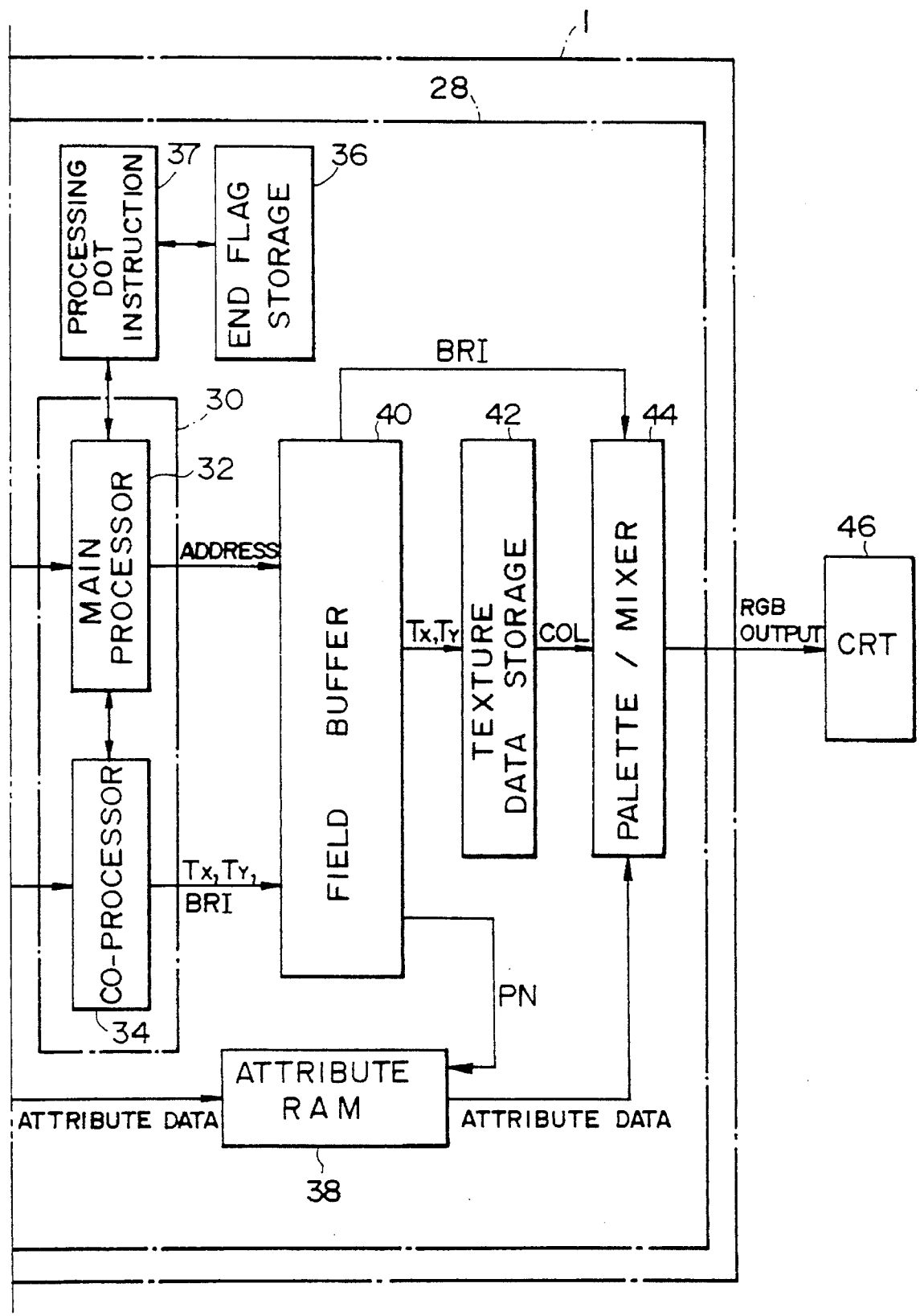
FIG. 1 is a block diagram, split into FIGS. 1A and 1B, of the first embodiment of an image synthesizing system constructed in accordance with the present invention.

FIG. 1 shows a block diagram of the first embodiment of an image synthesizing system constructed in accordance with the present invention.

The first embodiment comprises a texture data storage unit 42 corresponding to the rendering data storage unit 6. The texture dais storage unit 42 has stored the color data COL among the rendering data using the texture data TX and TY as addresses. The color data COL is formed by being read out from the texture data storage unit 42 in accordance with the texture coordinates which are computed by the surface data computing unit. On the other hand, the brightness data BRI among the rendering data is computed directly by the surface data computing unit.

The perspective transformation of the representing coordinates VX, VY and VZ for each vertex of a polygon is performed by a perspective transformation unit 20. The linear interpolation from the perspective-transformed representing coordinates VY* for each vertex is performed at a main processor 32. Perspective-transformed representing coordinates X* and Y* are thus determined to address a field buffer unit 40.

Various computations including the perspective transformation, linear interpolation and inverse perspective transformation of the texture coordinates VTX, VTY and brightness data VBRI for each vertex is executed at a co-processor 34. One of the perspective-transformed representing coordinates VZ* for each vertex will be used to perform these computations.

(1) Summary of Structure

As shown in FIG. 1, the image synthesizing system of the first embodiment comprises an operator's control unit 12, a game space processing unit 13, an image synthesizing unit 1 and a CRT 46. The image synthesizing unit 1 comprises an image supply unit 10 and an image forming unit 28. The following description will be made in connection with a 3-D game.

The game space processing unit 13 sees a game space in accordance with a game program stored in a central processing unit 14 and control signals from the operator's control unit 12. More particularly, game space setting data defined by various data including the position and direction of a 3-D object (e.g. enemy airplane, mountain, building or the like), the position and visual direction of a player and so on is calculated by the game space processing unit 13 and then outputted to the image supply unit 10 in the image synthesizing unit 1.

The image supply unit 10 performs a computation in accordance with the game space setting data. More particularly, a processing unit 15 first reads out the 3-D image data of a 3-D object to be arranged in the game space from a 3-D image data storage unit 16. The processing unit 15 then outputs the 3-D image data with position and direction data to a coordinate transforming unit 18. Subsequently, the coordinate transforming unit 18 performs the coordinate transformation from the absolute coordinate system to the view coordinate system. Clipping unit 19, perspective transformation unit 20 and sorting unit 22 then perform clipping, perspective transformation and sorting, respectively. The image data of the vertices in the processed polygon are supplied to the image forming unit 28.

In such a case, the image supply unit 10 outputs the representing coordinates VX*, VY* and VZ* for each vertex in the perspective transformed polygon and the texture coordinates VTX, VTY and brightness data VBRI corresponding to each vertex in the polygon. The image supply unit 10 also outputs an attribute data or palette number PAL which is a common image data to all the dots in the polygon, and the other data.

Figure 22:
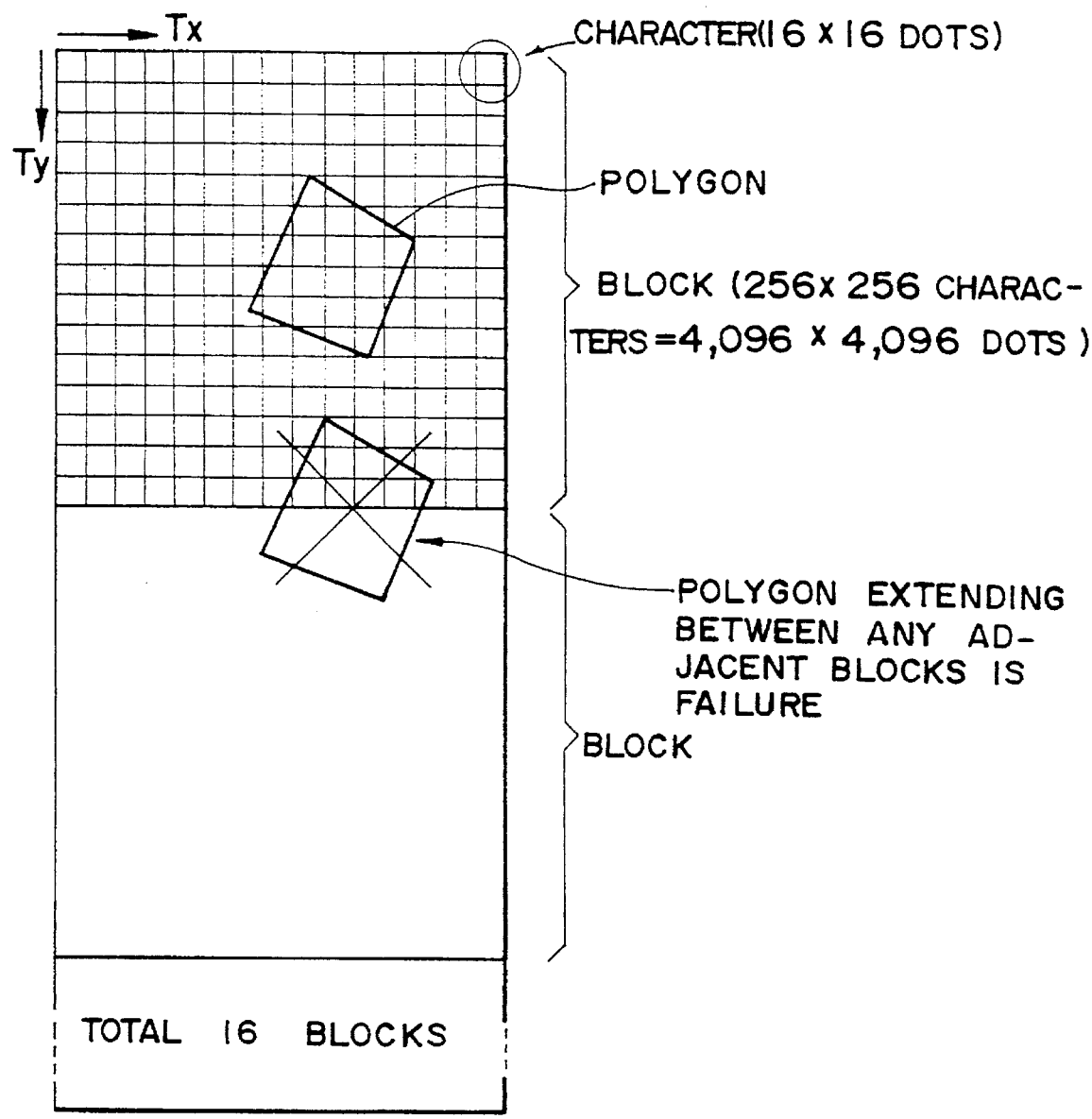
FIG. 22 is a diagrammatic view illustrating a texture storage plane.

The texture coordinates VTX and VTY for each vertex are no address texture data (rendering data) no be applied to the polygon. More particularly, the texture coordinates specifies an address in the texture data storage unit 42 of FIG. 1. The plane of texture storage defined by the texture data storage unit 42 is of such a structure as shown in FIG. 22. The plane of texture storage has stored texture data to be applied to polygons. Since the texture data are limited to color data in the first embodiment, they are image data shown by the textures 336 and 338 of FIG. 40, for example, image data relating to patterns, pictures, photographs and so on. In the first embodiment, the texture mapping is carried out by reading the texture data through the texture coordinates and mapping the read textured data to the respective dots in the polygon. The mapping of the texture data to the respective dots of the polygon is performed by specifying only texture coordinates corresponding to each vertex in the polygon. The mapping of the texture data to dots other than the vertices may be made by interpolating the texture coordinates for each vertex to determine texture coordinates to be applied to the other dots and by reading out texture data through the interpolated texture coordinates.

The sorting unit 22 performs a process for permuting the image data for the vertices of the polygons according to the output priority. More particularly, the sorting unit 22 outputs the image data of the polygons sequentially starting from the closest polygon to the view point in the displayed scene. Therefore, the computation in the image forming unit 28 will be initiated from the closest polygon to the view point.

The image forming unit 28 comprises a processor unit 30, an end flag storage unit 36, a processing dot instruction unit 37, an attribute RAM unit 38, a field buffer unit 40, a texture data storage unit 42 and a palette/mixer circuit 44.

The processor unit 30 comprises a main processor 32 and a co-processor 34. The main processor 32 receives perspective-transformed representing coordinates VX* and VY* for the respective vertices in accordance with the priority. Further, the co-processor 34 receives perspective-transformed representing coordinate VZ*, texture coordinates VTX, VTY and bright data VBRI for the respective vertices. Attribute data common in each of the polygons is inputted into the attribute RAM unit 38.

The main processor 32 is adapted to subject the perspective-transformed representing coordinates VX* and VY* to the linear interpolation so that perspective-transformed representing coordinates X* and Y* for all the dots defining a polygon are calculated.

The co-processor 34 linearly interpolates perspective-transformed representing coordinates VZ* for the respective vertices and perspectively transforms texture coordinates VTX, VTY and brightness data VBRI for the respective vertices before they are linearly interpolated. Thus, perspective-transformed representing coordinates Z*, perspective-transformed texture coordinates TX*, TY* and perspective-transformed brightness data BRI* are calculated by the co-processor 34 using the results from the main processor 32.

Next, the perspective-transformed texture coordinates TX*, TY* and perspective-transformed brightness data BRI* are inversely perspective-transformed into texture coordinates TX, TY and brightness data BRI utilizing the perspective-transformed representing coordinates Z* before the texture coordinates and brightness data are outputted from the co-processor 34. Such an inverse perspective transformation is required since texture coordinates not subjected to perspective transformation are required to read out texture data from the texture data storage unit 42.

The main processor 32 is connected to the processing dot instruction unit 37 which is in turn connected to the end flag storage unit 36. The processing dot instruction unit 37 and end flag storage unit 36 serve to omit the step of processing dots that have been processed and painted. More particularly, in the first embodiment, polygons are drawn one by one, starting from the closest polygon to the view point. Therefore, the step of processing dots, that have been drawn and painted, is not required until the next field drawing is carried out. By reducing steps in this manner, the number of computations can greatly be reduced to relieve the load on the hardware.

The storage plane defined by the end flag storage unit 36 is placed against dots on the displayed scene in one-to-one correspondence. An end flag of one bit for every dot is stored in the end flag storage unit 36. The end flag is used to display whether or not the corresponding dot has been processed. More particularly, when a dot has been processed, "1" is written in the processing dot instruction unit 37, for example. The processing dot instruction unit 37 monitors the end flags at all times. The processing dot instruction unit 37 indicates that a dot having its end flag "1" should not be processed. Thus, the painted area of the polygon is not required to be processed, leading to great increase of the processing speed.

The field buffer unit 40 includes a video RAM that is defined by storage areas provided to dots on the display screen of a CRT 46 in one-to-one correspondence. The texture coordinates TX, TY and brightness data BRI calculated by the co-processor 34 are stored in the video RAM all the corresponding storage areas by the use of the perspective-transformed representing coordinates X* and Y* calculated by the main processor 32 as addresses. The video RAM has banks corresponding to two scenes and can perform the read step in parallel with the write step.

The readout of the video RAM is carried out in synchronism with the image display such that the texture coordinates TX, TY and brightness data BRI are outputted from the field Buffer unit 40 to the texture data storage unit 42 and palette/mixer circuit 44, respectively.

The field buffer unit 40 also includes a polygon identification number generator from which polygon identification numbers PN are outputted to and stored in the video RAM at the respective storage areas. In synchronism with the output of TX, TY and BRI from the field buffer unit 40, the polygon identification number PN are outputted to the attribute RAM unit 38 which in turn outputs attribute data common to each of the polygons (e.g. palette number and the like) to the palette/mixer circuit 44.

The texture data storage unit 42 includes a memory means (e.g. EEPROM) at the bits of which color codes COL have been stored as color data. The color codes COL are read out from the EEPROM and outputted to the palette/mixer circuit 44, using the texture coordinates TX, TY from the field buffer unit 40 as addresses.

The palette/mixer circuit 44 forms RGB data for each dot from the color code and brightness data corresponding to each dot and from the attribute data such as palette number or the like corresponding each polygon. After the formed RGB data have been subjected to gamma correction (i.e. the linearization of CRT in brightness), they are outputted to the CRT 46 wherein an image is displayed.

(2) Summary of Operation and Computation

Figure 9B:
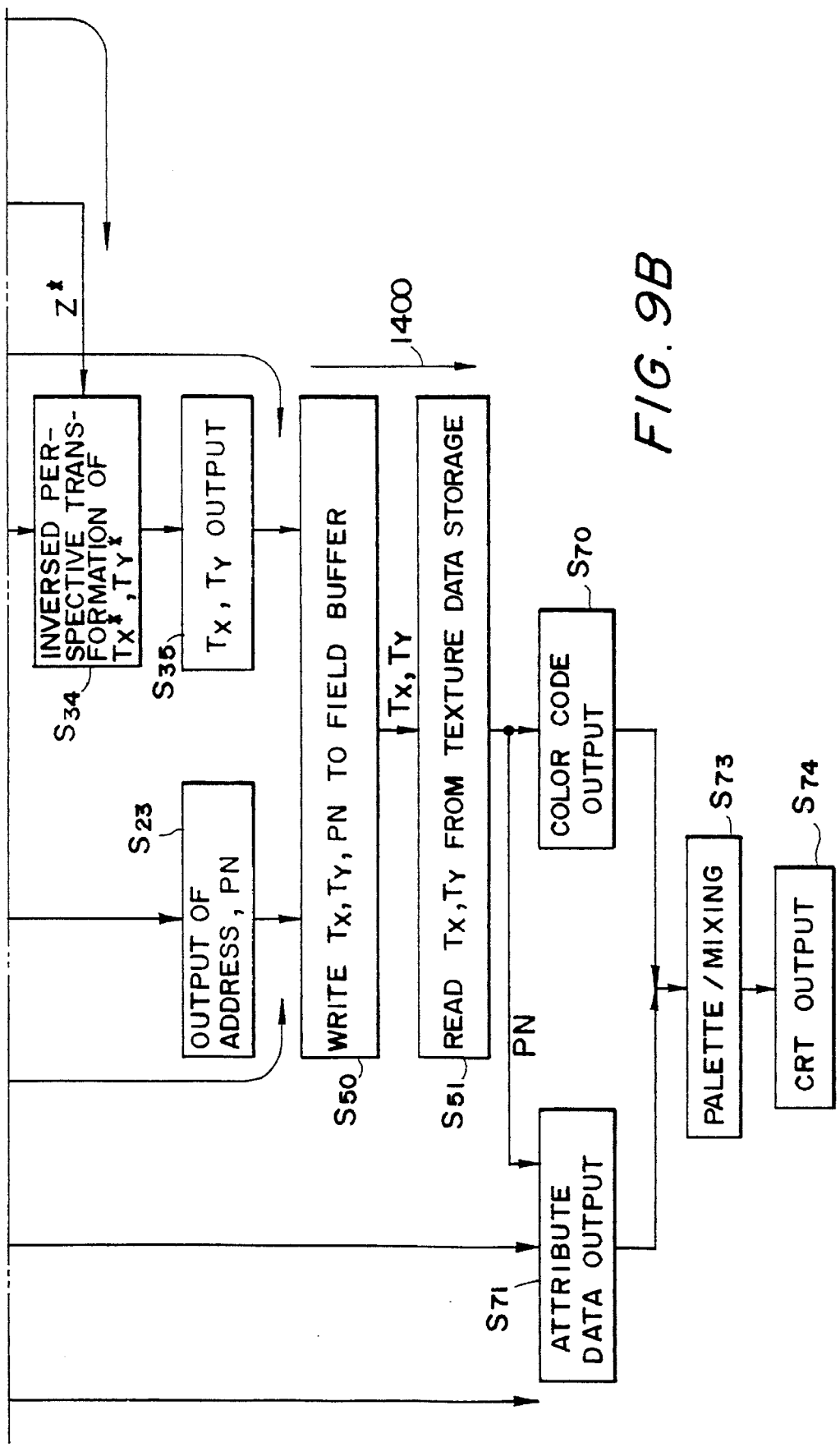
FIG. 9 is a flow chart, split into FIGS. 9A and 9B illustrating the computation of image in the image synthesizing system of the present invention.

FIG. 9 shows a flowchart illustrating the operation of the image synthesizing system according to the first embodiment. FIGS. 10A–10K visually show the computing techniques which are carried out in the flows 1100, 1200 and 1300 of the flowchart shown in FIG. 9.

The operations shown by the flow 1000 in FIG. 9 are executed by the image supply unit 10 and sorting unit 22. The sorting unit 22 outputs polygon data for each polygon. Since the polygons have already been given their priority levels, the polygon data are outputted from the sorting unit 22 according to the priority. The polygon data of each polygon includes perspective-transformed representing coordinates and texture coordinates for the vertices of that polygon.

The perspective-transformed representing coordinates VX* and VY* from the sorting unit 22 are inputted into the main processor 32 wherein the computation along the flow 1100 is executed. More particularly, left and right outline points are computed and the perspective-transformed representing coordinates X* and Y* for each dot on a scan line surrounded by the left and right outline points are also computed. These computations are repeated until all the dots defining a polygon have been processed. The resulting perspective-transformed representing coordinates X* and Y* for each dot are outputted to the field buffer 40 as write addresses. A polygon identification number PN is written in the field buffer unit 40 at its addressed area.

In parallel with the operation shown by the flow 1100, the co-processor 34 executes the other flows 1200 and 1300.

Namely, the co-processor 34 receives the texture coordinates VTX, VTY, perspective-transformed representing coordinate VZ* and brightness data for each vertex in the polygons from the sorting unit 22.

In accordance with the flow 1200, the co-processor 34 determines perspective-transformed texture coordinates VTX* and VTY* from the texture coordinates VTX and VTY for each vertex. The coordinates VTX* and VTY* are then used to compute left and right outline points, perspective-transformed texture coordinates TX* and TY* are then computed for each dot on a scan line surrounded by the left and right outline points. The computations are repeated until all the dots of the polygon have been processed.

In parallel with such computations, the co-processor 34 executes the computations along the flow 1300 to calculate perspective-transformed representing coordinate Z* for each dot.

In a step 34 along the flow 1200, the perspective-transformed texture coordinates TX* and TY* determined for each dot are inversely perspective-transformed into output texture coordinates TX and TY using the perspective-transformed representing coordinate Z*. The output texture coordinates TX and TY will be written into the field buffer unit 40 at a write address which is outputted at a step 23 along the flow 1100.

In such a manner, the texture coordinates TX, TY and polygon identification number PN will be written into the field buffer unit 40 at addresses specified by the flow 1100, that is, addresses for the respective dots defining the polygon.

In parallel with such a write operation, attribute data for the respective polygon that are outputted from the sorting unit 22 are sequentially stored in the attribute RAM unit 38 according to the flow 1500.

Such a series of operations are repeated each time when each polygon data is outputted from the sorting unit 22. Thus, the data write operation is repeated to the field buffer 40 and attribute RAM 38.

When the data write operation corresponding to one scene has terminated, the data readout operation from the field buffer 40 and attribute RAM 38 is initiated. In the first embodiment, however, each of the field buffer and attribute RAM units 40, 38 has its image data storage space corresponding to two scenes. Therefore, the write and readout operations are actually simultaneously carried out. This improves the efficiency in the process.

First, the field buffer unit 40 outputs the texture coordinates TX and TY written therein for each dot to the texture data storage unit 42 as write addresses, for example, in synchronism with the horizontal scan in the display. At the same time, the polygon identification number PN is outputted to the attribute RAM unit 38 as a write address.

Thus, the color code specified by the address is outputted from the texture data storage unit 42 to the palette/mixer circuit 44. Further, the attribute data corresponding to the polygon identification number PN is outputted from the attribute RAM unit 38 to the palette/mixer circuit 44. Thus, the palette/mixer circuit 44 outputs color data (e.g. RGB output) to the CRT 46 wherein a desired pseudo 3-D image will be synthesized and displayed.

FIGS. 10A–10K visually show the computations executed along the flows 1100, 1200 and 1200 of the flowchart, shown in FIG. 9.

As shown in FIG. 10A, texture coordinates VTa, VTb, VTc and VTd are applied to a polyhedron 48 all vertices (e.g. A, B, C and D). These texture coordinates VTa–VTd are used to address a texture data which is mapped to a polygon formed by the vertices A–D. More particularly, the texture coordinates VTa–VTd are used to specify addresses for reading out texture data which have been stored in the texture data storage unit 42 at its memory means (e.g. EEPROM or the like). Representing coordinates A–D are also applied to the vertices A–D of the polyhedron 48, respectively. Each of the representing coordinates A–D includes coordinate components X, Y and Z while each of the texture coordinates VTa–VTd includes coordinate components TX and TY. For clarity, however, each of these coordinates will be designated by a single symbol.

As shown in FIGS. 10B and 10F, the representing coordinates A–D and texture coordinates VTa–VTd for the respective vertices are perspectively transformed into perspective-transformed representing coordinates A*–D* and perspective-transformed texture coordinates VTa*–VTd*. Thus, the perspective transformation is carried out not only to the X-Y coordinate system but also to the TX–TY coordinate system, such that the linearity between these coordinate systems will be maintained.

As shown in FIGS. 10C and 10G, polygon outline points formed by the perspective-transformed representing coordinates A*–D* and perspective-transformed texture coordinates VTa*–VTd* are linearly interpolated. More particularly, coordinates L*, R* of left and right outline points and texture coordinates Tl*, Tr* of left and right outline points all of which are shown in FIGS. 10D and 10H are linearly interpolated.

As shown in FIGS. 10D and 10H, coordinates of dots on a scan line connecting the left and right outline points are linearly interpolated from the coordinates L*, R* of left and right outline points and coordinates Tl*, Tr* of left and right outline points texture.

The computations shown in FIGS. 10C, 10G and 10D, 10H are repeated until the perspective-transformed representing coordinates X*, Y* and perspective-transformed texture coordinates TX*, TY* are linearly interpolated for all the dots defining a polygon, as shown in FIGS. 10E and 10I.

As shown in FIG. 10J, inversed perspective transformation is performed on the perspective-transformed texture coordinates TX* and TY* to obtain texture coordinates TX and TY which are in turn used to read out color codes from the texture data storage unit 42.

In this manner, the color codes can be applied to the perspective-transformed representing coordinates X* and Y*. As shown in FIG. 10K, thus, an image is synthesized on the screen and the texture mapping can be performed without damage of the far and near sense and linearity.

Figure 11:
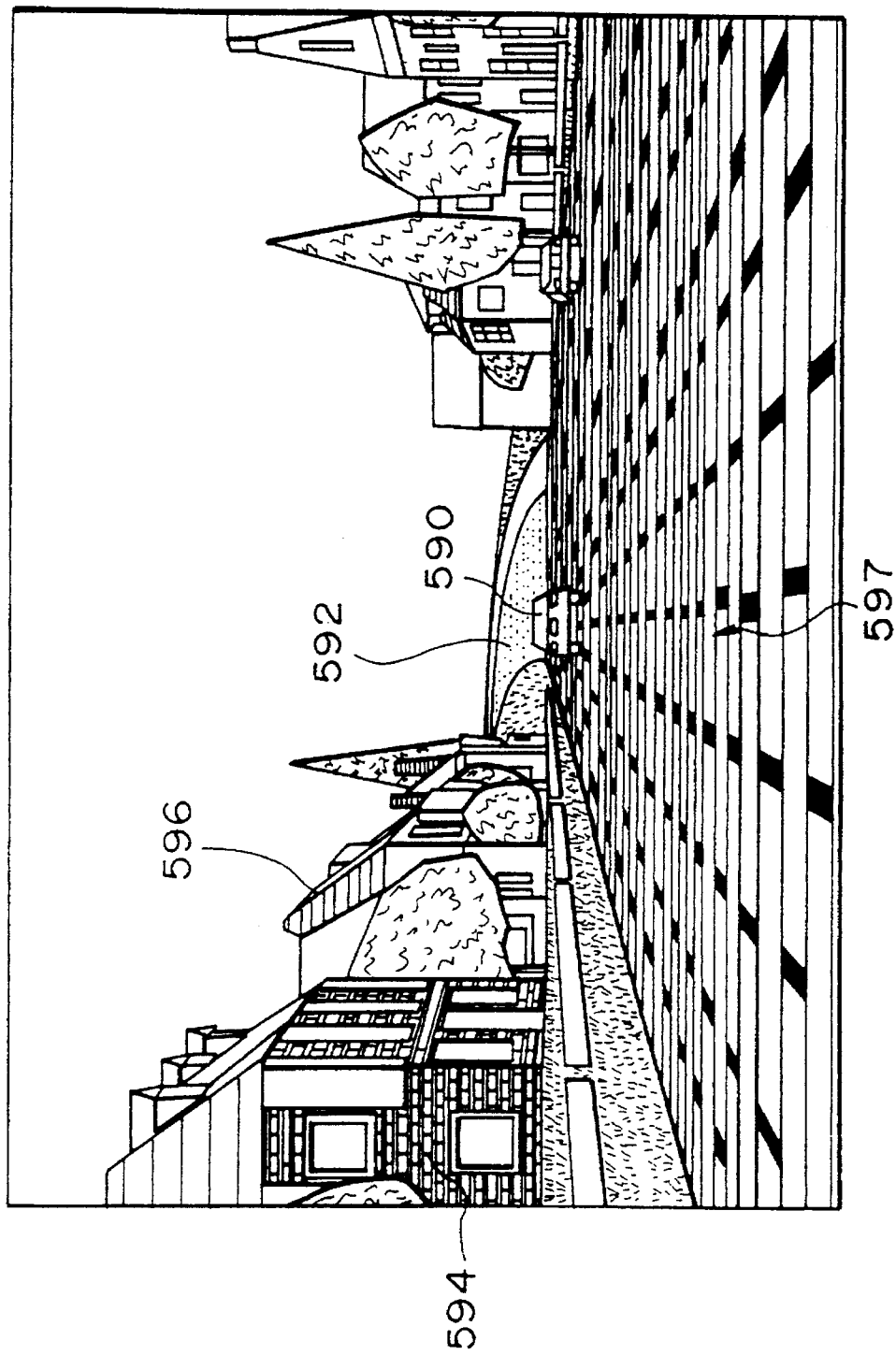
FIG. 11 is a pseudo 3-D image synthesized by the image synthesizing system of the present invention.

FIG. 11 shows a pseudo 3-D image synthesized in the above manner. As can be seen from FIG. 11, the desired texture mapping is performed at houses 594, a distant road 592, a brick-topped road 597 and others. This provides a very real image, compared with the prior art which would paint the surface of each polygon with a single color. In addition, the far and near sense and linearity of the texture mapped to the brick-topped road 597 are not degraded as can be seen from FIG. 11. In such a manner, the image synthesizing system of the first embodiment can synthesize a pseudo 3-D image greatly improved in quality and reality.

Figure 10:
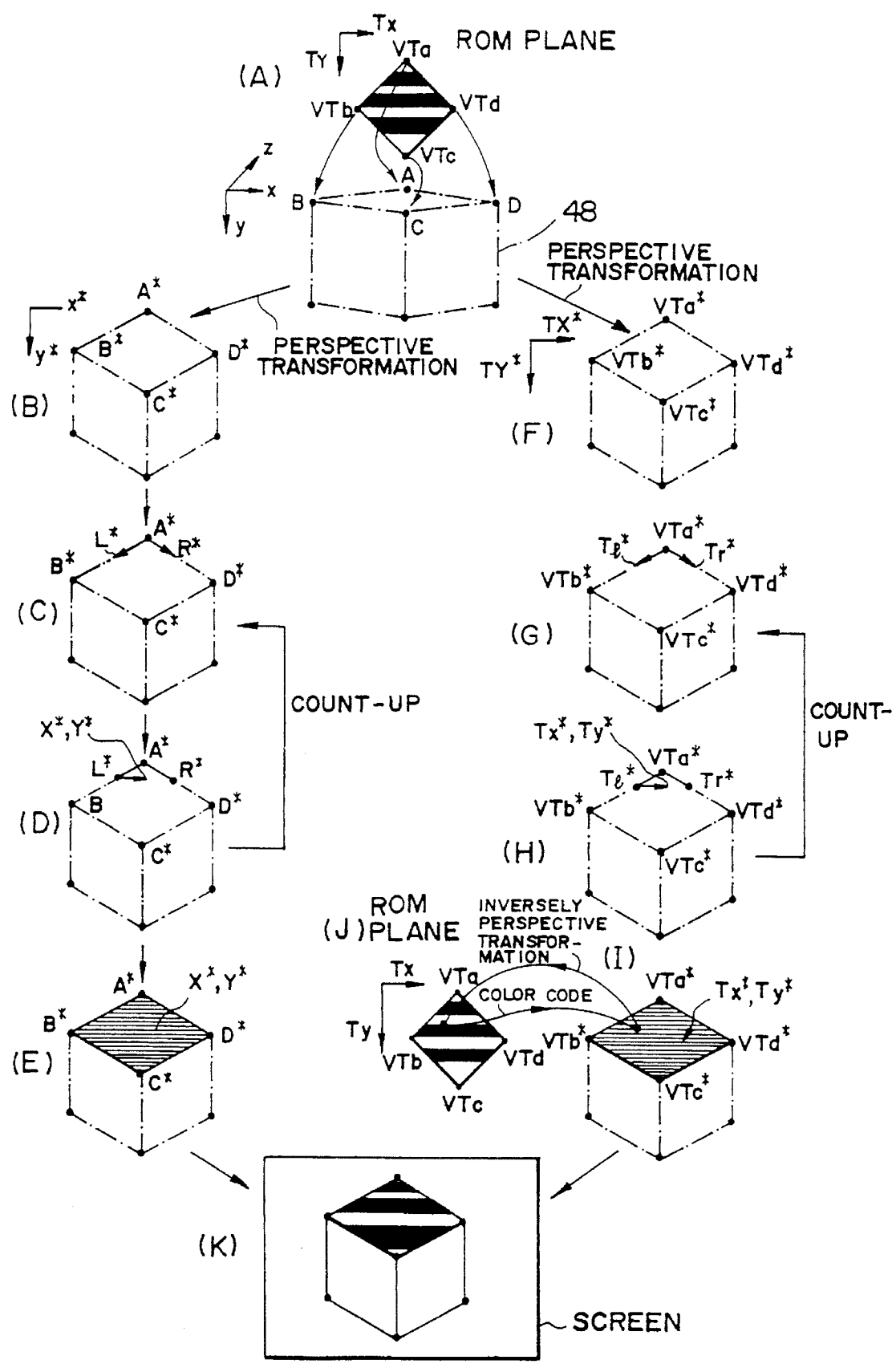
FIG. 10 is a diagrammatic view visually illustrating the concept of image computation in the image synthesizing system of the present invention.

Although FIG. 10 does not show the computation of the perspective-transformed representing coordinate Z* and brightness data BRI, they may be computed in substantially the same manner as in the computation of TX and TY in FIG. 10. The interpolation of brightness data is also carried out in the same manner as in TX and TY. Therefore, the linear relationship between these coordinate systems can be maintained to synthesize an image with a more increased reality.

Although the embodiment of FIG. 1 has been described as to the texture coordinates TX and TY being written into the field buffer unit 40 in place of the color data, the first embodiment is not limited to such a manner and may be applied to another arrangement in which the texture data storage unit 42 is located between the co-processor 34 and the field buffer unit 40, the color data (e.g. color codes) from the texture data storage unit 42 being written directly into the field buffer unit 40. Such an arrangement can synthesize an improved image as in the first embodiment.

2. Details

The first embodiment will now be described in more detail.

Although a polygon is limited to be square for simplification of the hardware, it may take any configuration.

(1) Game Space Computing Unit

The game space processing unit 13 functions to set a game space in a virtual 3-D space.

Figure 12A:
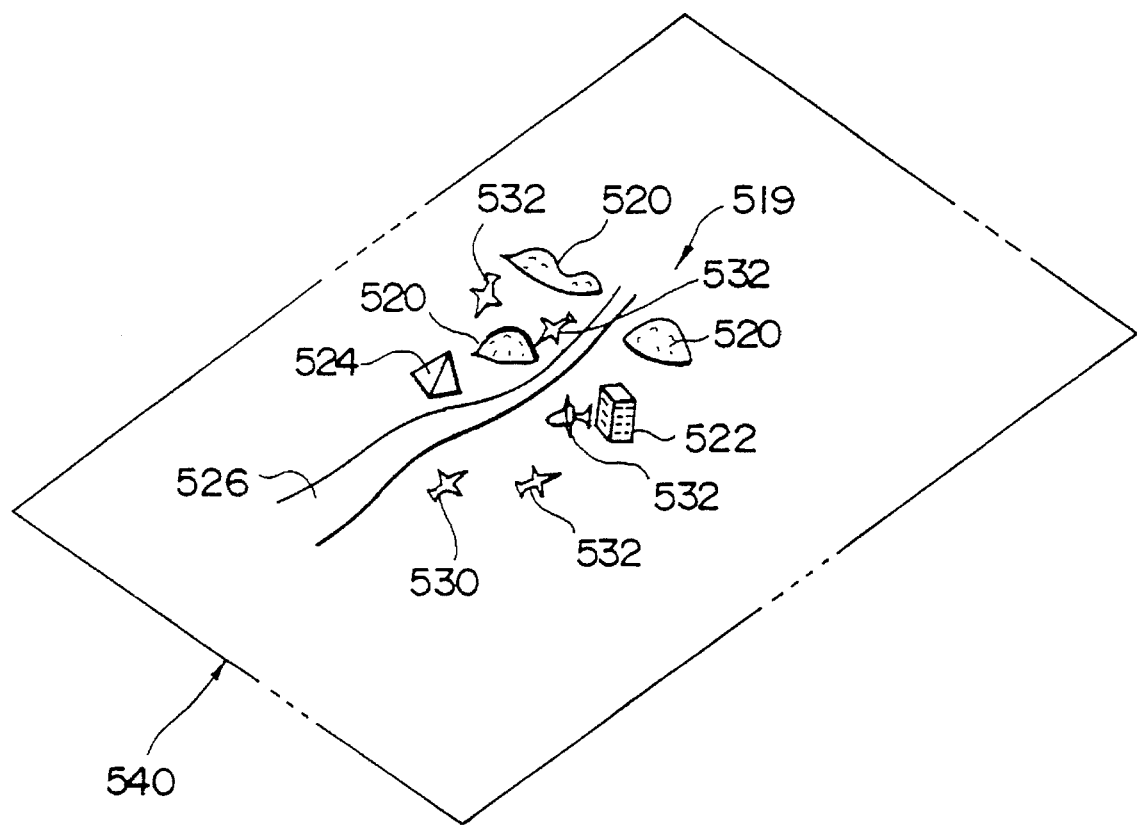
Figure 12B:
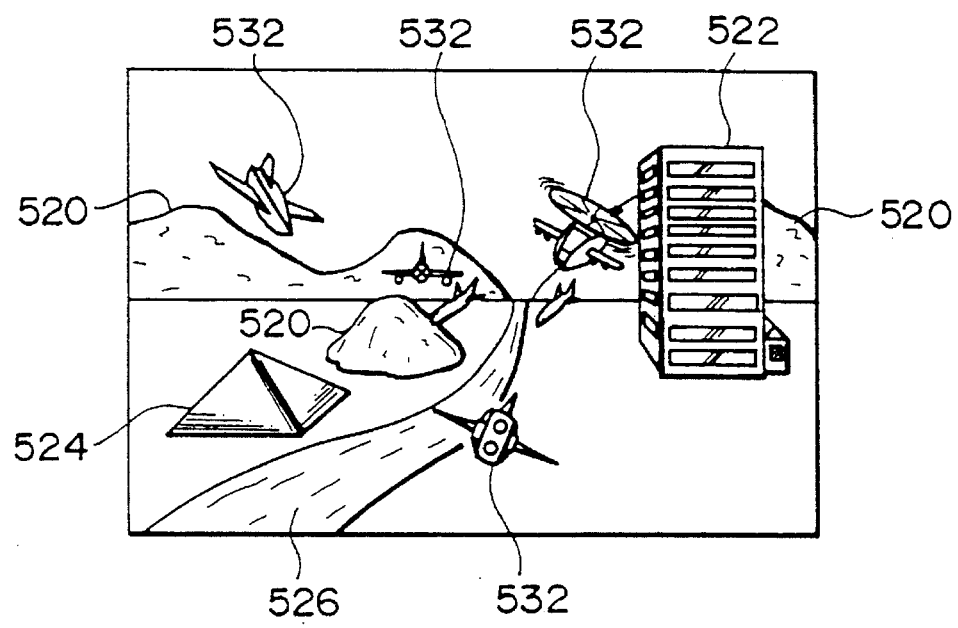
FIG. 12B is a pseudo 3-D image synthesized in FIG. 12A.

In FIG. 1, a player inputs a control signal to the game space processing unit 13 through the operator's control unit 12. FIG. 12A shows a game space which is formed in a virtual 3-D space through this 3-D game system. More particularly, the game space processing unit 13 arranges 3-D objects such as ground 519, mountain 520, building 522, encampment 524, enemy airplane 532, player's airplane 530 and the like on a game field 540 in accordance with the control signal and a game program that has been stored in the central processing unit 14. The positional and directional data of these 3-D objects are outputted to the image synthesizing unit 1 as game space setting data. In response to the game space setting data, the image synthesizing unit 1 forms a pseudo 3-D image viewed from the view point of the player. FIG. 12B shows a pseudo 3-D image which is observed from the player's fighter 530.

(2) Image Supply Unit

As described in connection with FIG. 1, the image supply unit 10 comprises the processing unit 15, the 3-D image data storage unit 16, the coordinate transformation unit 18, the clipping unit 19, the perspective transformation unit 20 and the sorting unit 22.

Figure 13:
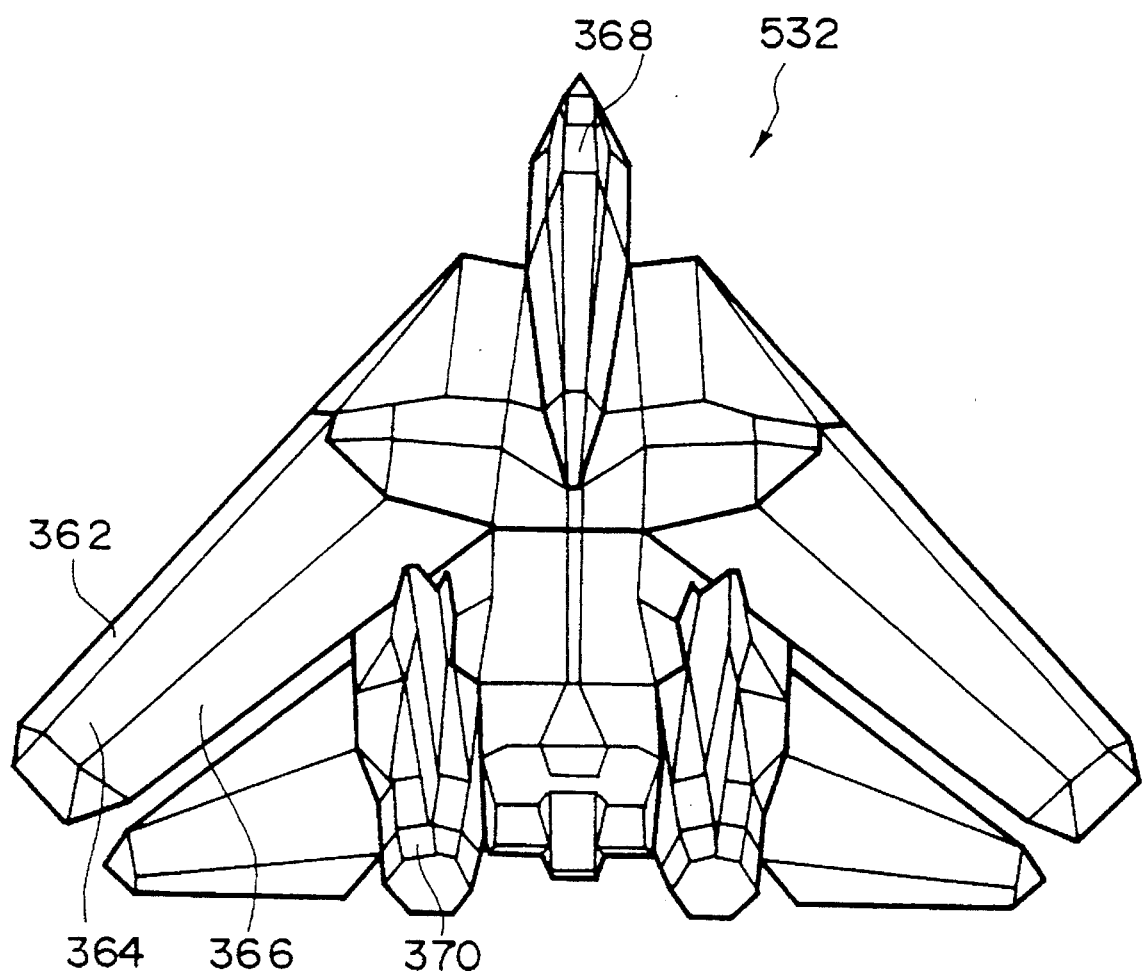
FIG. 13 is 3-D object expressed by a set of polygons.

The processing unit 15 reads out actual 3-D image data of the 3-D objects from the 3-D image data storage unit 16 in accordance with the game space setting data. The 3-D image data of the 3-D objects are divided into polygons with reflex data and associated data in the polygons. FIG. 13 shows a 3-D object expressed by divided polygons 362–368.

The processing unit 15 forms data including the readout 3-D image data in which the positional and directional data of the 3-D object set by the game space setting data are contained. Such data are then outputted to the coordinate transformation unit 18.

Figure 14:
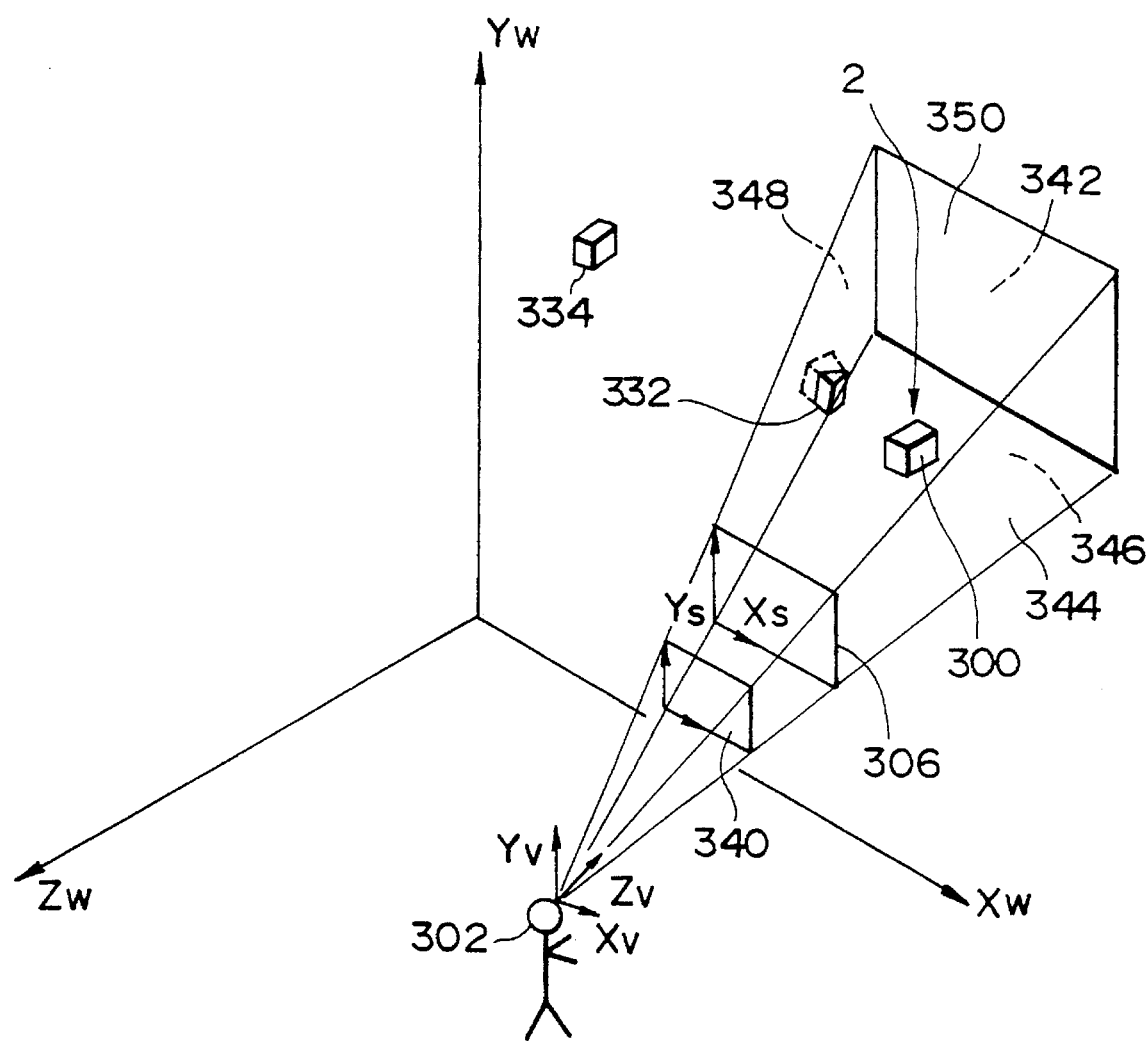
FIG. 14 is a diagrammatic view illustrating the computing process in the image supply unit.

The coordinate transformation unit 18 performs a coordinate transformation to the representing coordinates and others for every vertex in accordance with the data. If the image synthesizing system is used in a fighter game, 3-D objects 300, 332 and 334 representing player's fighter, enemy fighter, building, obstruction or the like are arranged on a virtual 3-D space expressed by a world coordinate system (XW, YW, ZW), as shown in FIG. 14. Thereafter, the image data representing these 3-D objects are shifted from the world coordinate system to a view coordinate system (Xv, Yv, Zv) in which the view point of the player 302 is taken as an origin.

The clipping unit 19 then performs a so-called clipping treatment for the image. The clipping treatment is an image processing by which image data out of the visual field of the player 302 are removed. More particularly, the clipping unit 19 removes image data out of an area (display region) enclosed by forward, rearward, rightward, downward, leftward and upward clipping faces 340, 342, 344, 346, 348 and 350 in FIG. 14. In other word, image data to be treated by the image synthesizing system are only those within the visual field of the player 302. If the clipping operation has previously removed image data other than the necessary image data, therefore, the lead on the system can greatly be reduced.

The perspective transformation unit 20 then perspectively transforms only objects within the display region onto a screen coordinate system (XS, YS), and the data is supplied to the sorting unit 22 which Is a subsequent unit.

FIG. 15 shows a table showing polygon data outputted from the perspective transformation unit 20 to the sorting unit 22.

In FIG. 15, Z representative values are used to determine the priority in the polygon treatment carried out in the sorting unit 22. More particularly, an average value for the vertices of the polygons may be set as Z representative value. Thus, the priority is decided starting from a polygon nearest the screen or having the minimum Z representative value. In accordance with the priority, the polygons will sequentially be drawn. The Z representative value is expressed by an unsigned 24-bit integer data, and divided into two words when outputted.

Palette number PAL is one that specifies a palette table and used at the palette control in the palette/mixer circuit 44 which is the final output.

Color Z value CZ is one that is used to meet color change due to variations of the depth and also utilized at the palette control in the final output or palette/mixer circuit 44.

The texture coordinates VTX, VTY are data that are given to each vertex in the polygon by one word and given to each polygon by four words in the first embodiment. The texture coordinates VTX, VTY are used to decide a texture to be applied to each polygon. The high-order four bits of the texture coordinate VTY are used to set block numbers at the texture data storage unit 42.

The perspective-transformed representing coordinates VX* (=X×h/Z) and W* (=Y×h/Z) represent the representing coordinates of each vertex in the polygon after the perspective transformation.

The brightness data BRI is of four-word structure that provides brightness data for each reflex in the polygon.

The perspective-transformed representing coordinate VZ* (=h/Z) represents a representing coordinate Z for each vertex in the polygon after the perspective transformation and comprises a 6-bit exponent part and a 15-bit fraction part. Unlike the perspective-transformed representing coordinates X, Y, the perspective-transformed representing coordinate Z is determined by taking the factor (h/Z) directly as coordinate value after the perspective transformation, rather than multiplication of the factor (h/Z) with the coordinate Z. This is because such a computation maintains the linear relationship between the X, Y and Z coordinates after the perspective transformation.

The polygon data are then outputted from the image supply unit 10 to the sorting unit 22.

(3) Sorting Unit

Figures 16, 16A:
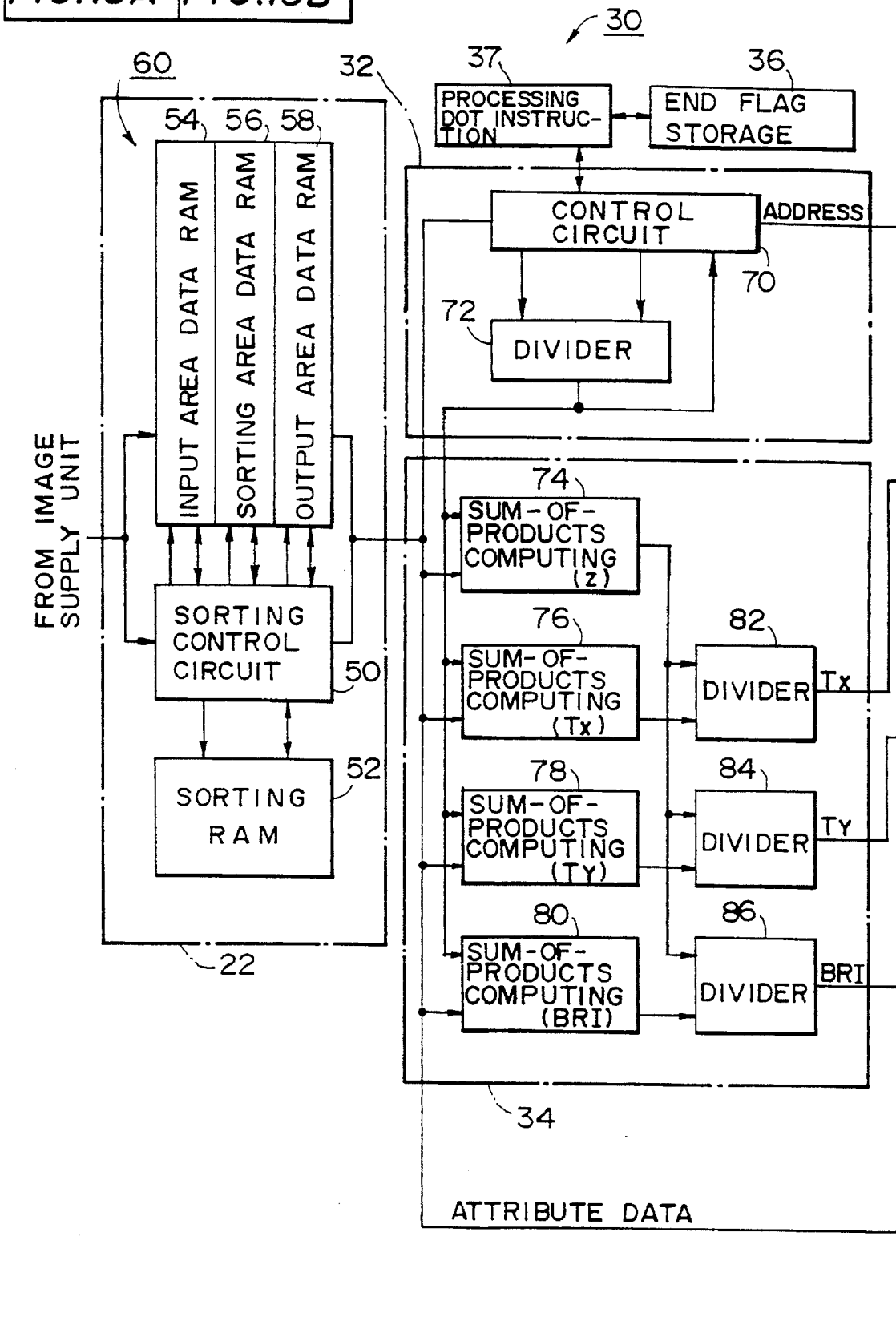
FIG. 16 is a block diagram, split into FIGS. 16A and 16B showing the details of the first embodiment of the present invention.
Figure 16B:
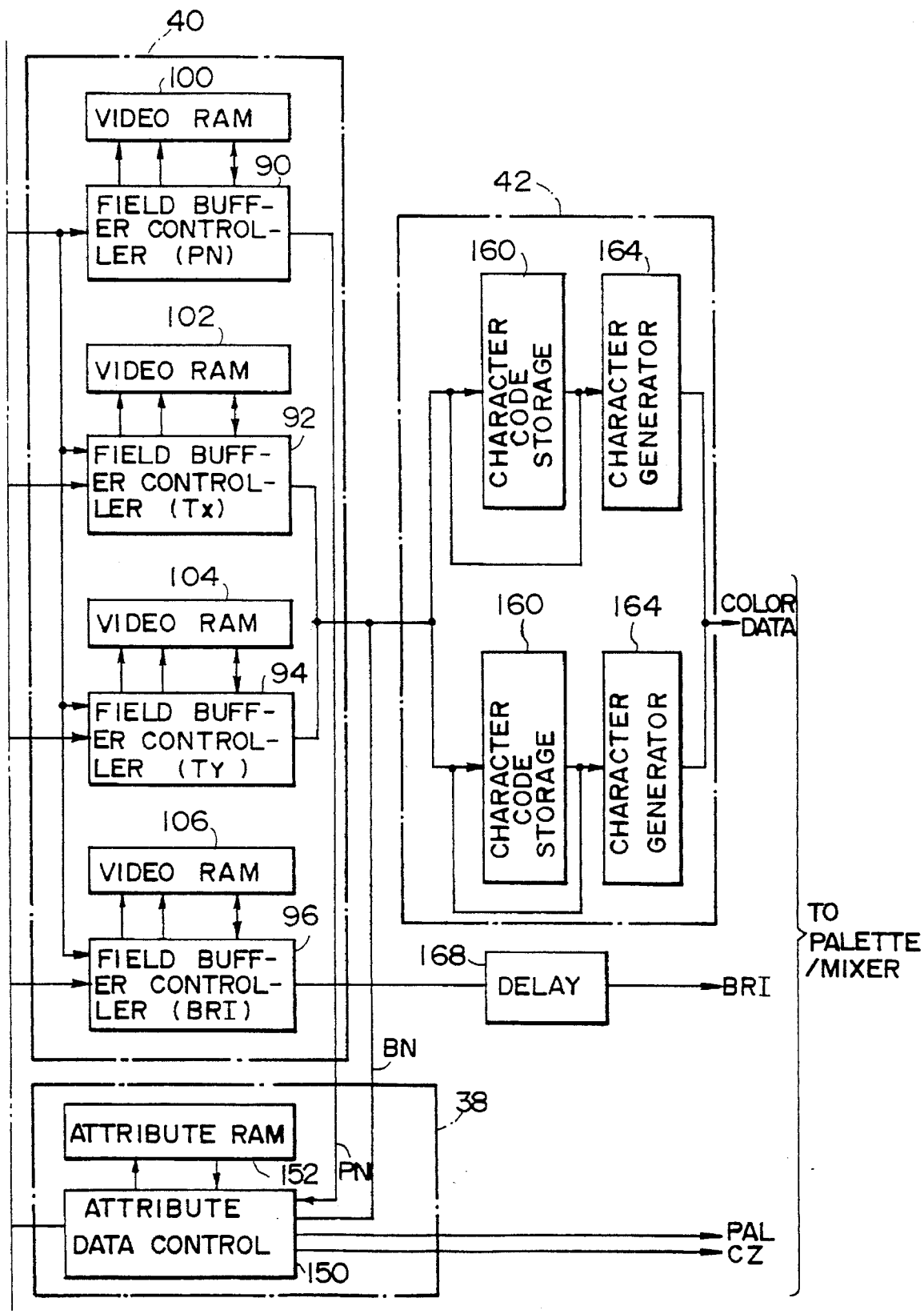

FIG. 16 shows the details of the first embodiment including the sorting unit 22, processor unit 30, attribute RAM unit 38, field buffer unit 40 and texture data storage unit 42.

The sorting unit 22 comprises a sorting control circuit 50, a sorting RAM 52 and a data RAM 60, as shown in FIG. 16. The sorting unit 22 functions to decide the priority in the polygon treatment and also as a communication RAM between the image supply unit 10 and the subsequent or image synthesizing unit. More particularly, the sorting RAM 52 functions mainly as a working area for deciding the priority while the data RAM 60 functions mainly as a communication RAM. The sorting control circuit 50 mainly controls these treatments.

The data RAM 60 comprises an output area data RAM 54, a sorting area data RAM 56 and an output area data RAM 58. The polygon data from the image supply unit 10 are sequentially accumulated in the input area data RAM 54. All input/output signals to the data RAM 60 are switched for every one field (1/60 seconds) so that the input area data RAM is changed to the sorting area data RAM while the sorting area data RAM is changed to the input area data RAM. Therefore, the polygon data written in the input area data RAM will exist in the output area data RAM after two fields.

The interior of the sorting RAM 52 is divided into two areas, a sorting operation area and a sorted index area. The sorting operation is actually carried out in the sorting operation area. The sorting operation terminates within one field and one area is switched to another area for every one field. In accordance with data in the sorted index area, the sorting control circuit 50 sequentially outputs the polygon data from the output area data RAM 58, starting from the minimum Z representative value (or the maximum preference data). Thus, the subsequent treatment of polygon will be performed according to such a priority.

(4) Processor Unit

The processor unit 30 comprises the main processor 32 and the co-processor 34, as described. The main processor 32 includes a control circuit 70 and a divider 72 and mainly functions to perform the computation of the perspective transformed representing coordinates X* and Y* and the control of the entire processor unit 30. The co-processor 34 includes sum-of-products computing elements 74, 76, 78 and 80 and dividers 82, 84 and 86. The co-processor 34 functions to perform the computation of reading texture coordinates TX, TY and brightness data BRI in accordance with indication of the control circuit 70.

Figure 17:
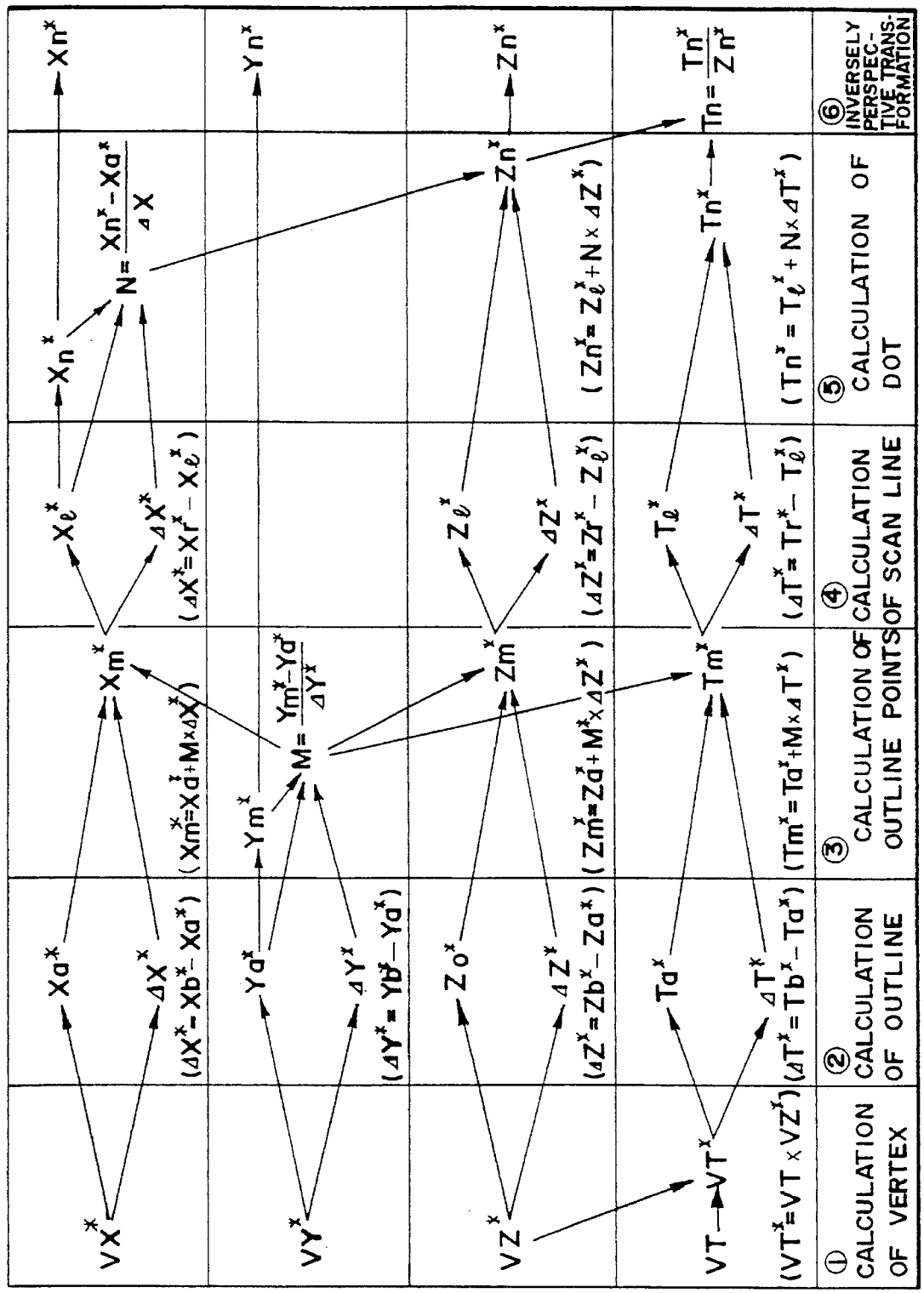
FIG. 17 is a view illustrating the details of the image computing process in the first embodiment of the present invention.
Figure 18A:
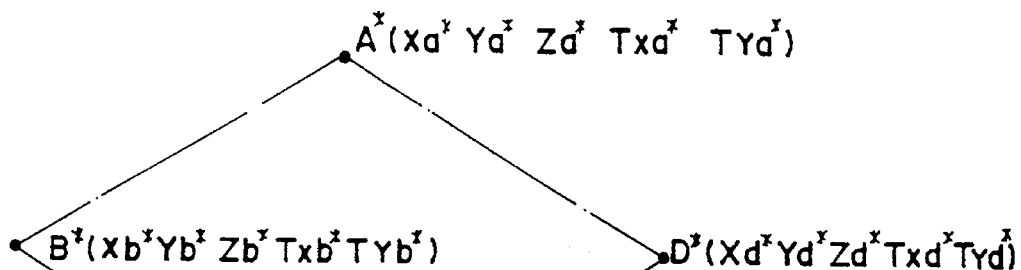
FIGS. 18A to 18c are diagrammatic views illustrating the computation of an outline and outline points.

The details of the computation at the processor unit 30 will be described with reference to FIGS. 17–19. FIG. 17 shows the flow of each computation; FIGS. 18A–18C illustrate the computation of an outline and outline points; and FIGS. 19A and 19B illustrate the computation of scan lines and dots.

The computation of brightness data BRI is omitted from FIGS. 17–19 since it can be processed in substantially the same manner as in the computation of texture coordinates TX, TY.

① Computation of Vertices (FIG. 17 ①)

The control circuit 70 first receives polygon data from the sorting unit 22 according to the priority. The control circuit 70 reads only the perspective-transformed representing coordinates VX* and VY* for vertices in the polygon data and instructs the co-processor 84 and attribute RAM unit 38 so that they read the other data. More particularly, the texture coordinates VTX, VTY, brightness data BRI and perspective-transformed representing coordinate Z* for each vertex will be read into the co-processor 34 while the attribute data including palette numbers PAL, color Z values CZ and the other data are read into the attribute RAM unit 38 and stored in the internal memory means thereof.

The control circuit 70 detects the uppermost coordinates in the scene based on the Y-axis coordinates (i.e. the coordinates of a point A* in FIG. 18A) from the perspective-transformed representing coordinates VX* and VY* read thereinto, the uppermost coordinates being stored in the internal register.

The sum-of-products computing elements 76, 78 and 80 perspectively transform the texture coordinates VTX, VTY and brightness data BRI for the respective vertices, the transformed data being then stored in the internal register. In such a case, the perspective transformation is carried out by multiplying the perspective-transformed representing coordinates VZ* (=h/VZ) for each vertices as shown in FIG. 17 ①:

$$VTX^* = VTX \times VZ^*,$$

$$VTY^* = VTY \times VZ^*,$$

and $$VBRI^* = VBRI \times VZ^*.$$

When any space occurs in the internal register, the next polygon data is immediately inputted from the sorting unit 22 into that space. The vertex computing cycle is repeated. In the first embodiment, thus, the data before and after computation are temporarily stored in the internal register. This enables a pipe-line operation to be carried out.

② Computation of Outlines (polygon edges) (FIG. 17 ②)

The control circuit 70 first determines a difference between vertices A* and B* in each coordinate value, taking the vertex A* as a start point and the vertex B* as an end point. As shown in FIG. 18B, the following computation is carried out:

$$\Delta X^* = Xb^* - Xa^*$$

and $$\Delta Y^* = Yb^* - Ya^*.$$

Figure 18B:
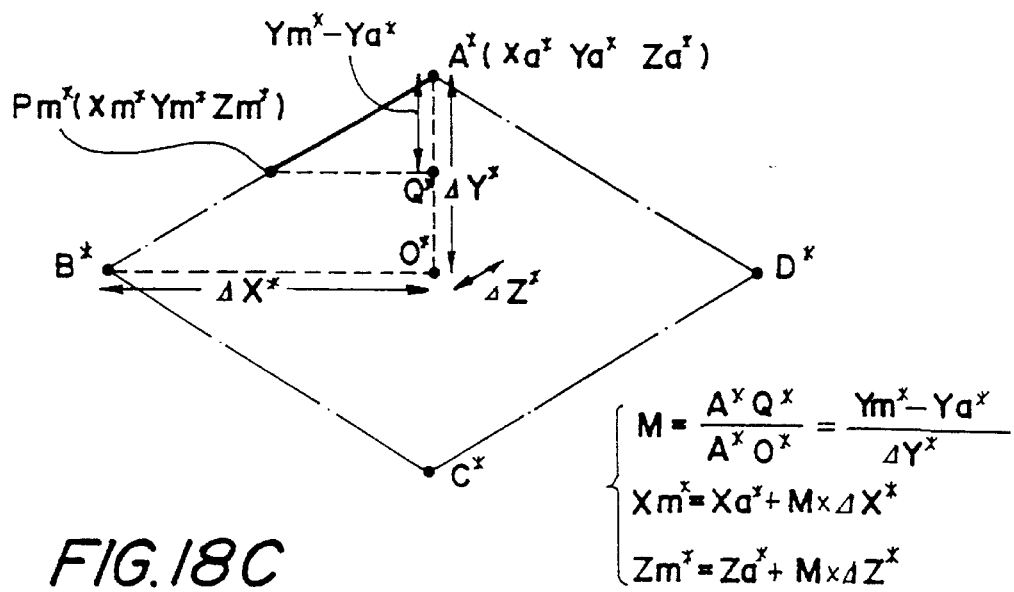
Figure 18C:
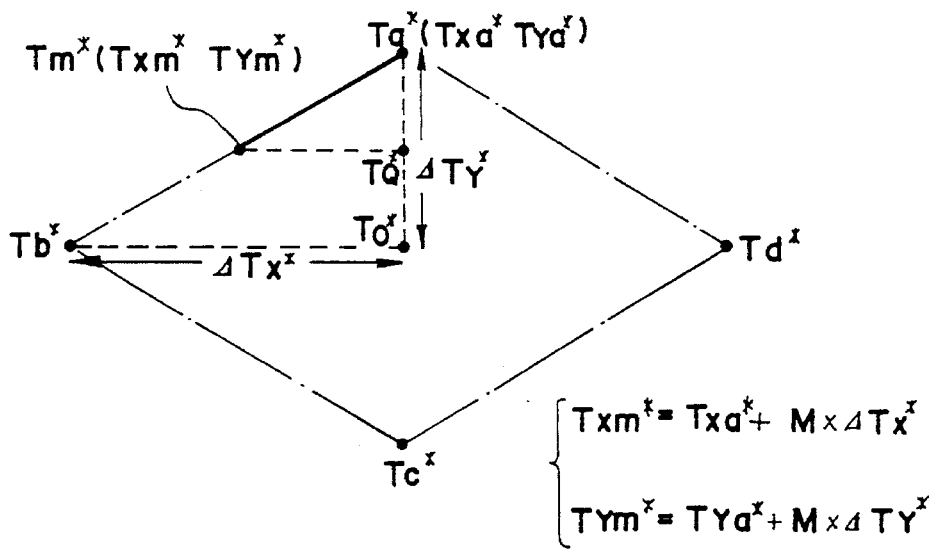
Figure 19A:
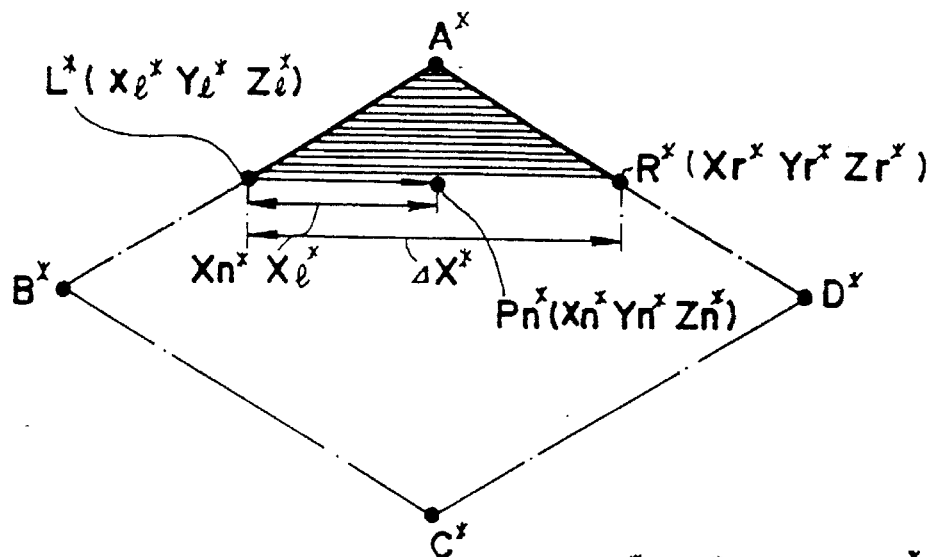
FIGS. 19A and 19B are diammatic views illustrating the computation of scan lines and dots on the scan lines.
Figure 19B:
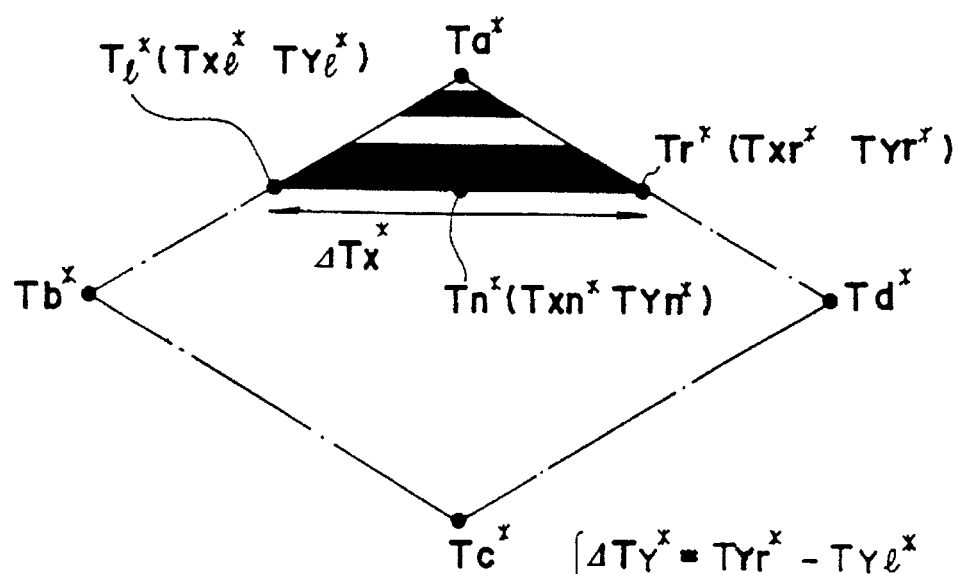

At the same time, the control circuit 70 instructs the sum-of-products computing elements 74–80 to perform the following computation as shown in FIGS. 18B and 18C:

$$\Delta Z^* = Zb^* - Za^*,$$

$$\Delta TX^* = TXb^* - TXa^*,$$

$$\Delta TY^* = TYb^* - TYa^*$$

and $$\Delta BRI^* = BRIb^* - BRIa^*.$$

On termination of the above computations, the control circuit 70 and sum-of-products computing elements 74–80 update the start and end points. The same computing cycle is repeated to the other sides B*C*, C*D* and D*A* to complete the computing process for all the outlines.

All the results of the above computing process are stored in the internal register and will be then used to compute outline points as follows.

③ Computation of Outline Points (FIG. 17 ③)

First of all, the first side A*B* in the left outline is selected to compute left outline points Pm* (Xm*, Ym*, Zm*), Tm* (TXm*, TYm*) and BRIm*. Based on Ym*, the computation of these left outline points is carried out. In other words, the coordinate value of Ym* is varied sequentially from Ya* while the varied coordinate values are linearly interpolated to determine the other coordinate values.

The control circuit 70 and divider 72 compute a factor M for the left outline points as follows:

$$M=(Ym^*-Ya^*)/\Delta Y^*.$$

This factor M corresponds to a scale ratio between triangles A*B*O* and A*P*Q* and the computation is based on Y-axis coordinates. The factor M is outputted from the control circuit 70 to the sum-of-products computing elements 74–80.

X-axis coordinate Xm* of a left outline point is computed from the factor M using the conformal relationship between the triangles in FIG. 18B as follows:

$$Xm^*=Xa^*+M\times\Delta X^*$$

On reception of the factor M, the sum-of-products computing elements 74–80 compute Z-axis coordinate Zm*, texture coordinates TXm*, TYm* and brightness data BRIm* for the left outline point from the factor M using the conformal relationship between the triangles in FIGS. 18B and 18C as follows:

$$Zm^*=Za^*+M\times\Delta Z^*,$$

$$TXm^*=TXa^*+M\times\Delta TX^*,$$

$$TYm^*=TYa^*+M\times\Delta TY^*,$$

and $$BRIm^*=BRIa^*+M\times\Delta BRI^*.$$

Since the above computing is based on Ym*, it will not be carried out to Ym* which directly becomes a coordinate on the left outline point.

In parallel with the computation of the left outline point, the computation of a right outline point is carried out in the same manner. More particularly, one and the same computing circuit operates in time sharing such that left and right outline points are sequentially performed to a value (e.g. Ym*).

The results from the computation are stored in the internal register as a pair of left and right outline points. If internal register has a space, the computation of the next pair of outline points is carried out. In other words, the value Y* is increased by a spacing between adjacent scan lines and the aforementioned computing cycle is repeated.

If Y* is coincident with the coordinate of Y* at the end point (=Yb*), said side A*B* is updated, for example, to the other side B*C* and the aforementioned process is continued. If ΔY*=0, however, the updating step is immediately performed.

When the left and right sides concerned are brought into contact with each other, a contact point at that time is the evermost end (C*) in the polygon. When the left and right outline points arrive at the lowermost, end, it means that one polygon has been processed.

④ Computation of Scan Lines (FIG. 17 ④)

The left and right outline points thus determined are then used to determine a difference between scan lines or between the left and right outline points.

For simplicity, it is now assumed that the perspective-transformed representing coordinates of the left outline point is L* (Xl*, Yl*, Zl*) and the perspective-transformed texture coordinates and perspective-transformed brightness data corresponding to the left outline point are Tl* (TXl*, TYl*) and BRIl*. It is also assumed that the perspective-transformed representing coordinates of the right outline point is R* (Xr*, Yr*, Zr*) and the perspective-transformed texture coordinates and perspective-transformed brightness data corresponding to the right outline point are Tr* (TXr*, TYr*) and BRIr*.

The control circuit 70 performs the following computation as shown in FIG. 19A:

$$\Delta X^*=Xr^*-Xl^*.$$

At the same time, the control circuit 70 instructs the sum-of-products computing elements 74–80 to perform the following computation as shown in FIGS. 19A and 19B:

$$\Delta Z^*=Zr^*-Zl^*,$$

$$\Delta TX^*=TXr^*-TXl^*,$$

$$\Delta TY^*=TYr^*-TYl^*$$

and $$\Delta BRI^*=BRIr^*-BRIl^*.$$

⑤ Computation of Dots (FIG. 17 ⑤)

Finally, the computation is made to the perspective-transformed representing coordinates Pn* (Xn*, Yn*, Zn*), perspective-transformed texture coordinates Tn* (TXn*, TYn*) and perspective-transformed brightness data BRIn* for each dot on the scan line. This comtputation is based on Xn*. In other words, the coordinate value of Xn* is gradually increased from Xl* and the other coordinate values are determined by linearly interpolating the varied coordinate values.

The control circuit 70 and divider 72 compute a factor N as follows:

$$N=(Xn^*-Xl^*)/\Delta X^*.$$

This factor N corresponds to a segment ratio between line segments L*R* and L*Pn* in FIG. 19A, and the computation is based on X-axis coordinates. The factor N is outputted from the control circuit 70 to the sum-of-products computing elements 74–80.

On reception of the factor N, the sum-of-products computing elements 74–80 compute Z-axis coordinate Zn*, texture coordinates TXn*, TYn* and brightness data BRIn* for each dot on the scan line from the factor N using the segment ratio in FIGS. 19A and 19B as follows:

$$Zn^*=Zl+N\times\Delta Z^*,$$

$$TXn^*=TXl^*+N\times\Delta TX^*,$$

$$TYn^*=TYl^*+N\times\Delta TY^*,$$

and $$BRIn^*=BRIl^*+N\times\Delta BRI^*.$$

The value of Xn* then increases and the computation within the above ⑤ is repeated. This process is continued until all the dots on the scan line between the left and right outline points have been computed.

Since the above computation is based on Xn* and the value Yn* is constant on the same scan line, the values Xn* and Yn* will not be computed and is directly taken as representing coordinates for each dot on the scan line.

⑥ Inversely Perspective Transformation (FIG. 17 ⑥)

The inversely preparative transformation of texture coordinates and brightness data is made by divider 82, 84 and 86 in accordance with the following formulas, using the value Zn* determined at ⑤:

$$TXn = TXn^*/Zn^*,$$

$$TYn = TYn^*/Zn^*$$

and $$BRIn = BRIn^*/Zn^*.$$

If there are many data to be subjected to the inversely perspective transformation, it is desirable that an inverse number of Zn* has been determined for every dot and multiplied by each data. This is because a multiplier can generally has its circuit smaller than that of a divider. If a plurality of rendering data are selected to be processed, a plurality of dividers are not required one for each rendering data. As a result, the load on the hardware can greatly be reduced.

In such a manner, the computations of ①–⑥ are performed in a pipe-line manner. When all the polygon data are inputted from the sorting unit 22 into the processor unit 30 and if all the computations of ①–⑥ have been completed, the data are processed by one scene at the processor unit 30.

The interpolations at ③ and ⑥ can be carried out by the use of DDA technique. For example, with the computation of Zn* in ⑤, a difference $dZ^* = \Delta Z^*/\Delta X^*$ is first determined using $Z0^* = Z1^*$ as an initial value. An addition, $Zn+1^* = Zn^* + dZ^*$, is then repeated to perform the interpolation.

Representing coordinates Xn* and Yn* so calculated for each dot are then supplied to the field buffer unit 40 in which they are utilized as addresses in the internal video RAM thereof.

The texture coordinates TX, TY and brightness data BRI are also applied to the field buffer unit 40 and written in the internal video RAM thereof at said addresses and stored.

If necessary, the inverse perspective transformation can be also performed on Zn* as Zn–h/Zn*. This values Zn and Zn* can be utilized in the synthesization with other images as in a character display or applied to Z buffer algorithm.

(5) End Flag Storage Unit and Processing Dot Instruction Unit

The first embodiment can greatly be increased in speed since the computation of ⑤ is carried out by instruction from the processing dot instruction unit 37. The processing dot instruction unit 37 and end flag storage unit 36 will now be described in more detail.

Figure 20:
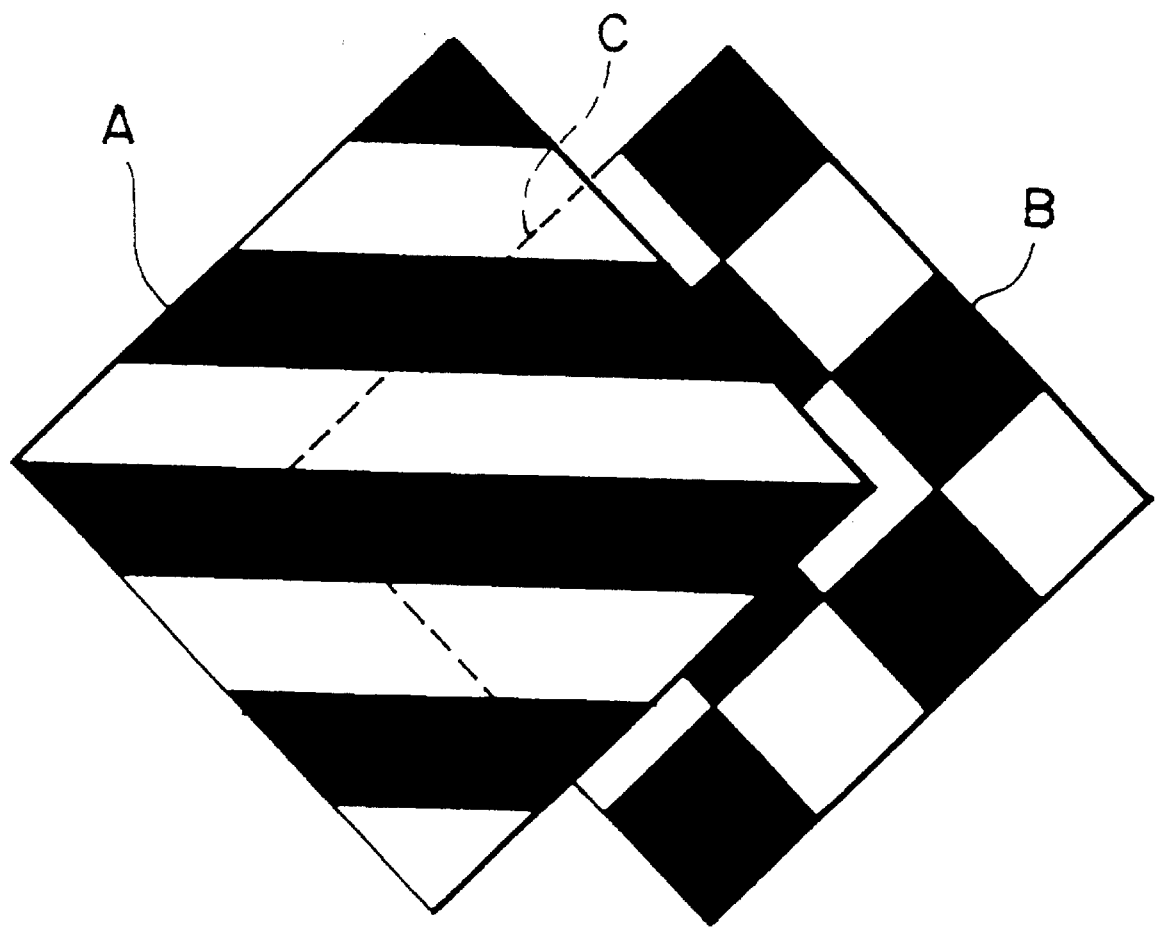
FIG. 20 is a diagrammatic view illustrating the relationship between the closest and the next closest polygons to the view point in the scene.

In the pseudo 3-D image as shown in FIG. 11, for example, it is not required that part of the distant road 59 hidden by the car 590 is displayed. Similarly, that portion of house 596 hidden by the other house 594 is not required to be displayed on the screen. Therefore, such hidden portions should be removed. The image synthesizing system of this first embodiment is adapted to treat the polygons sequentially starting from the closest polygon to the view point in the scene, as described. As shown in FIG. 20, thus, the computing process is first performed to a polygon A. When the computing process is then to be made to another polygon B (which is behind the polygon A), it is required to omit the computing step with respect to an overlapping polygon portion C. For this purpose, this embodiment comprises the end flag storage unit 36 and the processing dot instruction unit 37.

The end flag storage unit 36 has storage plane corresponding to dots in the screen with one-to-one. The storage planes has stored data known as end flag for each dot, for example, in the unit of one bit. The end flag is one that is used to judge whether or not a dot has been processed. For example, when any one of the dots defining the polygon A of FIG. 20 has been processed, "1" is written by the processing dot instruction unit 37. The processing dot instruction unit 37 monitors the end flags at all times. When the computing process is then to be made to the polygon B, it will be omitted for a dot having its end flag being "1". Thus, the computing process is not required to polygon areas which have been shaded or painted. The processing speed can greatly be increased.

Figures 21, 21A:
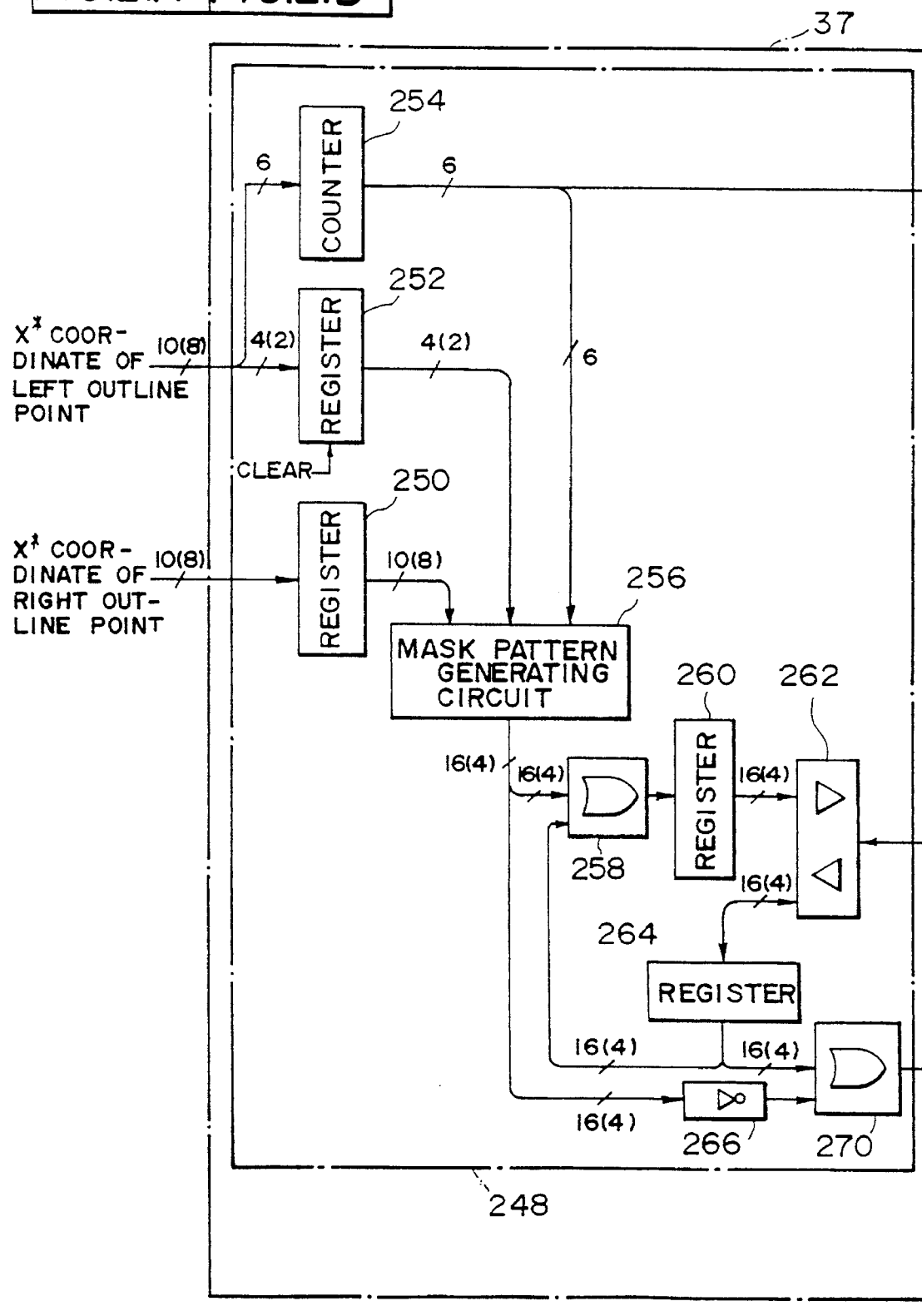
FIG. 21 is a block diagram, split into FIGS. 21A and 21B illustrating the structure of the processing dot instruction means and the relationship between the processing dot instruction means and the end flag storage unit.
Figure 21B:
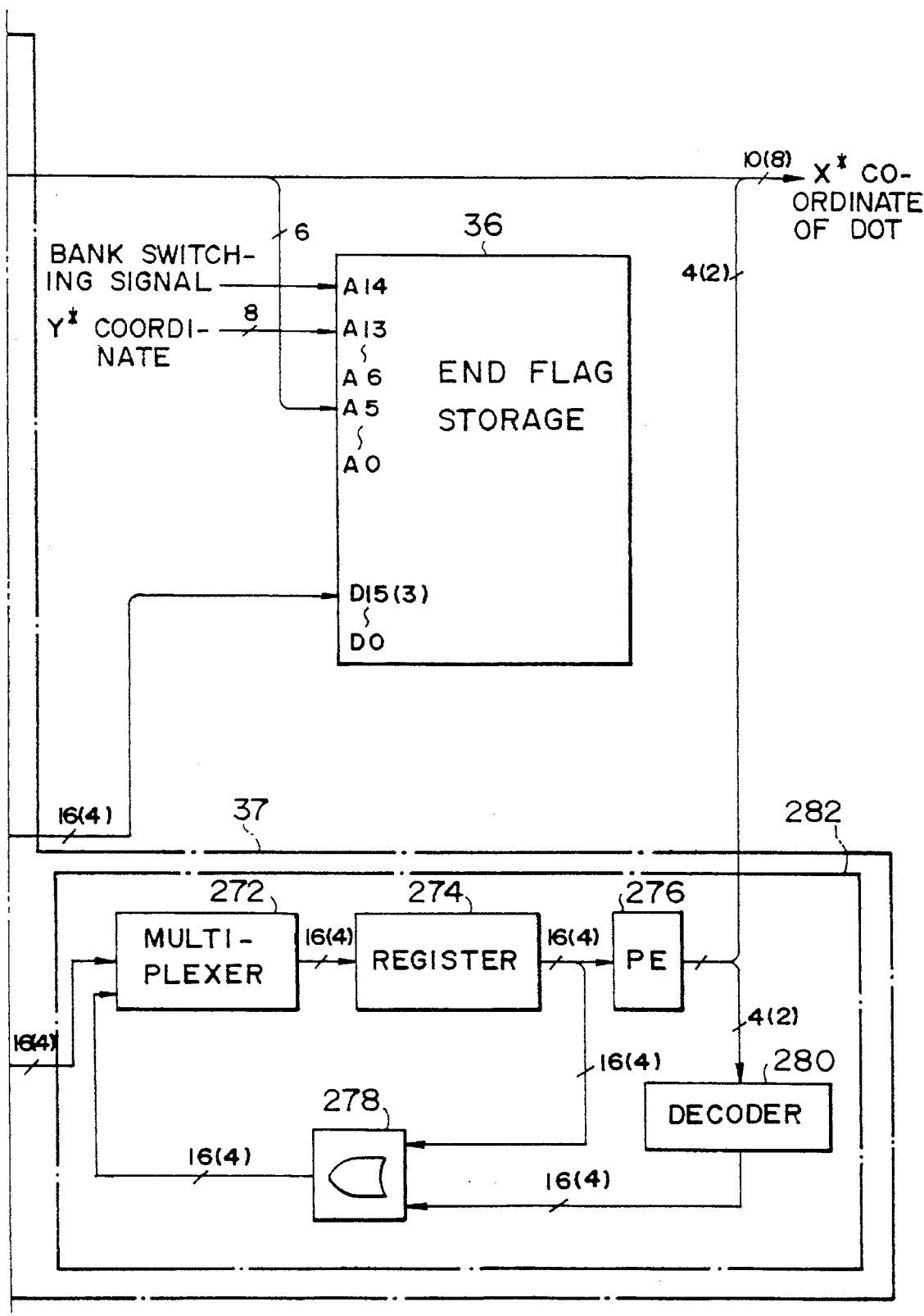

FIG. 21 is a block diagram showing the connection between the processing dot instruction unit 37 and the end flag storage unit 36. The processing dot instruction unit 37 comprises an end flag decision unit 248 and an empty dot detection loop 282.

The end flag decision unit 248 functions to decide a dot to be processed by the processor unit 30. The end flag of the dot decided to be processed is reset as a newly processed dot by the end flag decision unit 248 and then written back into the end flag storage unit 36. Since these dot instruction and rewriting are carried out for every set of dots, the processing speed can greatly be increased.

The empty dot detection loop 282 sequentially detects dots decided to be processed by the end flag decision unit 248. Based on the result of detection, the X* coordinate of a dot to be processed is determined and outputted to the processor unit 30.

The end flag storage unit 36 is large enough to store end flags corresponding to two scenes. The end flag is stored in the end flag storage unit 36 so that one bit corresponds to one dot. The end flags corresponding to one scene are cleared to be "0" at the beginning of one-scene processing. When the computing process terminates, an end flag for one dot is set at "1" to represent the end of the computing step for that dot.

The end flag storage unit 36 has a data bus of plural bits, for example, of 16 bits and can access 16-bit data simultaneously. In the computation of dot, the end flag storage unit 36 is referred to at all times. Therefore, the end flags corresponding to 16 dots can be referred to. A dot having its end flag being "1" will not be subjected to the computing process. Thus, such dots will be skipped at high speed, that is, by 16 dots maximum. If dots on a polygon to be processed are hidden by the other polygon, the processing speed will be about 16 times higher than the prior art in which processing proceeds only with the increment of X* coordinate.

In this first embodiment, the end flag storage unit 36 is formed for two scenes. This is because the access to the end flag storage unit 36 in the dot processing operation may be carried out in parallel with the clearing of one scene.

The fact that the polygons are sequentially processed starting from the closest polygon to the view point in the scene is also based on the purpose that the processing speed should be increased.

The end flag storage unit 36 will be described in more detail with reference to FIG. 21 which shows its block diagram.

First of all, the end flag decision unit 248 receives X* coordinates of left and right outline points which have been generated by the computation of outline points. It is now assumed that each of these coordinates is defined by data of 10 bits. The X* coordinate of right outline point is stored in a register 250. Low order four bits of the X* coordinate of the left outline point is stored in a register 252 while high order six bits are used as an initial value in a counter 254. The output of the counter 254 is sent to the end flag storage unit 36 at its addresses A0–A14 to address the end flag storage unit 36, with the Y* coordinate of the outline point and bank switching signal. Namely, the counter 254 will count up the addresses for every four bits, that is, for every 16 dots. Thus, a group of end flags corresponding to data or objective 16 dots is read out from the end flag storage unit 36 for every 16 dots and then sent to and stored in a register 264 through a bidirectional buffer 262.

On the other hand, a mask pattern generating circuit 256 generates a mask pattern for every 16 dots such that inner dots located between the left and right outline points are made to be "1" and outer dots to be "0". At an OR circuit 258, the data stored in the register 264 is taken logical OR with this mask pattern. As a result, a data will be formed in which the end flag of an "empty dot" or a dot to be newly processed is updated to "1". This data is stored in the register 260 before it is written back into the end flag storage unit 36 through the bidirectional buffer 262. In such a manner, the data for the objective 16 dots among the end flag data stored in the end flag storage unit 36 will be updated.

The mask pattern is also inverted by an inverting circuit 266. The inverted mask pattern is taken logical OR with the data stored in the register 264. As a result, data will be produced in which dots outside of the left and right outline points and dots hidden by the other polygon(s) are set at "1" while only empty dots are set at "0", which will be referred to "empty dot data". The empty dot data is supplied to an empty dot detection loop 282.

In the empty dot detection loop 282, a multiplexer 292 fetches the empty dot data only when a register 274 is to be initialized and data from a feedback loop in the other events. This will form its own loop. The empty dot data stored in the register 274 is inputted into a priority encoder 276. The priority encoder 276 detects a dot having the minimum X* coordinate in the empty dots and outputs it as 4-bit data. The X* coordinate of an empty dot or a dot to be processed will be formed by adding 6-bit data from the counter 254 to the high order of the 4-bit data.

The output of the priority encoder 276 is inputted into a decoder 280 which produces "data that only objective dots are set at '1'". Such a data is taken logical OR with the output of the register 274 at an OR circuit 278 to produce "data that only objective dots in the empty dots data are updated to '1'". Such an updated data is written back into the register 274 through the multiplexer 272. A series of steps in the empty dot detection loop 282 are repeated until all the bits in the register 274 become "1".

When the operation in the empty dot detection loop 282 terminates, the counter 254 counts up to read out the next 16-dots data from the end flag storage unit for repeating the above cycle.

If any right outline point is contained in the 16-dots data, new X* coordinates of the left and right outline points will be inputted to repeat the process.

(6) Field Buffer Unit

As shown in FIG. 16, the field buffer unit 40 comprises video RAMs 100, 102, 104 and 106 and field buffer controllers 90, 92, 94 and 96 for controlling these video RAMs.

A field buffer space defined by the video RAMs 100–106 stores data corresponding to dots in the CRT display screen in one-to-one ratio. In the first-embodiment, data stored in the field buffer space includes texture coordinates TX and TY, brightness data BRI and polygon identification numbers PN which are computed by the co-processor 34. Addresses at which the data are to be written are decided from the perspective-transformed representing coordinates X* and Y* which are computed by the main processor 32.

Each of the video RAMs is of a multi-port RAM type which is divided into a random port (RAM) and a serial port (SAM). In the first embodiment, the write of data to the field buffer space is performed in random access while the read-out is serially carried out in synchronism with clocks. The field buffer space is divided into two banks, a write bank and a read bank. These banks are switched from one to another for every one field (1/60 seconds).

(7) Attribute RAM Unit

As shown in FIG. 16, the attribute RAM unit 38 comprises an attribute RAM section 152 and an attribute data control section 150.

Attribute data from the sorting unit 22, including palette numbers PAL, color Z values CZ, block numbers BN used to specify blocks in the storage space of the texture data storage unit 42 and so on, are supplied to the attribute data control section 150 through which the attribute data will be stored in the attribute RAM 152. The reading of data from the attribute RAM 152 is performed in accordance with the polygon identification numbers PN from the field buffer unit 40. The read data will then be supplied to the palette/mixer circuit 44 for every polygon.

The block numbers BN used to specify the blocks in the storage space of the texture data storage unit 42 are generated by the attribute control circuit 150 and then supplied to the texture storage unit 42.

(8) Texture Data Storage Unit

The texture data storage unit 42, as shown in FIG. 16, comprises a character code storage section 160 and a character generator 164. The texture data storage unit 42 has stored data (e.g. color codes) that are used to display an actual scene on the texture coordinates TX and TY from the field buffer unit 40. To aid the storage unit in speed, the texture data storage unit 42 is of two-stage structure. These storage units may be formed by any suitable memory means such as mask ROM, EEPROM, SRAM, DRAM or the like. If a RAN is particularly used to rewrite the contents of the RAM for every one field (1/60 seconds), a unique image effect may be obtained as by feeding back its own image and by monitoring back to the texture.

FIG. 22 showing a plane of texture storage that is defined by the texture data storage unit 42.

The texture storage plane is of such a stratum structure as shown in FIG. 22. This provides a larger texture storage plane realized by a smaller storage capacity. More particularly, the texture storage plane may be divided into 16 blocks each of which blocks is divided into 256×256 characters. Each of the characters is further divided into 16×16 dots and has stored a pattern used to define the texture storage plane. The texture storage plane is fully filled with such a pattern.

As shown In FIG. 22, the texturing to a polygon is performed by specifying vertex coordinates of the texture applied to that polygon. However, the polygon cannot be specified to extend between adjacent blocks.

Figure 23:
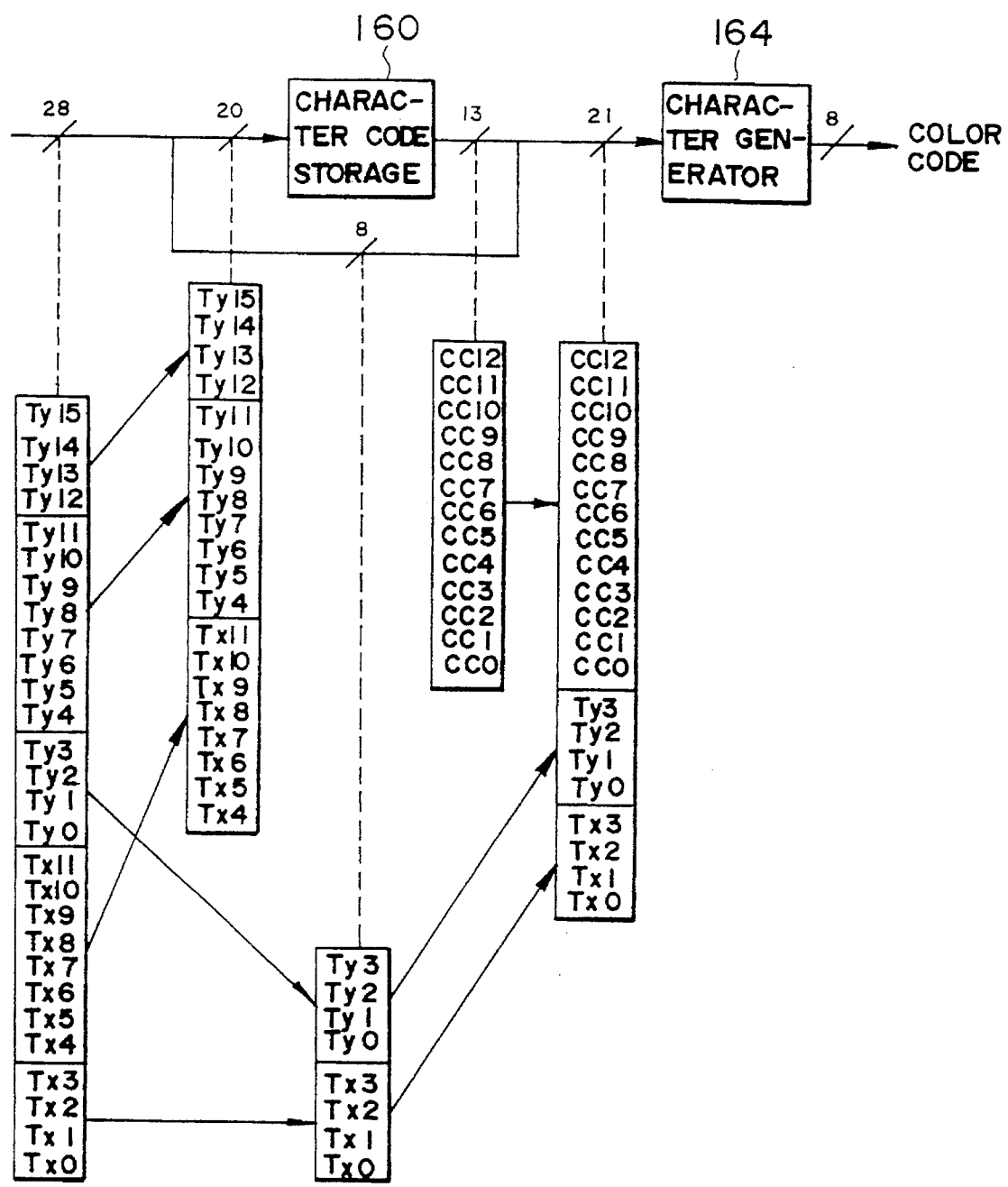
FIG. 23 is a diagrammatic view illustrating the flow of data in the texture data storage unit.

FIG. 23 shows a flow of data in the texture data storage unit 42.

In the first embodiment, the texture data storage unit 42 receives a data of total 28 bits, including texture X coordinates TX0–TX11 of 12 bits and texture Y coordinates TY0–TY15 of 16 bits.

The low-order bits TX0–TX3 and TY0–TY3 in these texture coordinates are used to address characters in the character generator 164 while the high-order bits TY12–TY15 of the texture Y coordinates are used to specify block numbers BN in the texture storage plane. In other words, blocks in the texture storage plane are specified by the high-order bits TY12–TY15 while characters in each of the blocks are addressed by the bits TX4–TX11 and TY4–TY11. Thus, character codes CC0–CC12 will be read out from the character code storage section 160. On the other hand, the low-order bits TX0–TX3 and TY0–TY3 are joined directly with the character codes CC0–CC12 bypassing the character code storage section 160 and then supplied to the character generator 164. Subsequently, the character generator 164 will output an 8-bit color code which is the final output thereof to the palette/mixer circuit 44.

(9) Palette/Mixer Circuit

The palette/mixer circuit 44 is one that synthesizes RGB data used to output an image from the brightness data BRI, color data COL, palette numbers PAL and color Z values CZ. More particularly, an output image is synthesized by taking RGB data out of a preset palette using dot data stored in the field buffer unit 40 and polygon data stored in the attribute RAM 38. The palette has stored color data of total 24 bits including each RGB of 8 bits. The palette is totally divided into 128 banks which are addressed by palette numbers PAL. Each of the banks has data of 256 colors which are specified by color codes COL.

Figure 24:
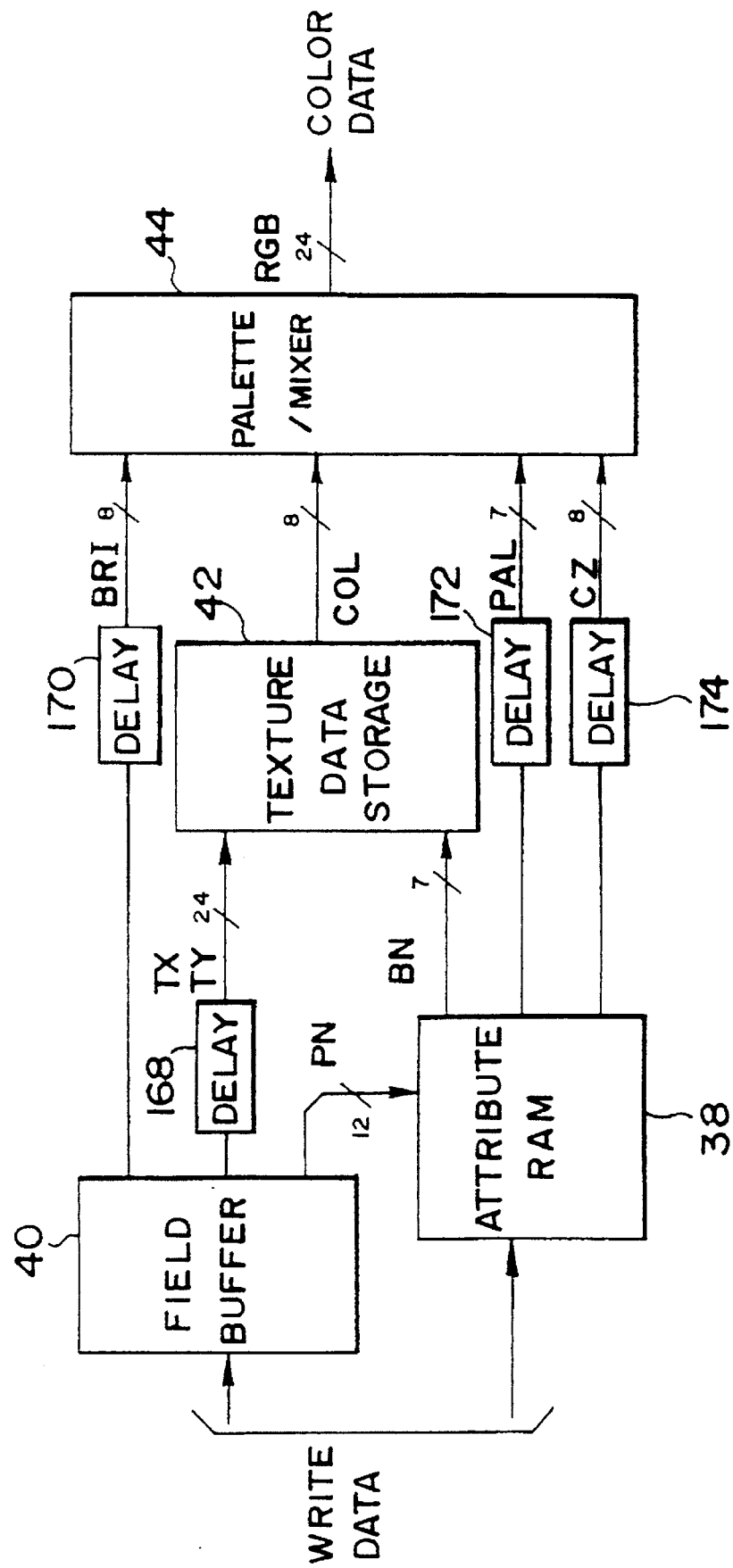
FIG. 24 is a block diagram illustrating the flow of data until an image is outputted after the data has been written in the field buffer unit.

FIG. 24 shows a flow of signal in a period after data have been written in the field buffer unit 40 and attribute RAM unit 38 and until a final image is outputted from the system.

① Data (PN, TX, TY, BRI) are outputted from the field buffer unit 40 for every one dot.

② Polygon data (BN, PAL, CZ) corresponding to said polygon identification number PN are outputted from the attribute data RAM unit 38.

③ The data TX, TY and BN are inputted into the texture data storage unit 42 which in turn outputs the corresponding color data COL. In this case, the data TX and TY are inputted into the texture data storage unit 42 through a delay circuit 168 to time with the input of the data BN through the attribute RAM unit 38.

④ The data COL, PAL, BRI and CZ are timed with each other by delay circuits 170, 172 and 174 so that these data will simultaneously be inputted into the palette/mixer circuit 44. A bank and color code therein in the palette are specified by PAL and COL to select one color data from the palette. The selected color data is computed in color by the values BRI and CZ. Thereafter, the color data is gamma corrected before D/A conversion. The converted color data is a RGB data which is outputted from the palette/mixer circuit 44 to the CRT 46 wherein an image is displayed.

C. Second Embodiment

1. Summary

The second embodiment utilizes a surface shape data as one rendering data and more particularly uses a normal vector. The first embodiment aforementioned determines brightness data BRI for each dot in a polygon by directly interpolating brightness data VBRI for each vertex in the polygon. On the contrary, the second embodiment interpolates normal vectors given to the respective vertices in a polygon. The brightness data BRI for each dot in the polygon will be determined by causing the computed normal vectors no be subjected to a given computation corresponding to an lighting model.

The second embodiment performs the interpolation of normal vectors N=[NX, NY, NZ] using rectangular coordinates. More particularly, a normal vector VN=[VNX, VNY, VNZ] is first given to each vertex in the polygon. The same procedures as in the first embodiment, that is, perspective transformation, outline interpolation, scan line interpolation and inversely perspective transformation, are carried out to these values VNX, VNY and VNZ. Thus, the normal vectors N=[NX, NY, NZ] for all the dots on the polygon will be determined.

Thereafter, these normal vectors N=[NX, NY, NZ] are used to decide actual colors. In this case, an lighting model is required to determine the brightness data BRI from the normal vectors.

In the second embodiment, the lighting model includes parallel rays from a single light source, specular reflection, diffuse reflection and ambient light. Time lighting model may be computed by the use of the following formula that is called a shading function and obtained theoretically in part but empirically in part:

$$BRI = IaKa + \{Il/(Z+K)\} \times (Kd \cos \phi + Ks \cos^n \psi) \quad (1)$$

where

BRI: Brightness data for each dot;

Ia: Intensity of ambient light;

Il: Intensify of incident light;

Ka: Diffuse reflection coefficient of ambient light [O];

Kd: Diffuse reflection coefficient [O];

Ks: Specular reflection coefficient [O];
  (a: ambient)
  (d: diffuse)
  (s: specular)

K: Constant (for correcting the brightness in a less distant object) [F];

Z: Z-axis coordinate for each dot [0 in certain cases];

$\phi$: Angle between a light source vector L and a normal vector N;

=Angle between a reflective light vector R and a normal vector N;

$\psi$: Angle between a reflective light vector R and a visual vector E=[0, 0, 1]; and n: Constant (sharpness in high-light) [O]
  [F]: Constant for each scene (field).
  [O]: Constant for each object (or polygon).

The angles $\phi$ and $\psi$ in the formula (1) are determined using the normal vectors N=[NX, NY, NZ] that are determined by the interpolation. If necessary, Z-axis coordinates may be determined for each dot. The other coefficients are given as attribute data for each polygon. When these data are substituted into the formula (1), brightness data for each dot will be determined.

2. Details

Figure 25:
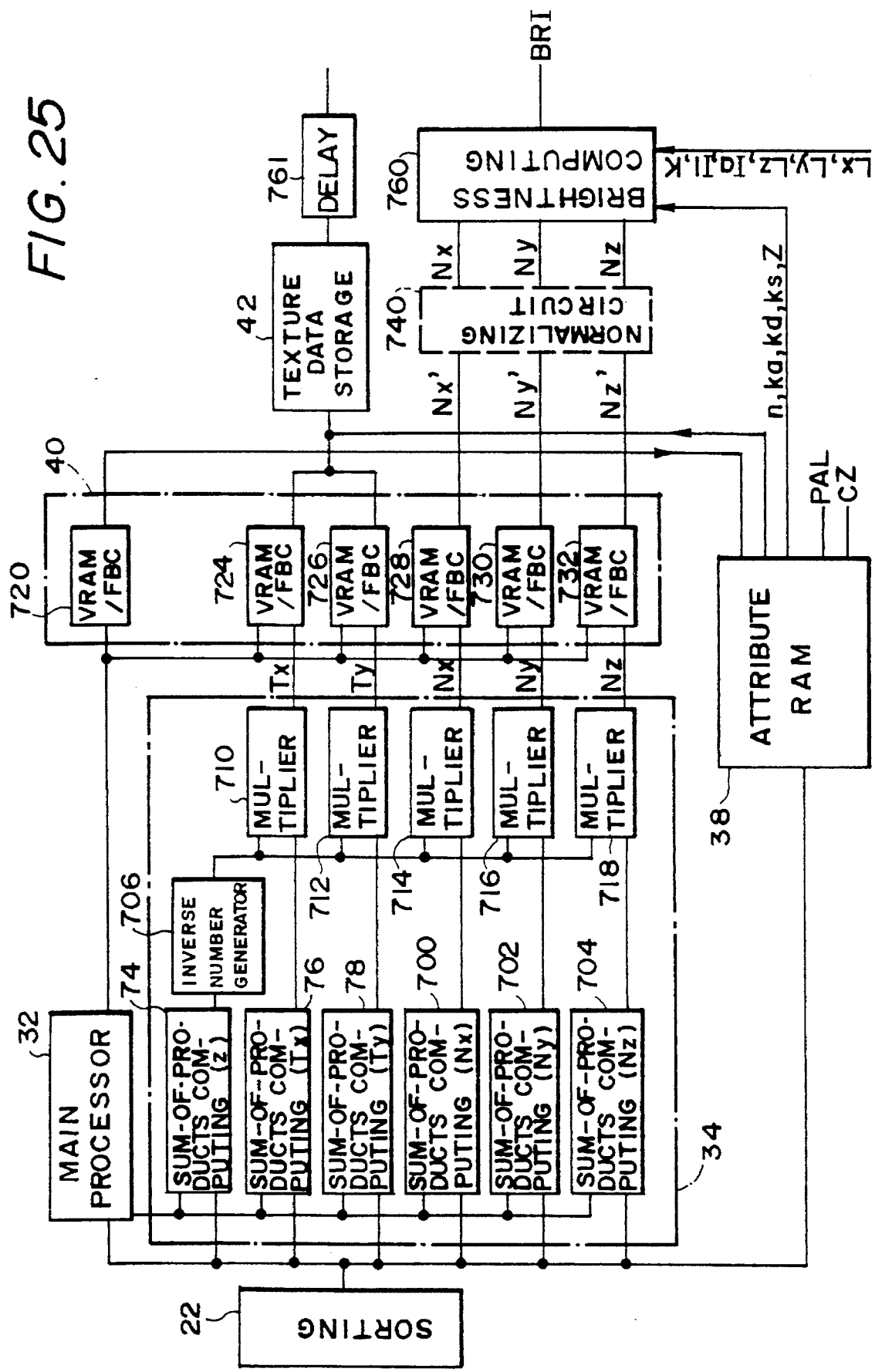
FIG. 25 is a block diagram of the second embodiment of an image synthesizing system constructed in accordance with the present invention.

FIG. 25 is a block diagram showing the details of the second embodiment and corresponds to FIG. 16 in which the details of the first embodiment are shown. As can be seen from FIG. 25, the second embodiment is different from the first embodiment in that the co-processor 34 of the second embodiment has a different structure from that of the first embodiment and that the second embodiment further comprises a normalizing circuit 740, a brightness computing unit 760 and a delay circuit 761 which is added thereto for timing the outputs of the normalizing circuit 740 and brightness computing unit 760 with the output of brightness data BRI. In FIG. 25, for simplicity, video RAMs and field buffer controllers in the field buffer 40 are simply designated VRAM/FBC 720–732.

The operation of the second embodiment will now be described. The second embodiment determines brightness data for each dot from a light source vector for each scene and a normal vector for each dot, using the aforementioned formula (1).

The sorting unit 22 receives a normal vector N=[NX, NY, NZ] as a kind of polygon vertex data. In the normal vector, NX, NY and NZ are 12-bit signed fixed-point data, respectively. More particularly, the most significant bit is a sign bit; and the remaining 11 bits represent numerals below the point. Thus, this data is equal to or more than minus one but less than plus one. If the data is expressed by hexadecimal digits regardless of the position of point, "−1" is 800$h$ and a numeral nearest "+1" is 7FFh.

The operation of the sorting unit 22 is completely the same as that of the first embodiment. However, it is required to provide a new data area on the data RAM 60 to store the normal vectors.

The co-processor 34 requires sum-of-products computing elements and dividers to compute three coordinate data of a normal vector. However, the second embodiment must treat many data (Z, TX, TY, NX, NY and NZ). Unlike the first embodiment comprising a plurality of dividers, therefore, the second embodiment comprises a single inverse number generator 706 for determining the inverse number of Z* and a plurality of multipliers 710–718. Usually, the multiplier is a circuit smaller than the divider. For processing large amount of data, such a configuration as is given which uses a plurality of multipliers will reduce the load on the hardware.

The sum-of-products computing elements 700–704 and multipliers 714–718 are exclusively used to compute unsigned integers. Therefore, the most significant bit (sign bit) must be inverted at the inlets of the sum-of-products computing elements 700–704 and at the outlets of the multipliers 714–718. This is equivalent to that an offset of 800$h$ is added at the inlet of a sum-of-products computing element and subtracted at the outlet thereof.

The resulting normal vector for each dot has its magnitude smaller than one. This is referred to "N'". In order to obtain a normalized normal vector, the normalizing circuit 740 must perform the following computation:

$$N=N'/|N'|=N'/(NX'^2+NY'^2+NZ'^2)^{1/2} \quad (2)$$

If the normal vector for each vertex in the polygon is very little in displacement, it may be considered that N is equal to N'. In such a case, the normalizing circuit 740 shown in FIG. 25 can be omitted.

Figure 26:
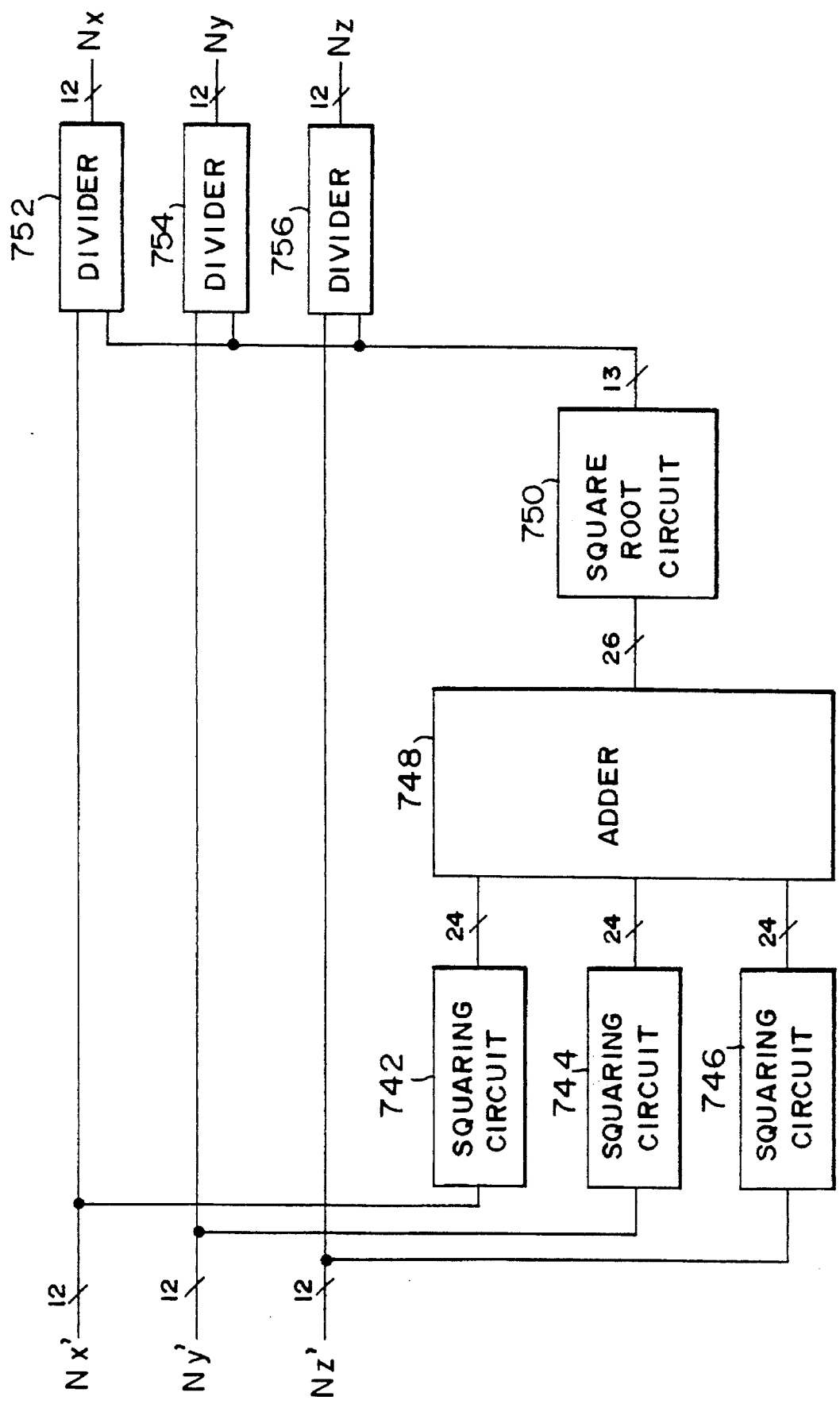
FIG. 26 is a block diagram of a normalizing circuit.

FIG. 26 shows an arrangement usable in the normalizing circuit 740. Data [NX40, NY', NZ'] are inputted into squaring circuits 742–746. The data are summed at an adder 748 and a square root is calculated at a square root circuit 750. The square root data are divided by [NX', NY', NZ'] at dividers 752–756 to determine a normalized normal vector [NX, NY, NZ].

When a normal vector for each dot is determined in real time, brightness data BRI for each dot is then determined from the aforementioned formula (1). In this case, values of $\cos\phi$ and $\cos\psi$ are required.

First of all, a scalar produce between a light source vector L and a normal vector N is $$L \cdot N = |L||N| \cos \phi.$$

Since $|L|=|N|=1$, $$\cos \phi = L \cdot N = L_x N_x + L_y N_y + L_z N_z \quad (3)$$

On the other hand, a reflective light vector R is $$R=2N(L \cdot N)/|N|^2-L \quad (4)$$

Since $|N|=1$, from the formulas (3) and (4), $$R=2N \cos \phi - L \quad (5)$$

Since $\cos\psi$ is a scalar product between a view vector E=[0, 0, 1] and the reflective light vector R, $$\begin{aligned} \cos\psi &= E \cdot R = 0 \cdot Rx + 0 \cdot Ry + 1 \cdot Rz \\ &= Rz \\ &= 2Nz \cos \phi - Lz \end{aligned} \quad (6)$$

Thus, the values, $\cos\phi$ and $\cos\psi$, are determined from the normal vector [NX, NY, NZ]. These values are substituted into the formula (1) to determine the brightness data BRI for each dot.

Figure 27:
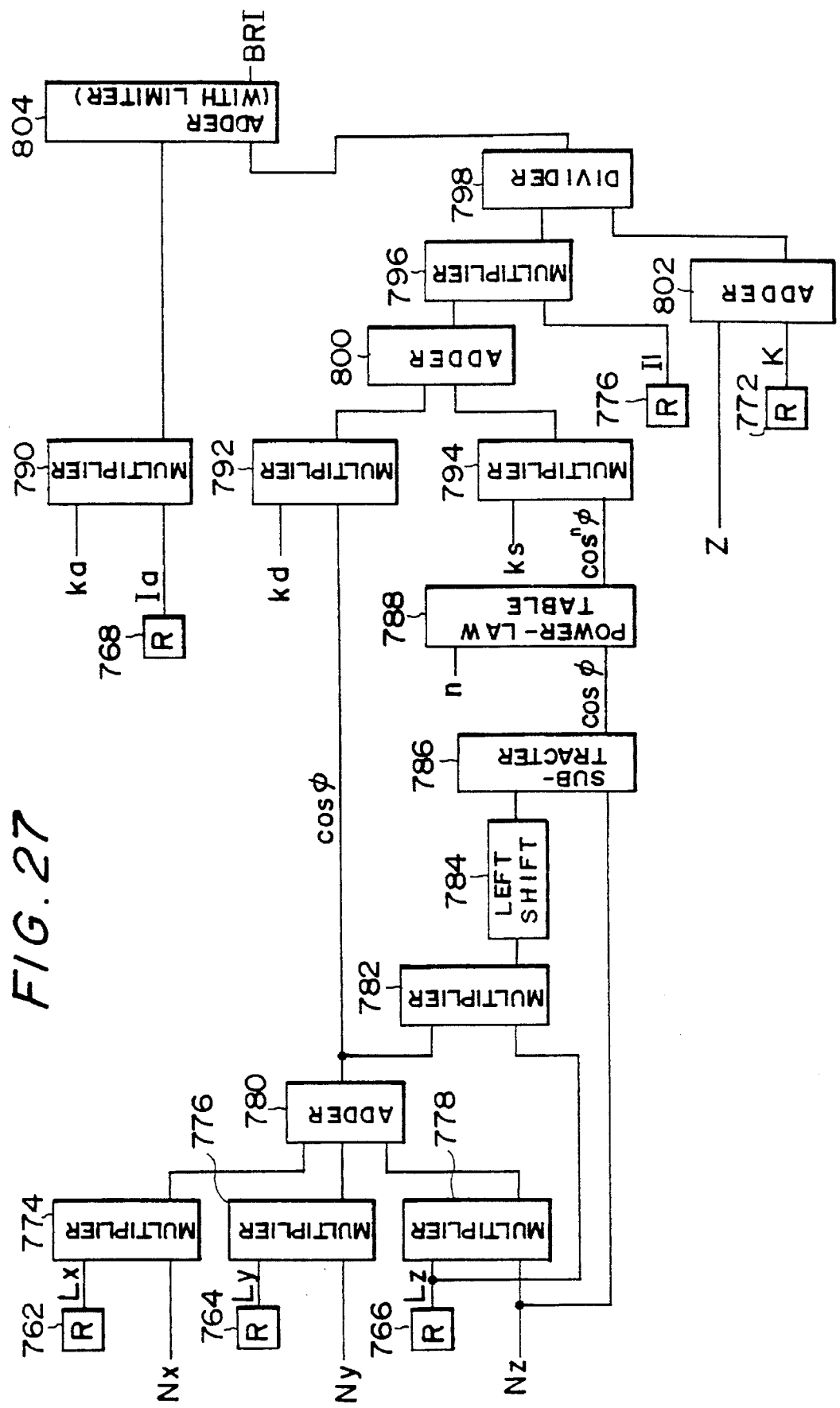
FIG. 27 is a block diagram of a brightness computing unit.

The computation for determining the brightness data from the normal vector is performed by a brightness computing unit 760. FIG. 27 is a block diagram showing one embodiment of such a brightness computing unit 760.

In FIG. 27, constant registers 762–772 are adapted to store constant data such as light beam vector (LX, LY, LZ). The computation of the above formula (3) is carried out by multipliers 774–778 and an adder 780 to determine $\cos\phi$. Similarly, the computation of the above formula (6) is performed by a multiplier 782, a left shift computing unit 784, subtracter 786 and other units to determine $\cos\psi$. The resulting values, $\cos\phi$ and $\cos\psi$, are used on performing the computation of the above formula (1) by the use of a power-law table 788, multipliers 790–796, a divider 798 and adders 800–804 to determine the brightness data BRI.

The power-law table 788 is formed by RAM and ROM to address $\cos\psi$ and n. The data is not limited to $\cos^n\psi$, but may be any function.

If there is a data of "normal vector on polygon surface" as one of attributes (constant for each polygon), the system can reduce the number of bits or improve its accuracy by handling a displacement of the normal vector, rather than the normal vector itself. In such a case, the displacement of a normal vector for each dot is determined by interpolation and then added to the "normal vector on polygon surface" to determine a normal vector.

D. Third Embodiment

1. Summary

The third embodiment utilizes a surface shape data as one of the rendering data and more particularly uses the displacement of a normal vector. Further, the third embodiment uses a bump mapping texture coordinate as one of the texture coordinates. The texture data storage unit (rendering data storage unit) stored the displacement of each normal vector as rendering data. The brightness data will be determined by reading out the displacement of a normal vector by the use of the interpolated bump mapping texture coordinate. The third embodiment performs an image treating process that is called "bump mapping".

The bump mapping is also called "perturbation mapping" which expresses any pattern of irregularity on the surface of an object. The bump mapping utilizes perturbation components (in many cases, as displacements of normal vectors) to the surface shape of the object. The texture data consisting of the perturbation components will be referred to "bump".

Figure 28:
FIG. 28 is a diagrammatic view illustrating the concept of perturbation bump mapping.

The third embodiment has a "normal vector on polygon surface" as one of attribute data (constant for each polygon). The "normal vector on polygon surface" is subjected to perturbation for each dot by the perturbation components. Thus, a normal vector will be determined for each dot. This is shown in FIG. 28.

Figure 8:
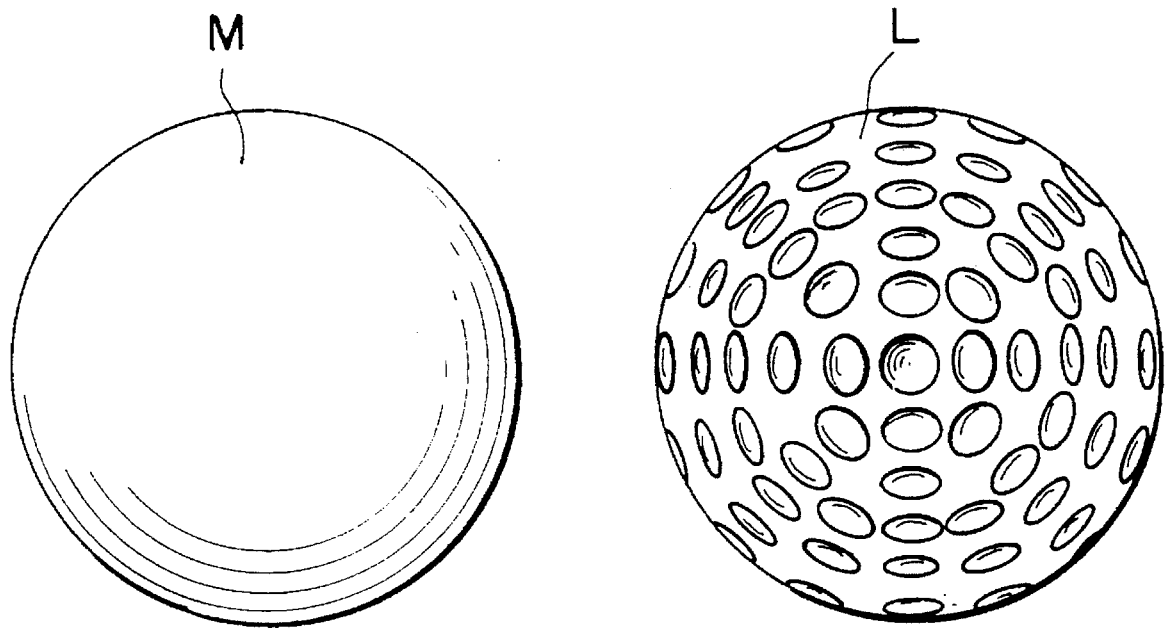
FIG. 8 is a diagrammatic view illustrating a bump mapping.

If the normal vector has been determined for each dot in such a manner, the brightness data can be determined in the same manner as in the second embodiment. This enables an image representing an object with a crater-shaped surface to be synthesized as shown in FIG. 8.

2. Details

Figures 29, 29A:
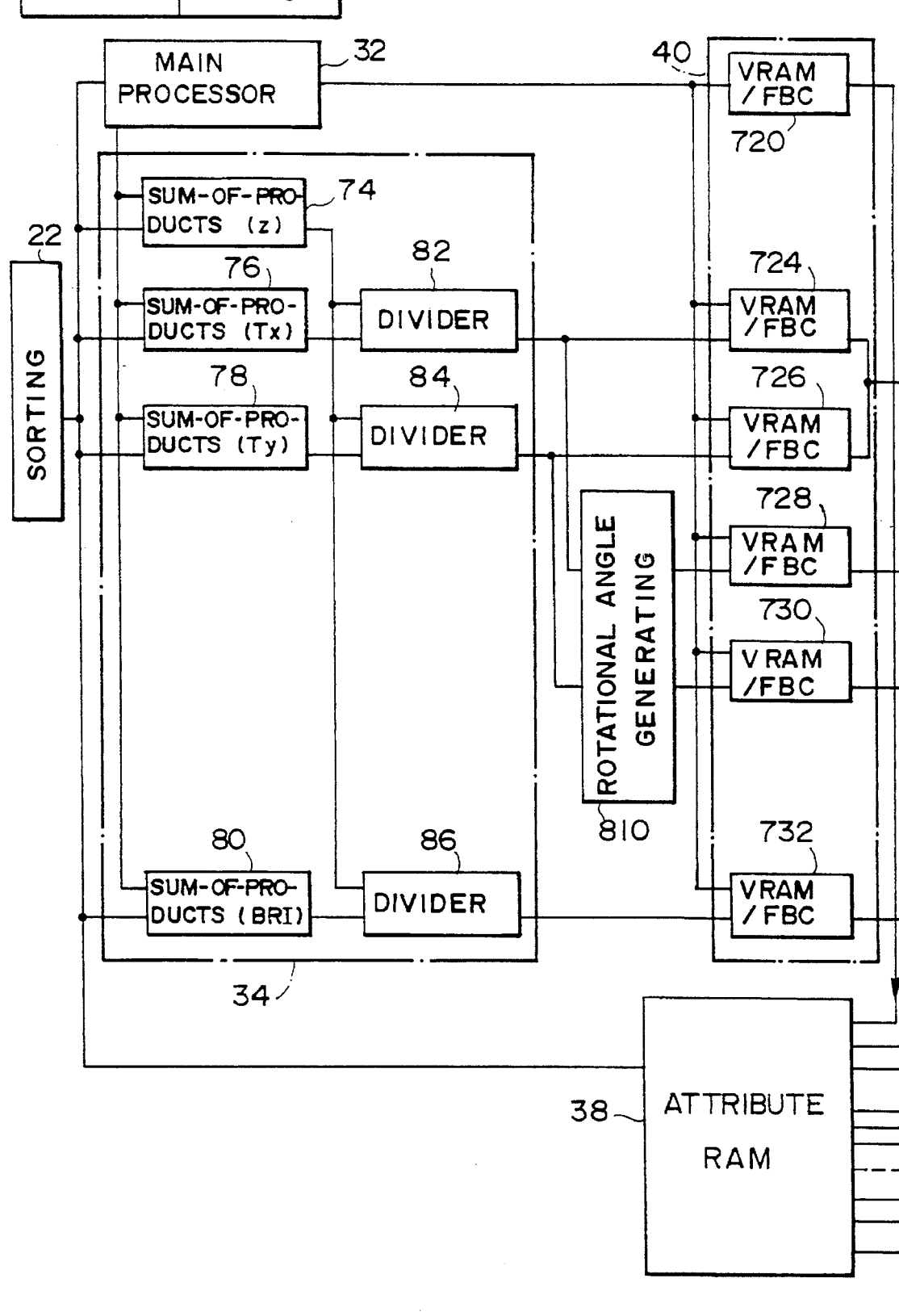
FIG. 29 is a block diagram, split into FIGS. 29A and 29B of the third embodiment of an image synthesizing system constructed in accordance with the present invention.
Figure 29B:
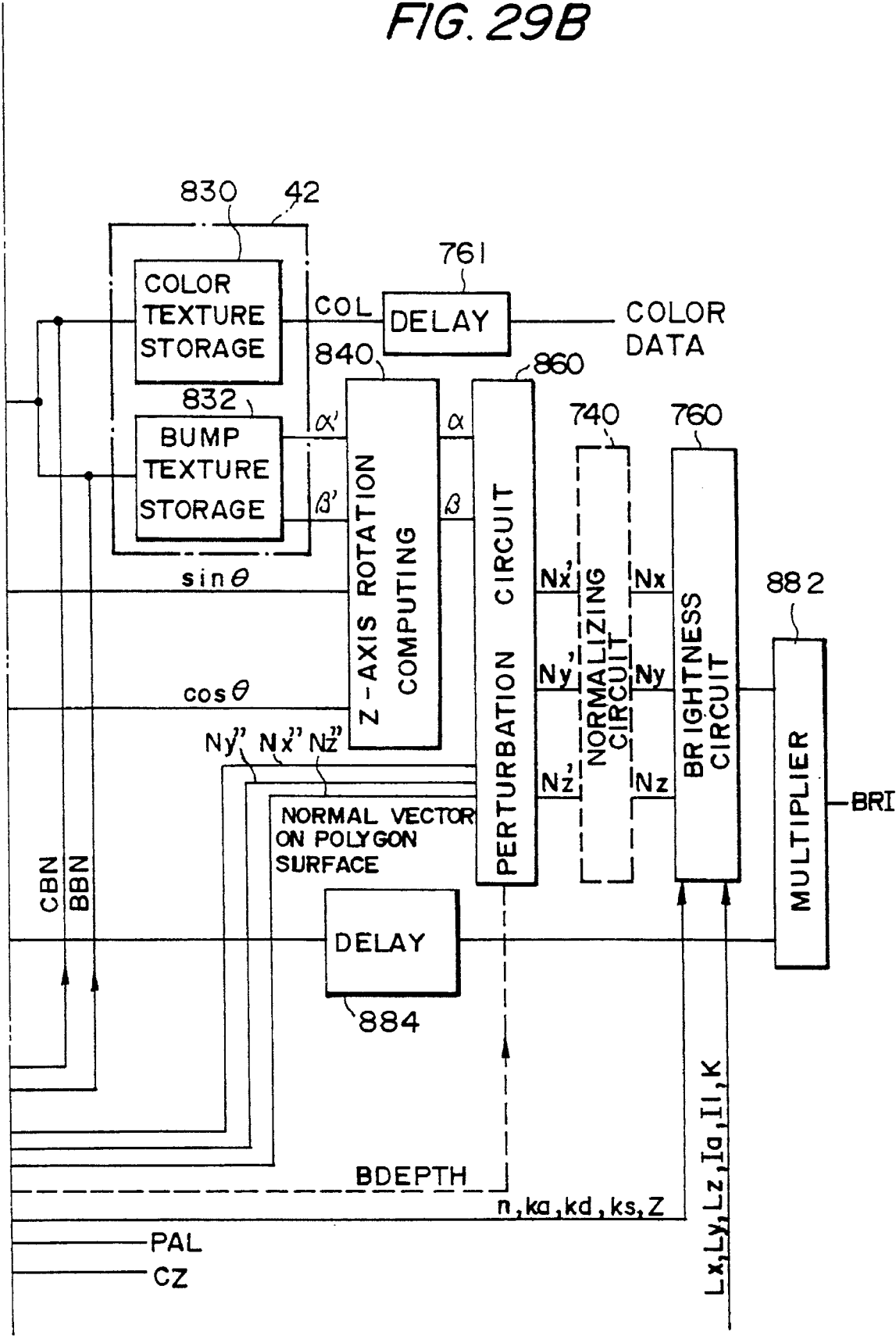

FIG. 29 is a block diagram of the details in the third embodiment. As shown in FIG. 29, the third embodiment is different from the second embodiment of FIG. 25 in that the structures of the co-processor and texture data storage unit 34, 42 in the third embodiment are different from those of the second embodiment and that the third embodiment additionally comprises a rotational angle generating unit 810, a Z-axis rotation computing unit 840, a perturbation circuit 860 and a multiplier 882. The texture data storage unit 42 comprises a color texture storage unit 830 for storing color data as texture data and a bump texture storage unit 832 for storing bump data as texture data.

Unlike the color data mapping, the bump mapping cannot be carried out simply by mapping and adding perturbation components to the normal vectors on the polygon surface. Since the perturbation components are vectors having orientation data, the rotation and perspective transformation muse be carried out in a 3-D space following those calculations performed on the polygon. If the rotation and perspective transformation are applied to the perturbation components for each dot, however, a huge computation is required. Therefore, the third embodiment uses a simplified approximation.

Bump data is expressed by not rectangular coordinates but polar coordinates. More particularly, perturbation to the normal vector on the polygon surface is expressed as rotational angles about X-axis and Y-axis. This eliminates the computation for following the rotations of the polygon itself about X-axis and Y-axis. However, the computation following the rotation about Z-axis cannot be omitted. An approximation computation for reflecting the rotation about Z-axis on the hump data will be described below.

Figure 30A:
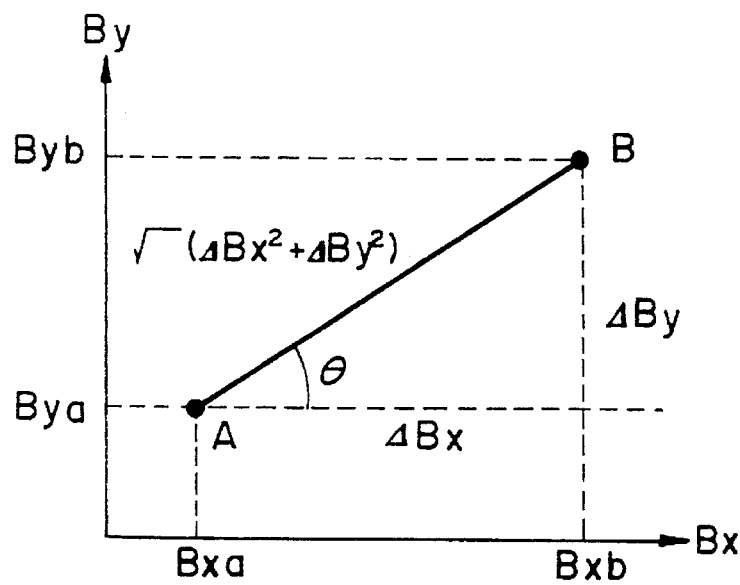

As shown in FIG. 30A, a bump texture plane in the bump texture storage unit 832 is expressed by variables Bx and By. As shown in FIG. 30A, it is assumed that on interpolation of scan line, points on the bump texture plane corresponding to left and right outline points are A=[Bxa, Bya] (start point) and B=[Bxb, Byb] (end point). Straight lines on the texture plane are mapped to be straight lines also on the screen. Thus, the bump data mapped by interpolation on the scan line will be on such a line segment AB at all times. It is now assumed that an angle included between the line segment AB and a straight line parallel to the Bx axis is θ. Since this angle θ also reflects the result of the perspective transformation, it may be considered that the rotation about Z-axis is completed simultaneously with the computation following the perspective transformation if the bump data is also inversely rotated about Z-axis by θ.

More particularly, the rotational angle generating unit 810 performs the following computation:

$$\sin \theta = \Delta By/(\Delta Bx^2 + \Delta By^2)^{1/2} \quad (7)$$

$$\cos \theta = \Delta Bx/(\Delta Bx^2 + \Delta By^2)^{1/2} \quad (8)$$

$$(\Delta Bx = Bxb - Bxa, \Delta By = Byb - Bya)$$

Figure 30B:
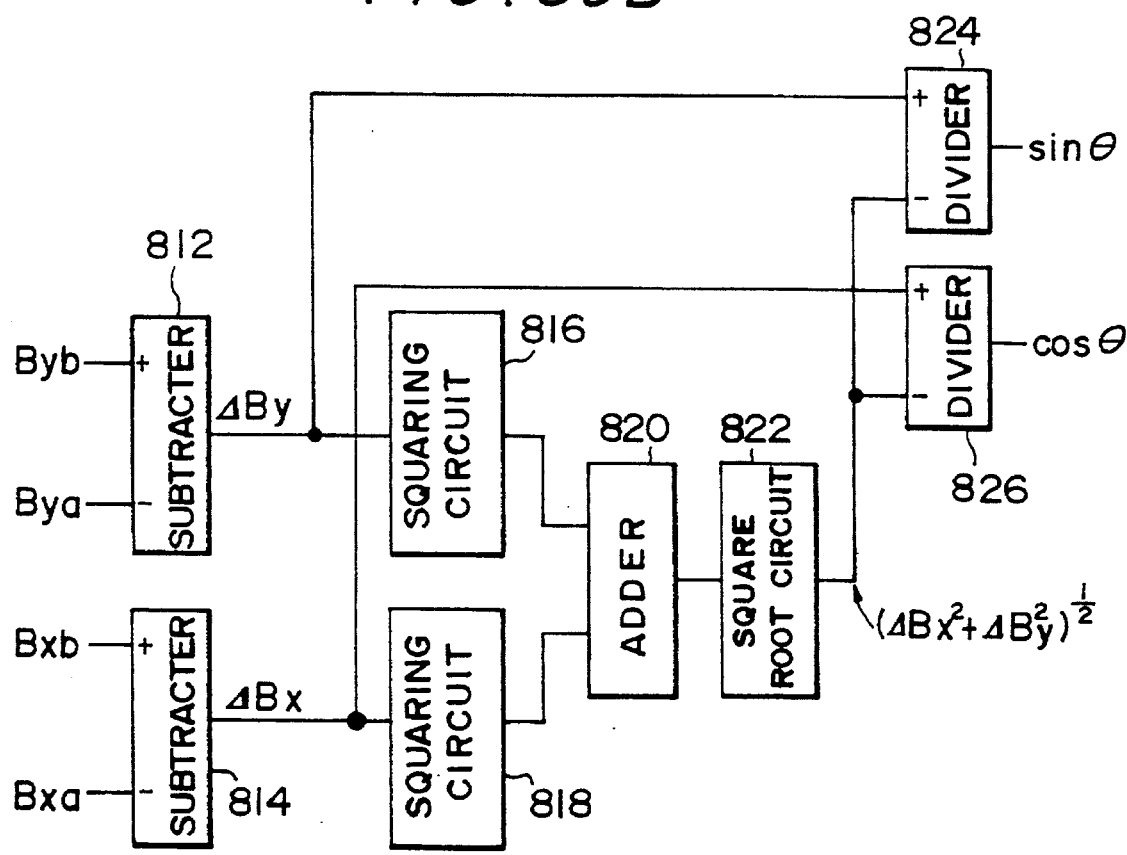
FIG. 30B is a block diagram of a rotational angle generating unit.

FIG. 30B shows one embodiment of the rotational angle generating unit 810. As shown in FIG. 30B, the rotational angle generating unit 810 receives [Bxa, Bya] and [Bxb, Byb] which are in turn used to determine $(\Delta Bx^2 + \Delta By^2)$ through subtracters 812, 814, squaring circuits 816, 818, adder 820 and square root circuit 822. Subsequently, values, $\sin\theta$ and $\cos\theta$, will be determined through dividers 824 and 826.

The rotational angle generating unit 810 may directly determine the value of θ which is in turn stored in the field buffer unit 40. The latter is more advantageous in that the memory capacity of the field buffer unit 40 can be reduced. In the third embodiment, however, the computing process can be simplified by computing and storing the values of $\sin\theta$ and $\cos\theta$ in the field buffer unit 40.

The inverse rotation of the bump data about Z-axis by θ is executed by a Z-axis rotation computing unit 840. This computation is performed by the following formula:

$$[x \ y \ z] = [x' \ y' \ z'] \begin{bmatrix} \cos\theta & -\sin\theta & 0 \\ \sin\theta & \cos\theta & 0 \\ 0 & 0 & 1 \end{bmatrix} \quad (9)$$

Namely, $$x = x' \cos\theta + y' \sin\theta \quad (9a)$$

$$y = -x' \sin\theta + y' \cos\theta \quad (9b)$$

$$z = z' \quad (9c)$$

Part of the formula (9) expressed by $$Rz = \begin{bmatrix} \cos\theta & -\sin\theta & 0 \\ \sin\theta & \cos\theta & 0 \\ 0 & 0 & 1 \end{bmatrix} \quad (10)$$

will be referred to "rotation matrix about Z-axis". Since there is no bump data corresponding to z, the formula (9c) is actually meaningless.

The bump data is not rectangular coordinates but rotational angles. But bump data is handled in the same manner as that of the rectangular coordinates x and y when it is assumed that the angles are very little in the formulas (9) and (9a), (9b). Therefore, if it is assumed that the bump data of X-axis and Y-axis rotations stored in the bump texture storage unit 832 are respectively α' and β', the formulas (9a) and (9b) can be rewritten to be:

$$\beta = \beta' \cos\theta + \alpha' \sin\theta \quad (11a)$$

$$\alpha = -\beta' \sin\theta + \alpha' \cos\theta \quad (11b)$$

Figure 31:
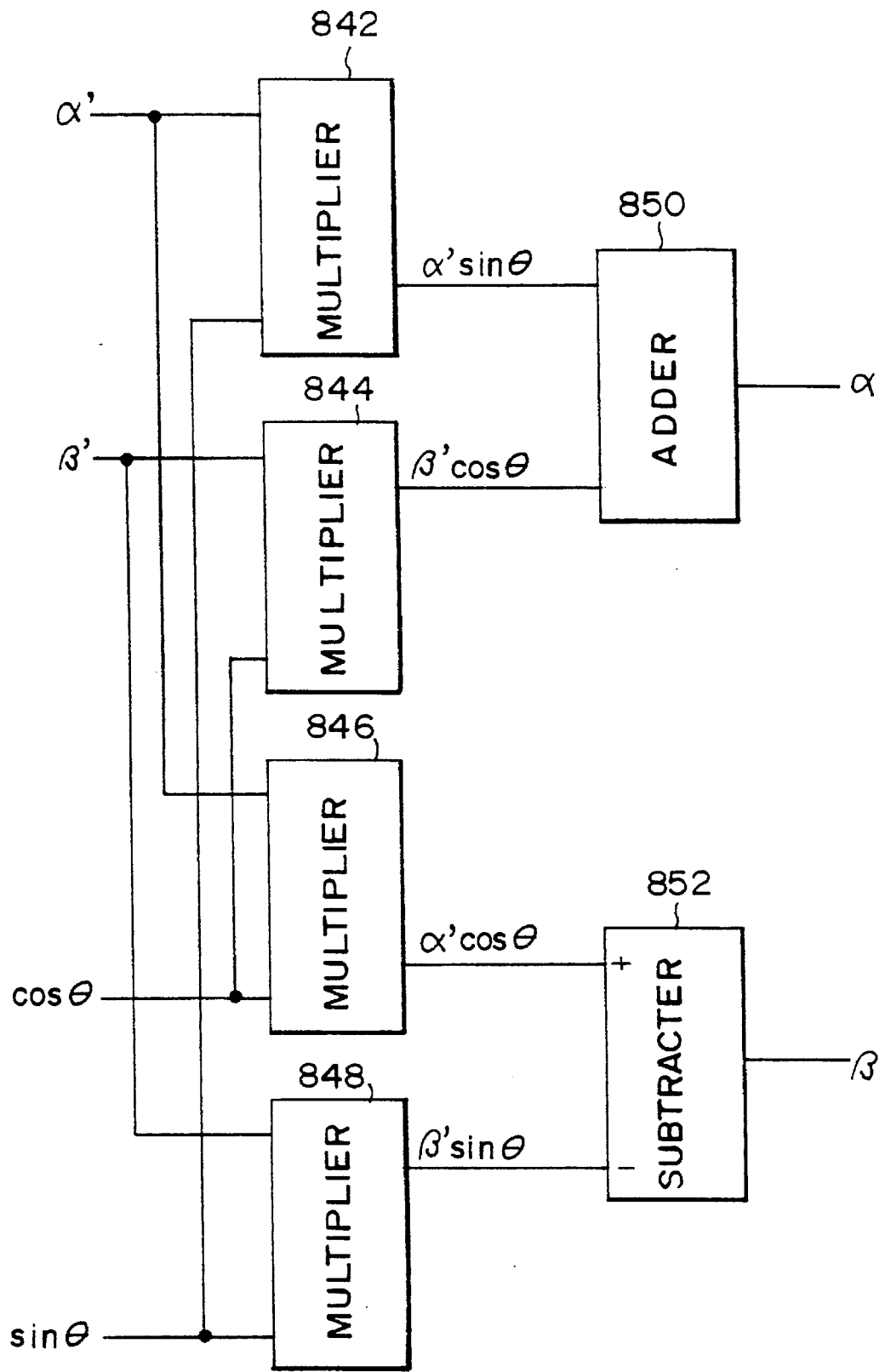
FIG. 31 is a block diagram of a Z-axis rotation computing unit.

In such a manner, the bump data α0 and β will be determined after the Z-axis rotation has been computed by the Z-axis rotation computing unit 840. FIG. 31 shows the details of such a Z-axis rotation computing unit 840. As shown in FIG. 31, the Z-axis rotation computing unit 840 receives bump data α' and β' from the bump texture storage unit 832. The computation of Z-axis rotation is then executed through multipliers 842–848 and adders 850 and subtracter 852 in accordance with the above formulas (11a) and (11b).

Thus, the rotation matrices of X-axis and Y-axis rotations are respectively expressed by $$Rx = \begin{bmatrix} 1 & 0 & 0 \\ 0 & \cos\alpha & \sin\alpha \\ 0 & -\sin\alpha & \cos\alpha \end{bmatrix} \quad (12)$$

$$Ry = \begin{bmatrix} \cos\beta & 0 & -\sin\beta \\ 0 & 1 & 0 \\ \sin\beta & 0 & \cos\beta \end{bmatrix} \quad (13)$$

By using the condition that the angles are very little and approximate formulas $$\sin\omega \doteq \omega$$

$$\cos\omega \doteq 1 (\omega \doteq 0, \text{radian}),$$

the above formulas (12) and (13) can be expressed by the following approximate formulas:

$$Rx = \begin{bmatrix} 1 & 0 & 0 \\ 0 & 1 & \alpha \\ 0 & -\alpha & 1 \end{bmatrix} \quad (14)$$

$$Ry = \begin{bmatrix} 1 & 0 & -\beta \\ 0 & 1 & 0 \\ \beta & 0 & 1 \end{bmatrix} \quad (15)$$

The rotation matrices are then used to compute perturbation at a perturbation circuit 860. The perturbation circuit 860 receives a normal vector [NX", NY", NZ"] to be perturbed from the attribute RAM unit 38, as shown in FIG. 29. The perturbation circuit 860 computes the perturbation to the original normal vector [NX", NY", NZ"] to determine the perturbed normal vector [NX', NY', NZ'].

Although the order of the rotations about the respective axes cannot be changed, it may be considered herein that such a change can be executed from the reason that the angles are very little. For example, if the rotation about X-axis is first to be executed, from $$[NX', NY', NZ'] = [NX'', NY'', NZ''] Rx Ry \quad (16)$$

$$NX' = NX'' + \alpha\beta NY'' + \beta NZ'' \quad (16a)$$

$$NY' = NY'' - \alpha NZ'' \quad (16b)$$

$$NZ' = -\beta NX'' + \alpha NY'' + NZ'' \quad (16c)$$

Since both the values α and β in the second term of the right side of the formula (16a), "αβy", are very little and can be considered to be equal to zero, the formula (16a) can be rewritten by $$NX' = NX'' + \beta NZ'' \quad (16a)'$$

Even if the Y-axis rotation is first executed, the same result will be obtained.

Figure 32:
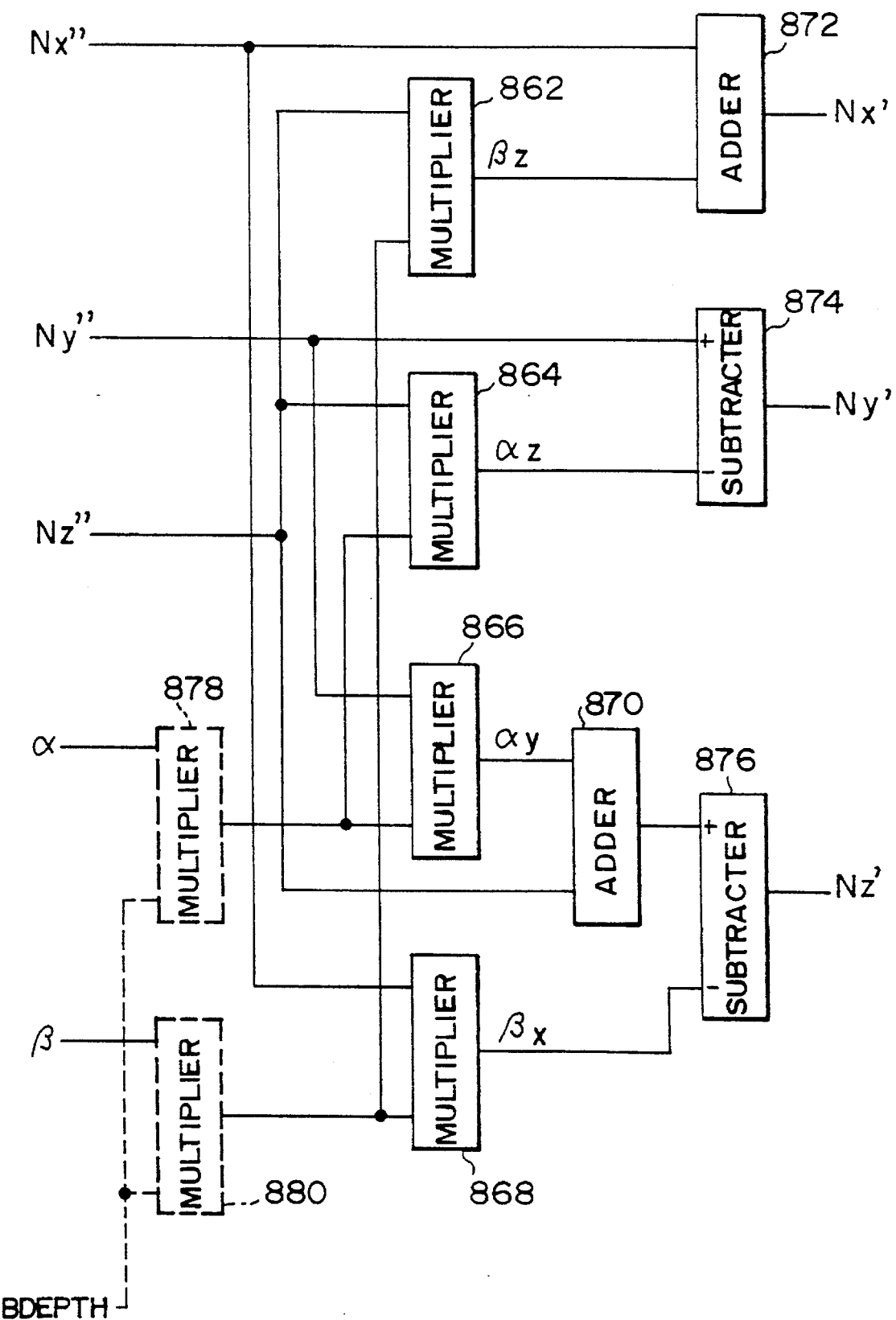
FIG. 32 is a block diagram of a perturbation circuit.

FIG. 32 shows one embodiment of the perturbation circuit 860. The perturbation circuit 860 performs the computations in accordance with the formulas (16a)', (16b) and (16c). More particularly, as shown in FIG. 32, the perturbation circuit 860 receives a normal vector [NX", NY", NZ"] of polygon surface from the attribute RAM unit 38. The perturbed normal vector [NX', NY', NZ'] is determined through multipliers 862–868, adders 870, 872 and subtracters 874, 876.

If BDEPTH signal is inputted into the perturbation circuit 860 through the attribute RAM unit 38 and when additional multipliers 878 and 880 are provided as shown in FIG. 32, the depth at the convexo-concave surface can be changed in one and the same bump texture. More particularly, the depth at the convexo-concave surface in one and the same bump texture can be changed by multiplying the values α and β with a preselected BDEPTH signal.

The normal vector [NX', NY', NZ'] so computed is then normalized into [NX, NY, NZ] by the normalizing circuit 740 as in the second embodiment, if necessary. The normalized value is then computed to determine a brightness data BRI through the brightness computing unit 760 and a multiplier 882.

Among the circuits relating to the bump mapping, only the rotational angle generating unit 810 is disposed in front of the field buffer unit 40. The interpolation of scan line (between left and right outline points) is carried out from left to right as a rule by the main processor and co-processor 32, 34. Prior to such an interpolation, however, the computation of right outline point is performed regardless of whether or not a polygon has already been drawn. This is a point B=[Bxb, Byb] in FIG. 30A. Since vacant time corresponding to one data originally exists prior to initiation of the scan line interpolation, the processing time will not be affected by the output of the point B. The rotational angle generating unit 810 has an input register (not shown in FIG. 30B) which holds the values Bxb and Byb.

Subsequently, the normal interpolation is initiated such that the first dot becomes a point A=[Bxa, Bya] and is supplied to the rotational angle generating unit 810. Alternatively, if vacant time is enlarged before initiation of the scan line interpolation and if the left outline point is computed to be the point A regardless of whether or not the polygon has been drawn as in the point B, the values of sinθ and cosθ can more accurately be determined.

Immediately after the point A is given to the rotational angle generating unit 810, it initiates the computation to determine sinθ and cosθ which are in turn stored in the field buffer unit 40.

The texture data storage unit 42 connected to the readout side of the field buffer unit 40 comprises the color texture storage section 830 and the bump texture storage section 832, as described. These storage sections 830 and 832 share texture coordinates (Tx=Bx, Ty=By) with each other to simplify the control. However, the storage sections 830 and 832 do not share block numbers BN with each other. To enable the selection of various combinations between color textures and bump textures, the block numbers are classified into color block numbers CBN and bump block numbers BBN. As shown in FIG. 29, these CBN and BBN signals are given from the attribute RAM unit 38 as attribute data.

Figures 33, 33A:
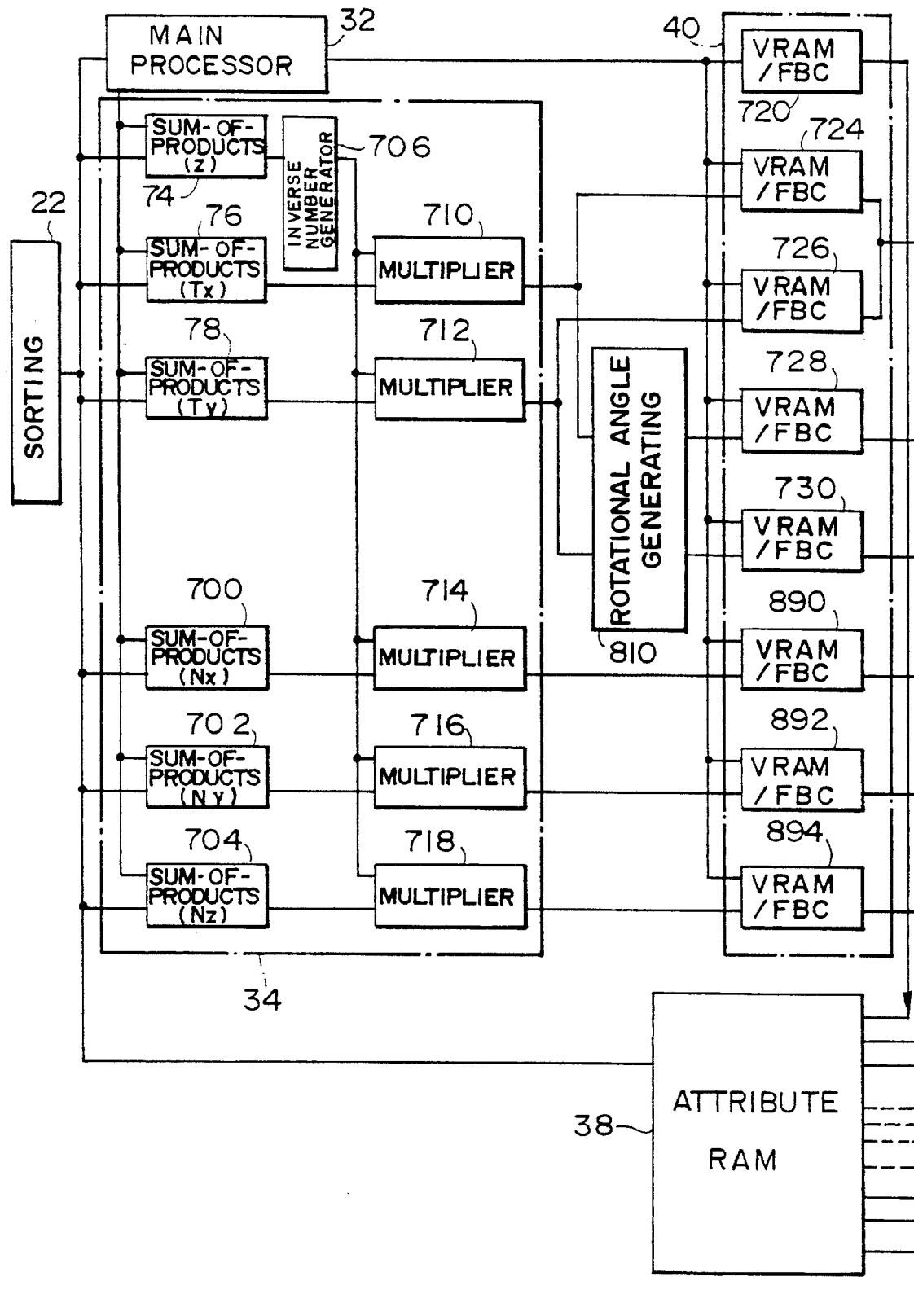
FIG. 33 is a block diagram, split into FIGS. 33A and 33B of a circuit for realizing both the Phong shading and bump mapping simultaneously.

FIG. 33 is a block diagram illustrating the image synthesization with both the Phong shading described in the second embodiment and the bump mapping. In such a case, a normal vector [NX", NY", NZ"] obtained by the Phong shading will be perturbed, as shown in FIG. 33.

If a parameter handled by the Phong shading is the displacement of a normal vector rather than the normal vector itself, it is expected that the system can reduce the number of bits or improve its accuracy.

The texture data storage unit not only stores the numerical values themselves of the texture data as ROM and RAM, but also may store the data in the form of a function relative to the input of the texture coordinates and other data. In such a case, the texture data storage unit is formed as a logic-arithmetic circuit.

Figure 34A:
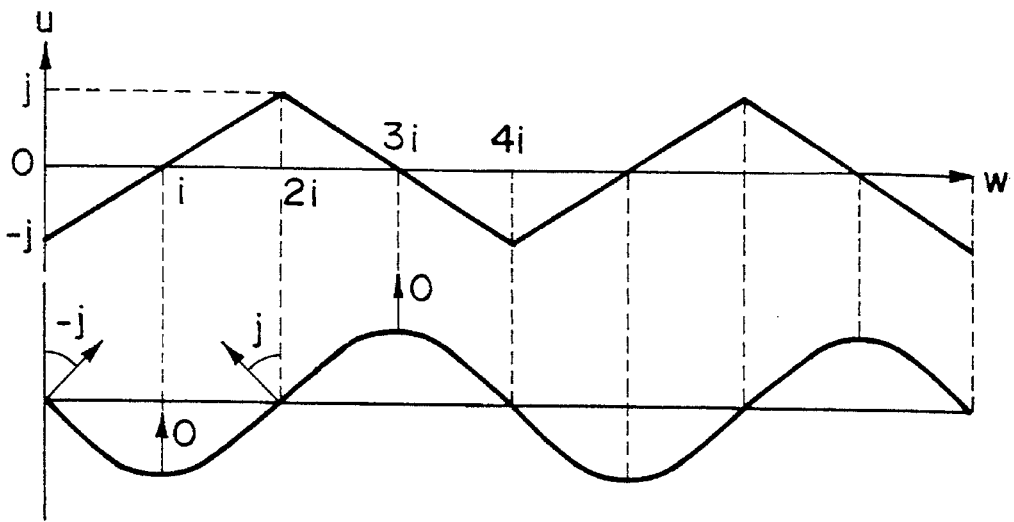
FIGS. 34A to 34C are diagrammatic views illustrating a texture data storage unit which is formed by a logic-arithmetic circuit.

Since a zigzag-shaped function as shown in FIG. 34A is a complex of linear functions, such a zigzag-shaped function can be expressed by:

$$u = \begin{bmatrix} +\{(j/i) \cdot (w \bmod 2i) - j\} & ((w \bmod 4i) < 2i) \\ -\{(j/i) \cdot (w \bmod 2i) - j\} & ((w \bmod 4i) \leq 2i) \end{bmatrix} \quad (17)$$

where w is bump texture coordinate (Bx, By); u is perturbation component (α, β); and i and j are constants (a mod b means a remainder in division a/b). This function can generate the surface shape of a pseudo sin curve. The function has various uses since it is the most basic bump. The function may be applied to both the bump texture coordinates Bx and/or By.

Figure 34B:
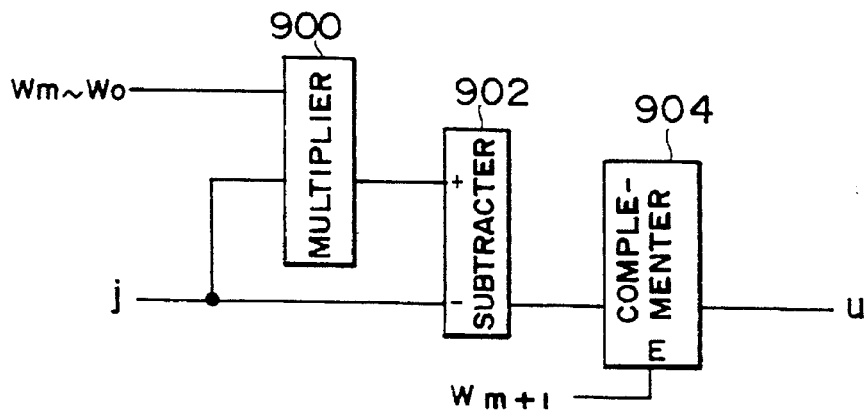

If the constant i is a multiple of 2, there may be realized a circuit comprising such multiplier 900, subtracter 902 and complementer 904 as shown in FIG. 34B.

Then $W_m$–$W_0$ (low order m+1 bits of W) and j are inputted to the multiplier 900. And low order m bits of the multiplier 900 output is rounded off before being inputted to the subtracter 902. All output of the subtracter 902 is inputted to the complementer 904 which has $W_{m+1}$ (bit m+1 of W) as an E input.

Figure 34C:
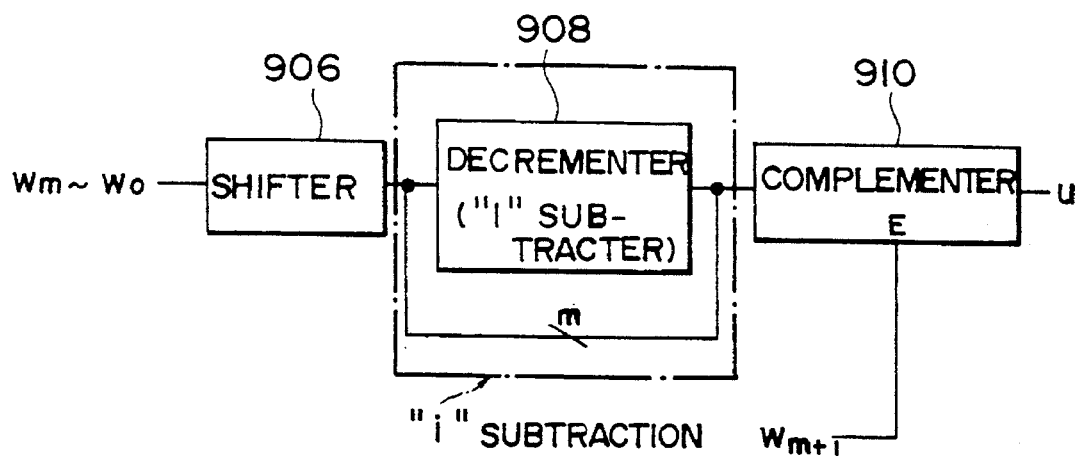

If the constant j is also a multiple of 2, the circuit may further be simplified as shown in FIG. 34C. Such a circuit comprises a shifter 906, a decrementer 908 and a complementer 910. $W_m$-$W_0$ (low order m+1 bits of W) are inputted to the shifter 906, which operates to fix the input to one of the following three conditions.

i<j (m<n):

add (j-i) number of bits of "0" as low order bits (leftward shifting)

i-J (m=n):

no action i>j (m>n ):

delete (i-j) number of low order bits (rightward shifting)

An output of the shifter 906 is inputted to the decrementer 908 except. For the lowest order m bits, which will be inputted to the complementer 910 bypassing the decrementer 908. An E input of the complementer 910 has $W_{m+1}$ (bit m+1 of W) inputted.

The shifter 906 is nor an active circuit, but merely one that is expressed by drawing difference wirings of the respective bits into a black box. If the attribute data contains the depth data BDEPTH of the bumps, the circuit shown in FIG. 34C. is sufficient to accomplish the objects of the present invention.

Figure 33B:
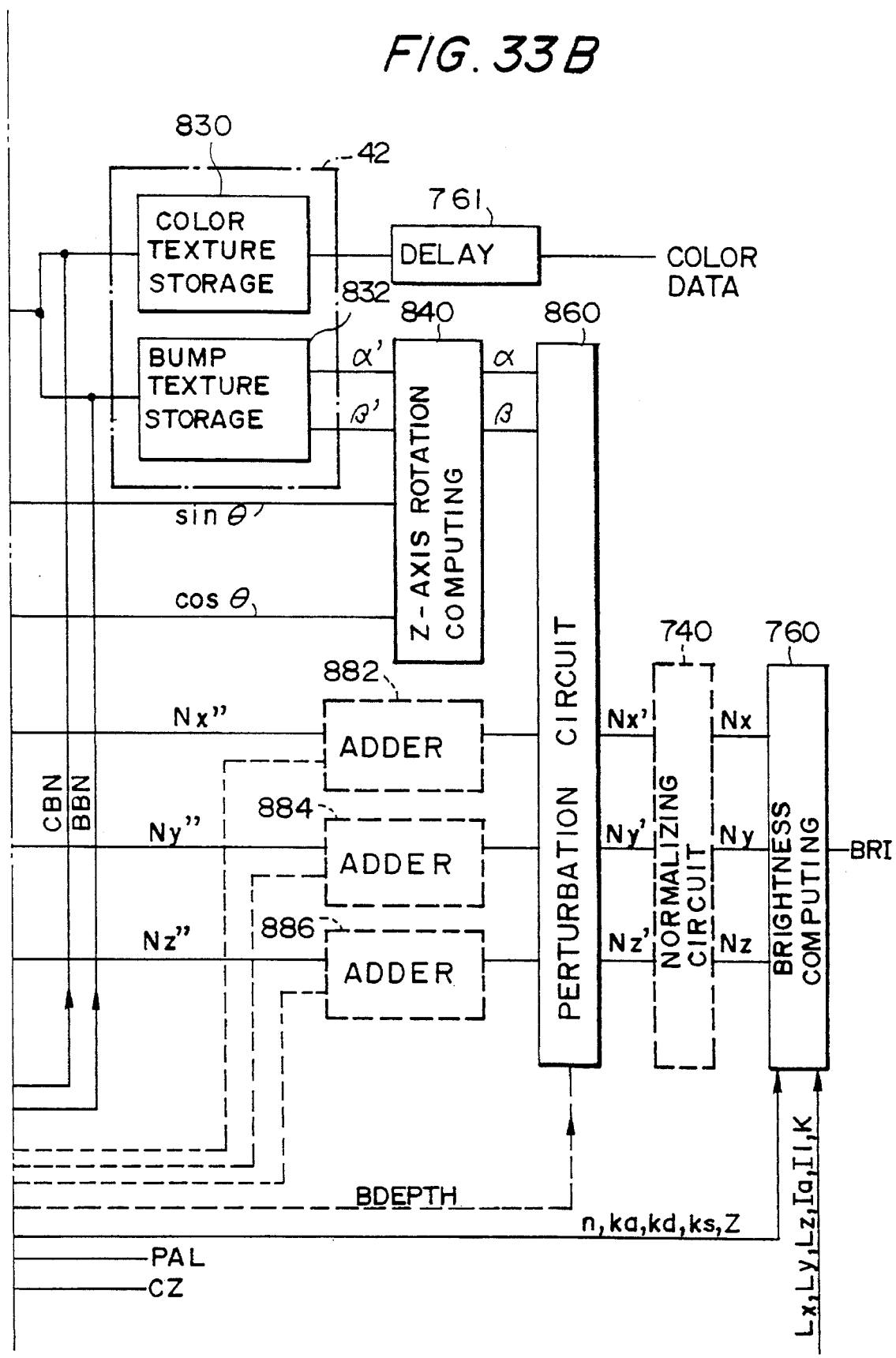
Figure 35A:
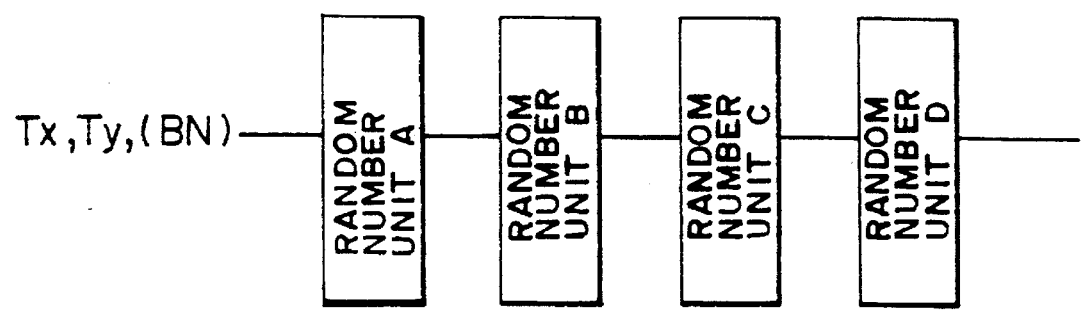
FIGS. 35A and 35B are diagrammatic views illustrating a logic-arithmetic circuit which is defined by a random number generator.
Figure 35B:
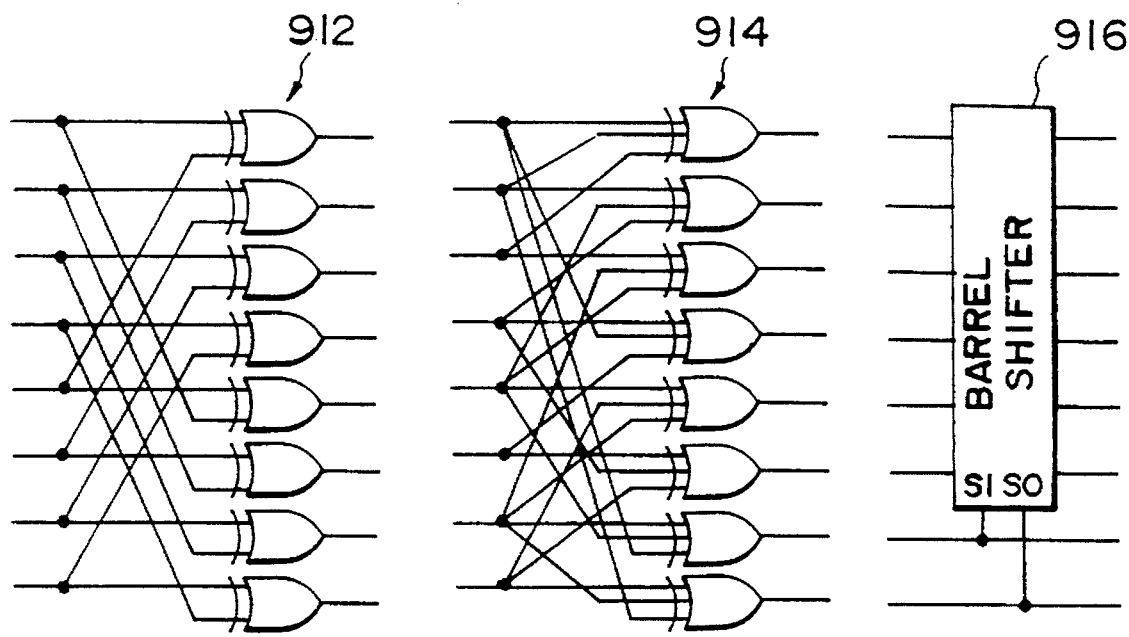
Figure 36:
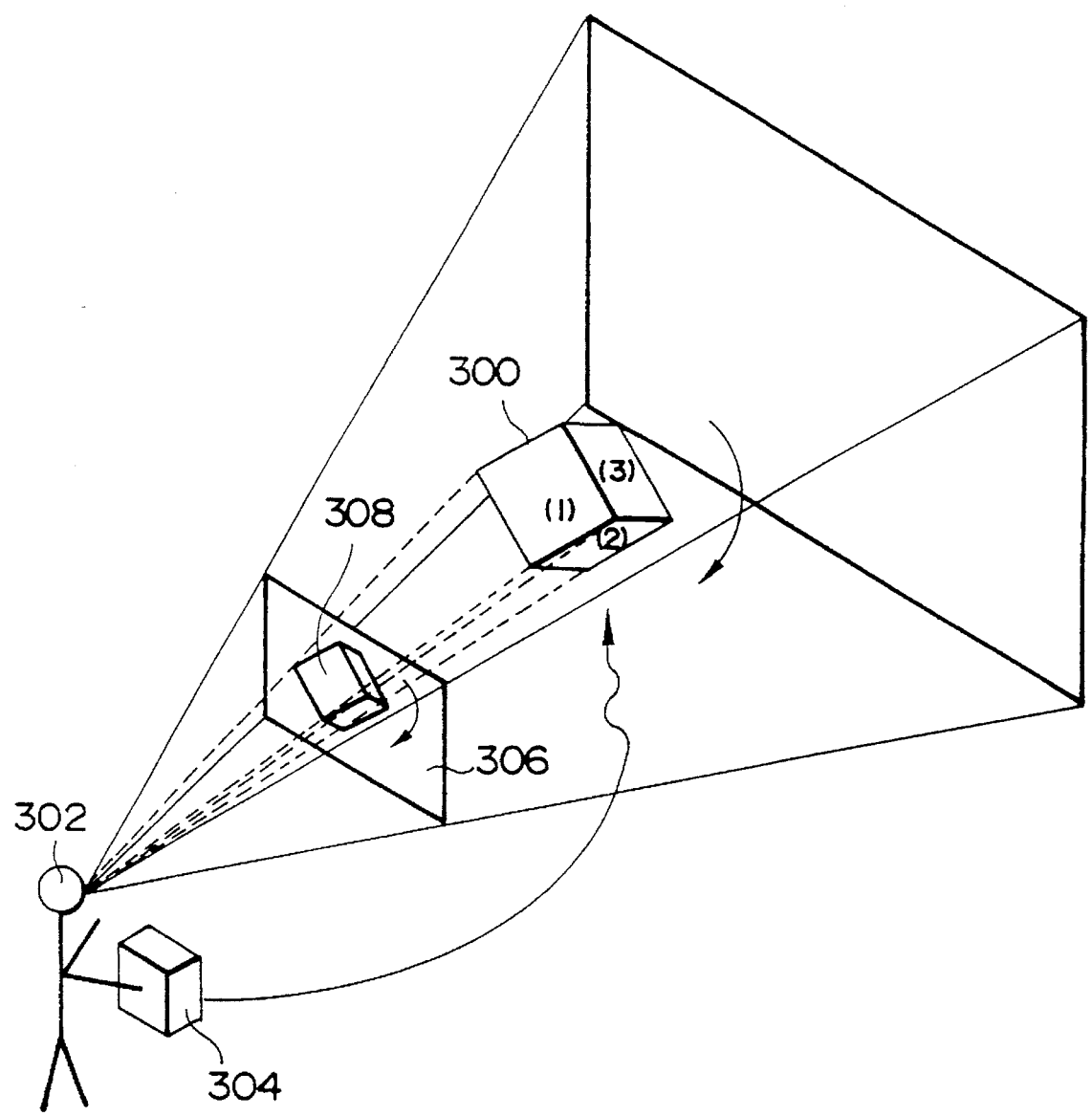
FIG. 36 is a diagrammatic view illustrating the concept of image synthesization in the prior art.
Figure 37:
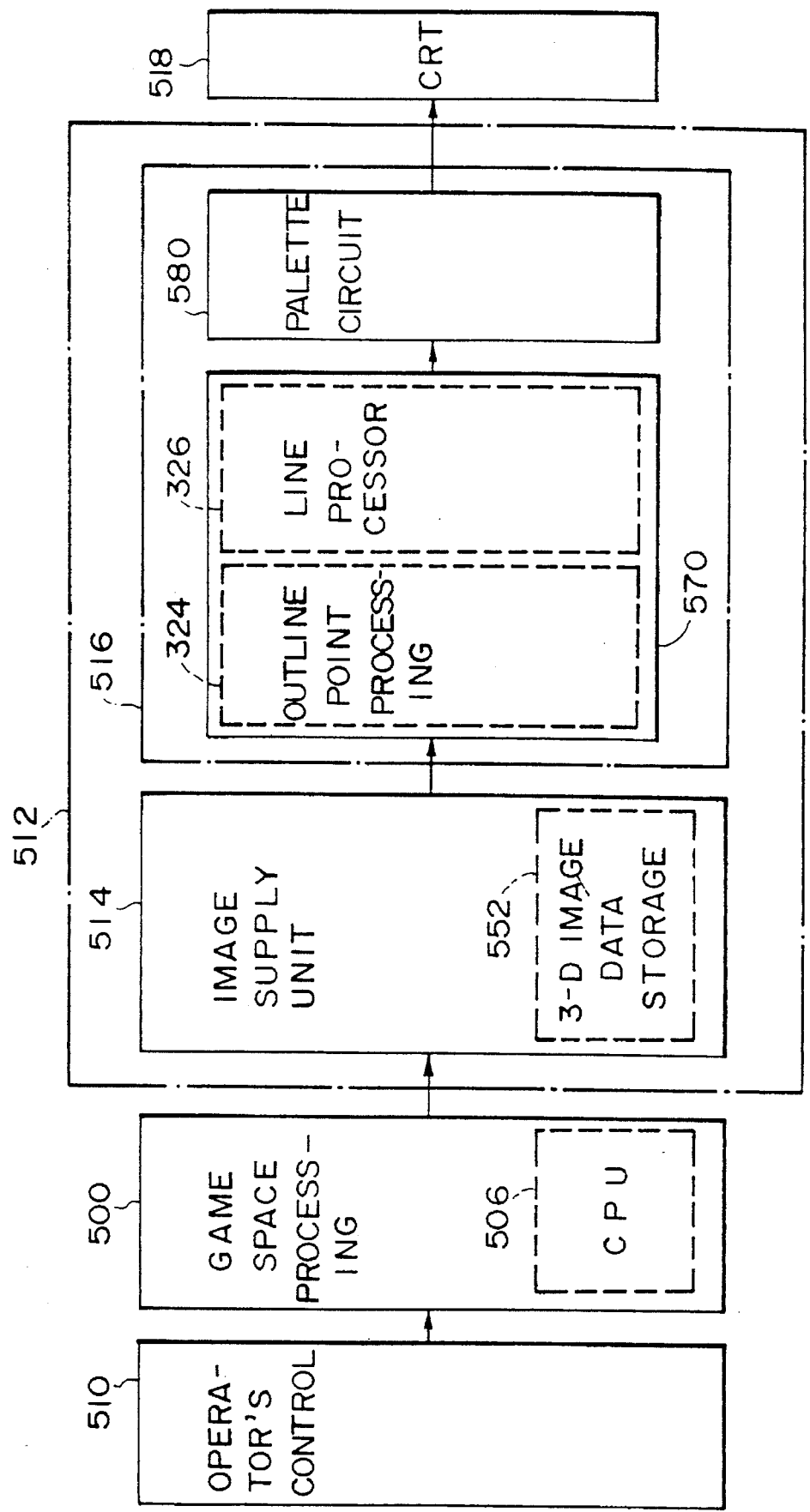
FIG. 37 is a block diagram of an image synthesizing system constructed in accordance with the prior art.
Figure 38:
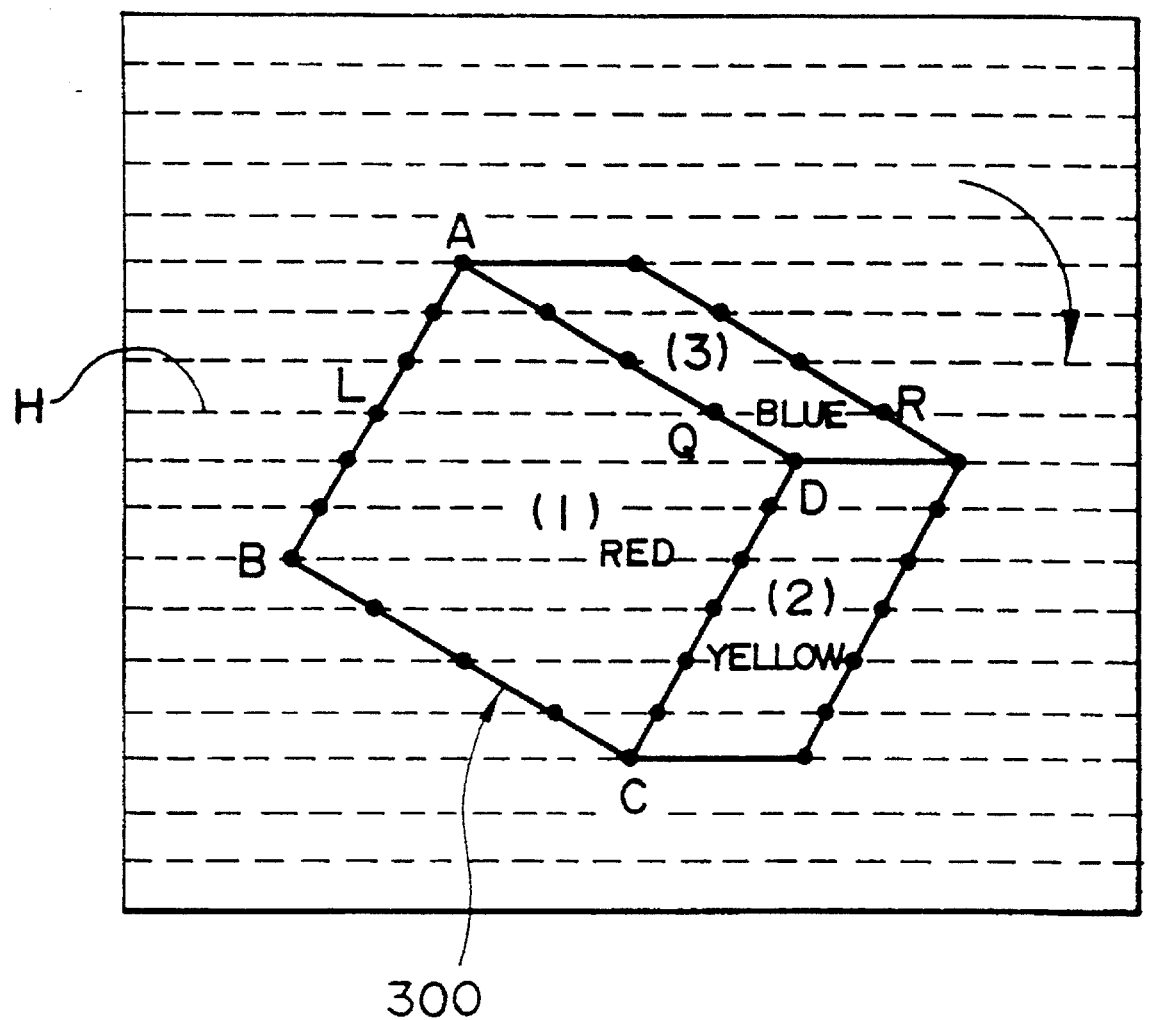
FIG. 38 is a diagrammatic view illustrating a pseudo 3-D image projected onto a screen.
Figure 39:
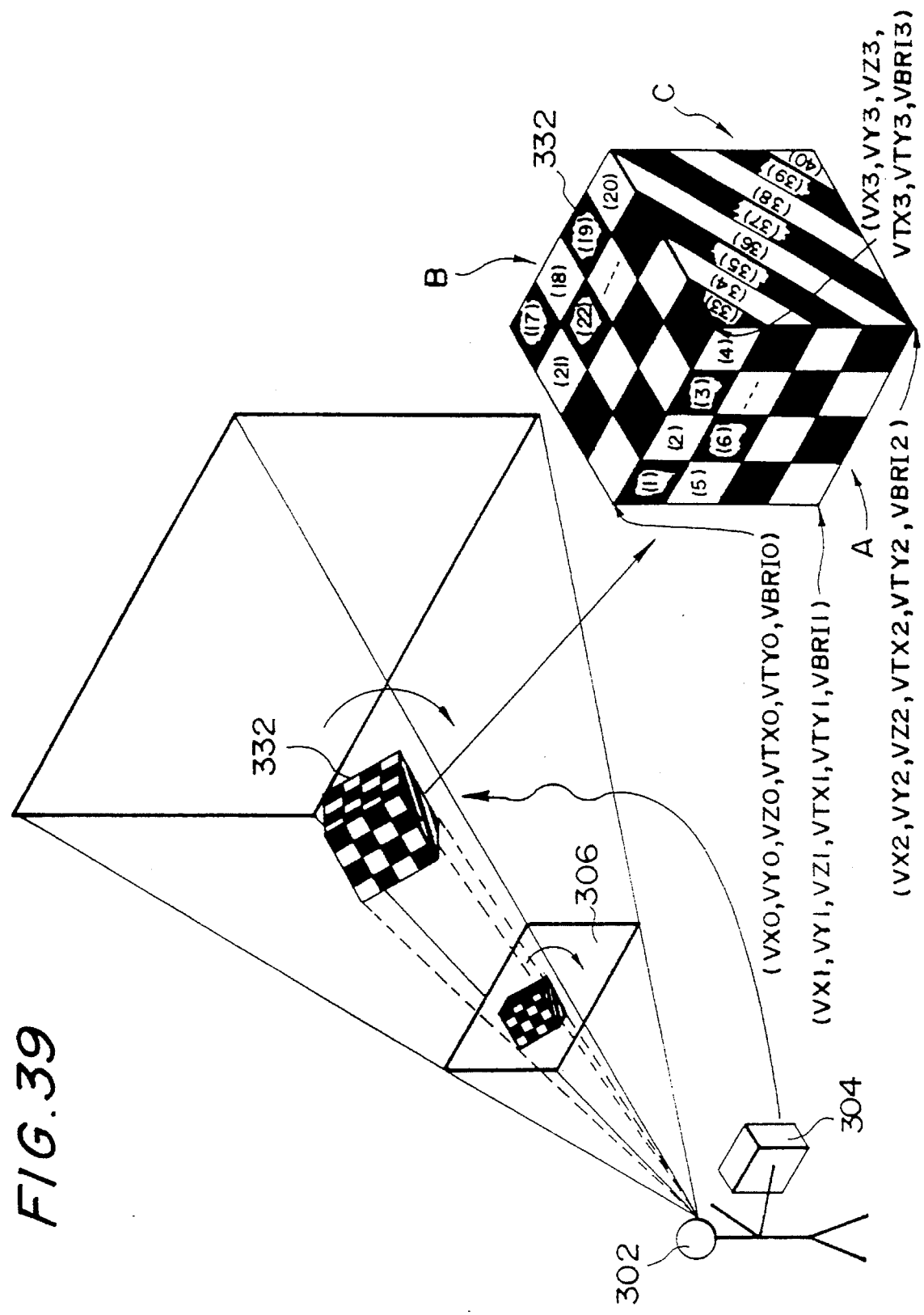
FIG. 39 is a diagrammatic view illustrating the principle of synthesization of a 3-D object mapped with textures.

One of the simple and very useful elements is a random number generator which generates uniformized pseudo random numbers relative to the input of texture coordinates or the like. This is shown in FIG. 35A. The random number generating circuit is united to provide a multi-stage structure consisting of random number units A–D. As shown in FIG. 33B, various random number units 912, 914, 916 may be selected to find an appropriate bump pattern.

The present invention is not limited to the aforementioned embodiments, but may be carried out in various changes and modifications within the scope of the invention.

For example, the linear interpolation may be performed using DDA or the like.

The storage device defining the texture data storage means is not limited to EEPROM, but may be realized in any one of various types of storage devices such as SRAM, DRAM, mask ROM or the like.

The shape of the texture mapped on a polygon is not limited to the same or substantially the same configuration as that of the polygon, but may be mapped in any one of various configurations. For example, by mapping a texture completely different in shape from a polygon, a special image effect such as distorted texture can be provided.

Although the embodiments have been described without any particular distinction between "scan line in computation" and "CRT scan line", these scan lines may be different from each other and, for example, intersect with each other, depending on the limitation on hardware such as SAM capacity of the video RAM or the like.

Furthermore, the surface shade data used in the bump mapping is not limited to the normal vector and the displacement of normal vector as in the embodiments, but may be in any one of various forms. For example, the height of a relief in the surface shape may be used as surface shape data.

We claim:

1. An image synthesizing system for perspectively transforming three dimensional images consisting of three dimensional polygons onto a plane of projection to synthesize pseudo three dimensional images, said system comprising:

representing coordinate determining means for perspectively transforming representing coordinates of each vertex of said three dimensional polygons onto perspective-transformed representing coordinates of each vertex on said plane of projection, and for determining perspective-transformed representing coordinates of each of a plurality of dots defining a polygon, which is formed by the perspective-transformed representing coordinates of the vertices, the plurality of dots being determined by a linear interpolation;

surface data determining means for perspectively transforming surface data corresponding to each vertex of said three dimensional polygons into perspective-transformed surface data of each vertex which is linear relative to the perspective-transformed representing coordinates of each vertex, for determining perspective-transformed surface data of each of a plurality of dots defining a polygon formed by the perspective-transformed surface data of the respective vertices from a surface data linear interpolation and for subjecting the perspective-transformed surface data to an inverse perspective transformation to determine the surface data; and image data forming means for forming image data at a position represented by said perspective-transformed representing coordinates using said surface data determined by said surface data determining means.

2. The image synthesizing system as defined in claim 1, wherein the representing coordinate determining means determines the perspective-transformed representing coordinates of left and right outline points which are intersecting points between an outline of the at least one polygon formed by the perspective-transformed representing coordinates of the vertices and scan lines by linearly interpolating the perspective-transformed representing coordinates of the vertices and also determines the perspective-transformed representing coordinate of each of at least one dot on the scan lines between the left and right outline points by linearly interpolating the perspective-transformed representing coordinates of the left and right outline points, and wherein the surface data determining means determines the perspective-transformed surface data of left and right outline points which are intersecting points between the outline of the polygon formed by the perspective-transformed representing coordinates of the vertices and scan lines by linearly interpolating the perspective-transformed surface data of the vertices and also to determine the perspective-transformed surface data of each of at least one dot on the scan lines between the left and right outline points by linearly interpolating the perspective-transformed surface data of the left and right outline points.

3. The image synthesizing system as defined in claim 1, wherein at least one type of said surface data processed by said surface data determining means is rendering data, and wherein said image data forming means forms the image data at a position represented by said perspective-transformed representing coordinates using the rendering data determined by said surface data determining means.

4. The image synthesizing system as defined in claim 3 wherein at least one type of said rendering data is color data, and wherein said image data forming means uses said color data to form the image data at a position represented by said perspective-transformed representing coordinates.

5. The image synthesizing system as defined in claim 3, wherein at least one type of said rendering data is brightness data, and wherein said image data forming means uses said brightness data to form the image data at a position represented by said perspective-transformed representing coordinates.

6. The image synthesizing system as defined in claim 3 wherein at least one type of said rendering data is surface shape data, and wherein said image data forming means uses said surface shape data to form the image data at a position represented by said perspective-transformed representing coordinates.

7. The image synthesizing system as defined in claim 3 wherein at least one type of said rendering data is transparency data, and wherein said image data forming means uses said transparency data no form the image data at a position represented by said perspective-transformed representing coordinates.

8. The image synthesizing system as defined in claim 3 wherein at least one type of said rendering data is diffuse reflectance data, and wherein said image data forming means uses said diffuse reflectance data to form the image data at a position represented by said perspective-transformed representing coordinates.

9. The image synthesizing system as defined in claim 3, wherein said image data forming means forms brightness data at a position represented by said perspective-transformed representing coordinates based on a given lighting model and normal vector data, said rendering data comprising surface shape data and said surface shape data including said normal vector data.

10. The image synthesizing system as defined in claim 1, wherein at least one of said surface data processed by said surface data determining means is texture coordinates and said image synthesizing system further comprising a rendering data storage unit storing a given rendering data at an address specified by said texture coordinates determined by said surface data determining means, said image data forming means forms the image data at a position represented by said perspective-transformed representing coordinates using a rendering data read out from said rendering data storage unit.

11. The image synthesizing system as defined in claim 10, wherein at least one type of data in said rendering data is color data, and wherein said image data forming means uses said color data to form the image data at a position represented by said perspective-transformed representing coordinates.

12. The image synthesizing system as defined in claim 10, wherein at least one type of said rendering data is brightness data, and wherein said image data forming means uses said brightness data to form to image data at a position represented by said perspective-transformed representing coordinates.

13. The image synthesizing system as defined in claim 10, wherein at least one type of said rendering data is surface shape data, and wherein said image data forming means uses said surface shape data to form the image data at a position represented by said perspective-transformed representing coordinates.

14. The image synthesizing system as defined in claim 10, wherein at least one type of said rendering data is transparency data, and wherein said image data forming means uses said transparency data to form the image data at a position represented by said perspective-transformed representing coordinates.

15. The image synthesizing system as defined in claim 10, wherein at least one type of said rendering data is diffuse reflectance data, and wherein said image data forming means uses said diffuse reflectance data to form the image data at a position represented by said perspective-transformed representing coordinates.

16. The image synthesizing system as defined in claim 10, wherein said image data forming means performs perturbation processing based on normal vector perturbation component data and normal vector data, said image data forming means forming brightness data at a position represented by said perspective-transformed representing coordinates based on a lighting model and said perturbed normal vector data, said normal vector data being attribute data for each of the polygons, said rendering data comprising surface shape data and said surface shape data including said normal vector perturbation component data.

17. The image synthesizing system as defined in claim 16, wherein said image data forming means performs said perturbation processing based on said normal vector perturbation component data and normal vector data determined by said surface data determining means, said surface data determined by said surface data determining means comprising said normal vector data.

18. The image synthesizing system as defined in claim 1, wherein at least one of said surface data processed by said surface data determining means is texture coordinates, said image synthesizing system further comprising a function determining unit for applying a given function determination to the texture coordinates determined by said surface data determining means to determine rendering data, said image data forming means forms the image data at a position represented by said perspective-transformed representing coordinates using the rendering data determined by said function determining unit.

19. The image synthesizing system as defined in claim 18, wherein said image data forming means performs perturbation processing based on normal vector perturbation component data and normal vector data, said image data forming means forming brightness data at a position represented by said perspective-transformed representing coordinates based on a lighting model and said perturbed normal vector data, said normal vector data being attribute data for each of the polygons, said rendering data comprising surface shape data and said surface shape data including said normal vector perturbation component data.

20. The image synthesizing system as defined in claim 19, wherein said image data forming means performs said perturbation processing based on said normal vector perturbation component data and normal vector data determined by said surface data determining means, said surface data determined by said surface data determining means comprising said normal vector data.

21. The image synthesizing system as defined in claim 18, wherein at least one type of said rendering data is color data, and wherein said image data forming means uses said color data to form the image data at a position represented by said perspective-transformed representing coordinates.

22. The image synthesizing system as defined in claim 18, wherein at least one type of said rendering data is brightness data, and wherein said image data forming means uses said brightness data to form the image data at a position represented by said perspective-transformed representing coordinates.

23. The image synthesizing system as defined in claim 18, wherein at least one type of said rendering data is surface shape data, and wherein said image data forming means uses said surface shape data to form the image data at a position represented by said perspective-transformed representing coordinates.

24. The image synthesizing system as defined in claim 1 wherein said image data forming means includes attribute data storage means for storing attribute data which is image data common within each of the polygons, said image data forming means forms the image data at a position represented by said perspective-transformed representing coordinates using said attribute data and said surface data.

25. The image synthesizing system as defined in claim 1, wherein said representing coordinate determining means processes the polygons sequentially starting from a closest polygon to a view point through a given determining process, the image synthesizing system further comprising:

end flag storage means for storing a plurality of end flags, each one of said plurality of end flags corresponding to one of a plurality of dots on a screen, each end flag indicating whether said corresponding one of said plurality of dots has completed said determining process, and processing dot instruction means for reading one of said plurality of end flags from said end flag storage means as a read end flag, for instructing said representing coordinate determining means to process a dot corresponding to said read end flag only when said read end flag indicates that said corresponding dot has not completed said determining process, and for changing said read end flag to indicate that said corresponding dot has completed said determining process.

26. The image synthesizing system as defined in claim 1, wherein said representing coordinate determining means determines a perspective-transformed representing Z coordinate of each vertex based on a Z coordinate which is a representing coordinate in a depth direction, and wherein said surface data determining means perspectively transforms said surface data based on said perspective-transformed representing Z coordinate of each vertex.

27. The image synthesizing system as defined in claim 1, wherein said representing coordinate determining means determines a perspective-transformed representing Z coordinate of each of the plurality of dots based on a Z coordinate which is a representing coordinate in a depth direction, and said surface data determining means subjects said perspective-transformed surface data to an inverse perspective transformation based on said perspective-transformed representing Z coordinate of each of the plurality of dots.

28. The image synthesizing system as defined in claim 1, wherein said surface data determining means simultaneously determines a plurality of types of surface data by parallel determining means.

29. The image synthesizing system as defined in claim 28, wherein the plurality of types is at least texture data and brightness data.

30. The image synthesizing system as defined in claim 28, wherein the parallel means is a plurality of identical devices controlled by a common controller, each of the plurality of identical devices processing one of the plurality of types of surface data.

31. An image synthesizing system for perspectively transforming three dimensional images comprising three dimensional polygons onto a plane of projection to synthesize pseudo three dimensional images, said image synthesizing system comprising:

a representing coordinate determining device perspectively transforming representing coordinates of each vertex of said three dimensional polygons onto perspective-transformed representing coordinates of each vertex on said plane of projection, the representing coordinate determining device linearly interpolating perspective-transformed representing coordinates of each of a plurality of dots defining a polygon formed by the perspective-transformed representing coordinates of the vertices;

a surface data determining device perspectively transforming surface data corresponding to each vertex of said three dimensional polygons into perspective-transformed surface data of each vertex which is linear relative to perspective-transformed representing coordinates of each vertex, the surface data determining device linearly interpolating perspective-transformed surface data of each of a plurality of dots defining a polygon formed by the perspective-transformed surface data of the respective vertices and inverse perspectively transforming the perspective-transformed surface data to determine the surface data; and image data forming device forming image data at a position represented by said perspective-transformed representing coordinates using said surface data determined by said surface data determining device.

32. The image synthesizing system as defined in claim 31, wherein the representing coordinate determining device determines the perspective-transformed representing coordinates of left and right outline points which are intersecting points between an outline of the at least one polygon formed by the perspective-transformed representing coordinates of the vertices and scan lines by linearly interpolating the perspective-transformed representing coordinates of the vertices and also determines the perspective-transformed representing coordinate of each of at least one dot on the scan lines between the left and right outline points by linearly interpolating the perspective-transformed representing coordinates of the left and right outline points, and wherein the surface data determining device determines the perspective-transformed surface data of left and right outline points which are intersecting points between the outline of the polygon formed by the perspective-transformed representing coordinates of the vertices and scan lines by linearly interpolating the perspective-transformed surface data of the vertices and also to determine the perspective-transformed surface data of each of at least one dot on the scan lines between the left and right outline points by linearly interpolating the perspective-transformed surface data of the left and right outline points.

33. The image synthesizing system as defined in claim 31, wherein at least one type of said surface data processed by said surface data determining device is rendering data, and wherein said image data forming device forms the image data at a position represented by said perspective-transformed representing coordinates using the rendering data determined by said surface data determining device.

34. The image synthesizing system as defined in claim 33, wherein said image data forming device forms brightness data at a position represented by said perspective-transformed representing coordinates based on a given lighting model and normal vector data, said rendering data comprising surface shape data and said surface shape data including said normal vector data.

35. The image synthesizing system as defined in claim 31, wherein at least one of said surface data processed by said surface data determining device is texture coordinates, said image synthesizing system further comprising a rendering data storage unit storing a given rendering data at an address specified by said texture coordinates determined by said surface data determining device, said image data forming device forms the image data at a position represented by said perspective-transformed representing coordinates using a rendering data read out from said rendering data storage unit.

36. The image synthesizing system as defined in claim 35, wherein said image data forming device performs perturbation processing based on normal vector perturbation component data and normal vector data, said image data forming device forming brightness data at a position represented by said perspective-transformed representing coordinates based on a lighting model and said perturbed normal vector data, said normal vector data being attribute data for each of the polygons, said rendering data comprising surface shape data and said surface shape data including said normal vector perturbation component data.

37. The image synthesizing system as defined in claim 36, wherein said image data forming device performs said perturbation processing based on said normal vector perturbation component data and normal vector data determined by said surface data determining device, said surface data determined by said surface data determining device comprising said normal vector data.

38. The image synthesizing system as defined in claim 31, wherein at least one of said surface data processed by said surface data determining device is texture coordinates, said image synthesizing system further comprising a function determining unit for applying a given function determination to the texture coordinates determined by said surface data determining device to determine rendering data, said image data forming device forms the image data at a position represented by said perspective-transformed representing coordinates using the rendering data determined by said function determining unit.

39. The image synthesizing system as defined in claim 38, wherein said image data forming device performs perturbation processing based on normal vector perturbation component data and normal vector data, said image data forming device forming brightness data at a position represented by said perspective-transformed representing coordinates based on a lighting model and said perturbed normal vector data, said normal vector data being attribute data for each of the polygons, said rendering data comprising surface shape data and said surface shape data including said normal vector perturbation component data.

40. The image synthesizing system as defined in claim 39, wherein said image data forming device performs said perturbation processing based on said normal vector perturbation component data and normal vector data determined by said surface data determining device, said surface data determined by said surface data determining device comprising said normal vector data.

41. The image synthesizing system as defined in claim 31, wherein said representing coordinate determining device determines a perspective-transformed representing Z coordinate of each vertex based on a Z coordinate which is a representing coordinate in a depth direction, and wherein said surface data determining device perspectively transforms said surface data based on said perspective-transformed representing Z coordinate of each vertex.

42. The image synthesizing system as defined in claim 31, wherein said representing coordinate determining device determines a perspective-transformed representing Z coordinate of each of the plurality of dots based on a Z coordinate which is a representing coordinate in a depth direction, and said surface data determining device subjects said perspective-transformed surface data to an inverse perspective transformation based on said perspective-transformed representing Z coordinate of each of the plurality of dots.

43. The image synthesizing system as defined in claim 31, wherein said surface data determining device simultaneously determines a plurality of types of surface data by parallel determining device.

44. The image synthesizing system as defined in claim 43, wherein the plurality of types is at least texture data and brightness data.

45. The image synthesizing system as defined in claim 43, wherein the parallel device is a plurality of identical devices controlled by a common controller, each of the plurality of identical devices processing one of the plurality of types of surface data.

46. A method for synthesizing a pseudo three dimensional image by perspectively transforming three dimensional images comprising three dimensional polygons onto a plane of projection, comprising:

perspectively transforming representing coordinates of each vertex of said three dimensional polygons onto a perspective-transformed representing coordinates of each vertex on said plane of projection;

linearly interpolating perspective-transformed representing coordinates of each of a plurality of dots defining a polygon formed by the perspective-transformed representing coordinates of the vertices;

perspectively transforming surface data corresponding to each vertex of said three dimensional polygons into perspective-transformed surface data of each vertex which is linear relative to the perspective-transformed representing coordinates of each vertex;

linearly interpolating perspective-transformed surface data of each of a plurality dots defining a polygon formed by the perspective-transformed surface data of the respective vertices;

inverse perspective transforming the perspective-transformed surface data; and forming image data at a position represented by the perspective-transformed representing coordinates using said inverse perspective-transformed surface data.

47. The method as defined in claim 46, wherein the perspectively transforming a representing coordinate step determines the perspective-transformed representing coordinates of left and right outline points which are intersecting points between an outline of the at least one polygon formed by the perspective-transformed representing coordinates of the vertices and scan lines by linearly interpolating the perspective-transformed representing coordinates of the vertices and also the perspective-transformed representing coordinate of each of at least one dot on the scan lines between the left and right outline points by linearly interpolating the perspective-transformed representing coordinates of the left and right outline points, and wherein the perspectively transforming surface data step determines the perspective-transformed surface data of left and right outline points which are intersecting points between the outline of the polygon formed by the perspective-transformed representing coordinates of the vertices and scan lines by linearly interpolating the perspective-transformed surface data of the vertices and also to determine the perspective-transformed surface data of each of at least one dot on the scan lines between the left and right outline points by linearly interpolating the perspective-transformed surface data of the left and right outline points.

48. The method as defined in claim 46, wherein at least one type of said surface data determined by said inverse perspective transforming step is rendering data, and said forming image data step forms the image data using said rendering data determined by said inverse perspective transforming step.

49. The method as defined in claim 48, wherein said forming image data step comprises forming brightness data at a position represented by said perspective-transformed representing coordinates based on a given lighting model and normal vector data, said rendering data comprising surface shape data and said surface shape data including said normal vector data.

50. The method as defined in claim 46, wherein at least one type of said surface data is texture coordinates, and a rendering data is stored in a rendering data storage unit at an address specified by said texture coordinates, and said forming image data step forms the image data using the rendering data read out from said rendering data storage unit.

51. The method as defined in claim 50, wherein said forming image data step comprises:

performing perturbation processing based on normal vector perturbation component data and normal vector data; and forming brightness data at a position represented by said perspective-transformed representing coordinates based on a lighting model and said perturbed normal vector data, said normal vector data being attribute data for each of the polygons, said rendering data comprising surface shape data and said surface shape data including said normal vector perturbation component data.

52. The method as defined in claim 51, wherein said forming image data step performs said perturbation processing based on said normal vector perturbation component data and normal vector data, said surface data comprising said normal vector data.

53. The method as defined in claim 46, wherein at least one type of said surface data is texture coordinates, and a rendering data is determined by applying a given function determination to said texture coordinates, and said forming image data step forms the image data using the rendering data determined by applying said function determination to the texture coordinates.

54. The method as defined in claim 53, wherein said forming image data step comprises:

performing perturbation processing based on normal vector perturbation component data and normal vector data; and forming brightness data at a position represented by said perspective-transformed representing coordinates based on a lighting model and said perturbed normal vector data, said normal vector data being attribute data for each of the polygons, said rendering data comprising surface shape data and said surface shape data including said normal vector perturbation component data.

55. The method as defined in claim 54, wherein said forming image data step performs said perturbation processing based on said normal vector perturbation component data and normal vector data, said surface data comprising said normal vector data.

56. The method as defined in claim 46, wherein a perspective-transformed representing Z coordinate of each vertex is determined based on a Z coordinate which is a representing coordinate in a depth direction, and said perspectively transforming a surface data step perspectively transforms the surface data based on said perspective-transformed representing Z coordinate of each vertex.

57. The method as defined in claim 46, wherein perspective-transformed representing Z coordinate of each of the plurality of dots is determined based on a Z coordinate which is a representing coordinate in a depth direction, and said inverse perspective transforming step inverse perspective transforms said perspective-transformed surface data based on said perspective-transformed representing Z coordinate of each of the plurality of dots.

58. The method as defined in claim 46, wherein a plurality of types of surface data is determined simultaneously by a parallel determining device.

59. The method as defined in claim 58, wherein the plurality of types is at least texture data and brightness data.

60. The method as defined in claim 58, wherein the parallel device is a plurality of identical devices controlled by a common controller, each of the plurality of identical devices processing one of the plurality of types of surface data.

* * * * *